(12) United States Patent
Boehme et al.

(10) Patent No.: US 11,117,818 B2
(45) Date of Patent: Sep. 14, 2021

(54) FARADIC POROSITY CELL

(71) Applicant: PowerTech Water Inc., Lexington, KY (US)

(72) Inventors: Lindsay Boehme, Lexington, KY (US); Cameron Lippert, Lexington, KY (US); James Landon, Lexington, KY (US)

(*) Notice: Subject to any disclaimer, the term of this patent is extended or adjusted under 35 U.S.C. 154(b) by 0 days.

(21) Appl. No.: 16/520,340

(22) Filed: Jul. 23, 2019

(65) Prior Publication Data

US 2020/0024158 A1 Jan. 23, 2020

Related U.S. Application Data

(63) Continuation-in-part of application No. 16/417,574, filed on May 20, 2019.

(60) Provisional application No. 62/758,433, filed on Nov. 9, 2018, provisional application No. 62/702,286, filed on Jul. 23, 2018.

(51) Int. Cl.
| | |
|---|---|
| C02F 1/469 | (2006.01) |
| C02F 101/20 | (2006.01) |
| C02F 101/12 | (2006.01) |
| C02F 103/00 | (2006.01) |
| C02F 103/32 | (2006.01) |
| C02F 103/08 | (2006.01) |

(Continued)

(52) U.S. Cl.
CPC ........ C02F 1/4691 (2013.01); *C02F 2101/12* (2013.01); *C02F 2101/20* (2013.01); *C02F 2101/203* (2013.01); *C02F 2101/206* (2013.01); *C02F 2101/36* (2013.01); *C02F 2103/002* (2013.01); *C02F 2103/026* (2013.01); *C02F 2103/08* (2013.01); *C02F 2103/32* (2013.01); *C02F 2201/46* (2013.01)

(58) Field of Classification Search
CPC .................................................. C02F 1/4691
See application file for complete search history.

(56) References Cited

U.S. PATENT DOCUMENTS

| | | |
|---|---|---|
| 883,170 A | 3/1908 | Christy |
| 4,226,685 A | 10/1980 | Portal et al. |

(Continued)

FOREIGN PATENT DOCUMENTS

WO 2006080702 A1 8/2006

OTHER PUBLICATIONS

Porada et al, "Effect of Electrode Thickness Variation on Operation of Capacitive Deionization," Electrochimica Acta, vol. 75 (2012), pp. 148-156 (Year: 2012).*

(Continued)

*Primary Examiner* — Salil Jain

(57) ABSTRACT

Applicant's faradic porosity cell combines adsorption (physical and capacitive) and faradic immobilization of a target species by optimizing electrode porosity, applied E, and Pourbaix operating regions. The optimization parameters are (i) physical adsorption; (ii) capacitive adsorption; (iii) electrochemical pH modulation; (iv) electrochemical peroxide ($H_2O_2$) generation; (v) electrodeposition (e.g., electroplating, electrophoretic deposition); (vi) electrochemical oxidation or reduction; (vii) precipitation; (viii) pore mouth diameter profile, and (ix) electrode spacing, and (xi) flow-by vs. flow-through vs. carbon block cell design.

9 Claims, 41 Drawing Sheets

Schematic of an EDC device

1 – Input stream, 2 – Treated stream, 3 – Electrical Leads, 4 – Housing, 5 – Electrode 1A, 6 – Current Collector, 7 – Electrode 1B, 8 – Feed spacer (optional), 9 – Separator, 10 – Electrode 2A, 11 – Electrode 2B.

(51) Int. Cl.
    *C02F 103/02*    (2006.01)
    *C02F 101/36*    (2006.01)

(56) References Cited

U.S. PATENT DOCUMENTS

| | | | |
|---|---|---|---|
| 5,376,240 A * | 12/1994 | Kaczur et al. | |
| 5,954,937 A * | 9/1999 | Farmer | B01J 49/30 |
| | | | 204/267 |
| 6,224,744 B1 | 5/2001 | Casado Gimenez et al. | |
| 6,778,378 B1 * | 8/2004 | Andelman | C02F 1/46109 |
| | | | 361/302 |
| 7,892,515 B2 | 2/2011 | Hu et al. | |
| 9,199,867 B2 | 12/2015 | Botte | |
| 9,425,000 B2 | 8/2016 | Lin et al. | |
| 9,827,517 B2 | 11/2017 | Vecitis et al. | |
| 2005/0036270 A1 | 2/2005 | Faris et al. | |
| 2011/0042205 A1 * | 2/2011 | Kim | C02F 1/4691 |
| | | | 204/252 |
| 2012/0202033 A1 | 8/2012 | Chang et al. | |
| 2013/0112601 A1 * | 5/2013 | Silver | C02F 3/302 |
| | | | 210/143 |
| 2014/0118884 A1 | 5/2014 | Lin et al. | |
| 2014/0367262 A1 * | 12/2014 | Cho | C02F 1/4691 |
| | | | 204/554 |
| 2015/0008139 A1 * | 1/2015 | Saffron | C25B 3/00 |
| | | | 205/455 |
| 2015/0017089 A1 * | 1/2015 | Kuntle et al. | |
| 2016/0167984 A1 | 6/2016 | Gao et al. | |
| 2016/0221844 A1 | 8/2016 | Gao et al. | |
| 2017/0015559 A1 | 1/2017 | Costantino et al. | |
| 2018/0162752 A1 * | 6/2018 | Van Der Wai et al. | |
| 2018/0318843 A1 | 11/2018 | O'Connor et al. | |
| 2018/0334396 A1 * | 11/2018 | Lippert | C02F 1/46109 |
| 2019/0248682 A1 | 8/2019 | Pashley et al. | |
| 2019/0270654 A1 * | 9/2019 | Lippert | C02F 1/4693 |

OTHER PUBLICATIONS

Yeh et al, "Improved Performance in Capacitive Deionization of Activated Carbon Electrodes with a Tunable Mesopore and Micropore Ratio," Desalination 367 (2015) 60-68 (Year: 2015).*

Avraham et al., "Limitations of Charge Efficiency in Capacitive Deionization II. On the Behavior of CDI Cells Comprising Two Activated Carbon Electrodes", Journal of the Electrochemical Society, 156 (10) p. 157-p. 162 (2009).

Bouhadana et al., "Capacitive Deionization of NaCl Solutions at Non-Steady-State Conditions: Inversion Functionality of the Carbon Electrodes", The Journal of Physical Chemistry 2011, 115 (33), pp. 16567-16573.

Chae et al., "1.9V aqueous carbon-carbon supercapacitors with unequal electrode capacitances", Electrochimica Acta 86 (2012) 248-254.

Dai et al., "Cell voltage versus electrode potential range in aqueous supercapacitors", Sci. Rep. 2015, 5, 9854.

Gao et al., "Dependence of the Capacitive Deionization Performance on Potential of Zero Charge Shifting of Carbon Xerogel Electrodes during Long-Term Operation", Journal of the Electrochemical Society, 161 (12), pp. E159-E166 (2014).

Gao et al., "Surface charge enhanced carbon electrodes for stable and efficient capacitive deionization using inverted adsorption-desorption behavior", Energy and Environmental Science (2015), pp. 1-13.

Gao et al., "Voltage-Based Stabilization of Microporous Carbon Electrodes for Inverted Capacitive Deionization", J. Phys. Chem. C. 2018, 122(2), 1158-1168.

Han et al., "Exploring the impact of pore size distribution on the performance of carbon electrodes for capacitive deionization", Journal of Colloid and Interface Science 430 (2014) 93-99.

International Search Report and the Written Opinion of the International Searching Authority PCT/US2019/043129 dated Nov. 7, 2019.

Landon et al., "Impact of Pore Size Characteristics on the Electrosorption Capacity of Carbon Xerogel Electrodes for Capacitive Deionization", Journal of the Electrochemical Society, 159 (11) A1861-A1866 (2012).

Pletcher et al., "Reticulated vitreous carbon cathodes for metal ion removal from process steams Part I: Mass transport studies", Journal of Applied Electrochemistry, vol. 21, issue 8, Aug. 1991, p. 659-666.

Search Report & Written Opinion dated Sep. 20, 2019 in (PCT/US19/33144).

Yeh et al., "Improved performance in capacitive deionization of activated carbon electrodes with a tunable mesopore and micropore ratio", Desalination, vol. 367, Jul. 1, 2015, p. 60-68.

Dermentzis et al., "Copper removal from industrial wastewaters by means of electrostatic shielding driven electrodeionization", Journal of Engineering Science and Technology Review 2 (1) (2009) 131-136.

Gaikwad et al., "Tea waste biomass activated carbon electrode for simultaneous removal of Cr(VI) and flouride by capacitive deionization", Chemosphere 184 (2017) 1141-1149.

Huang et al., "Electro-enhanced removal of copper ions from aqueous solutions by capacitive deionization", Journal of Hazardous Materials, 278 (2014) 8-15.

Huang et al., "Removal of copper ions from wastewater by adsorption/electrosoption on modified activated carbon cloths", Journal of Hazardous Materials 175 (2010) 477-483.

Ji et al., "Electric Double-Layer Effects Induce Separation of Aqueous Metal Ions", ACS Nano, vol. 9 No. 11, 10922-10930 (2015).

Kim et al., "Electrolytic Removal of Heavy Metals from Wastewaters", Environmental Progress, May 1982, vol. 1 No. 2, pp. 121-125.

O'Connor et al., "Electrochemical deposition for the separation and recovery of metals using carbon nanotube-enabled filters", Environmental Science Water Research & Technology, 2018, 4, 58-66.

Zhang et al., "Three-dimensional honeycomb-like porous carbon derived from corncob for the removal of heavy metals from water by capacitive deionization", RSC Advances, 2018, 8, 1159-1167.

Iftekhar et al., "Removal of Ni(II) Using Multi-walled Carbon Nanotubes Electrodes: Relation Between Operating Parameters and Capacitive Deionization Performance", 2016, Arab J. Sci. Eng.

Simaioforidou et al., "Surface chemical modification of macroporous and mesoporous carbon materials: Effect on their textural and catalytic properties", Microporous and Mesoporous Materials 279 (2019), p. 334-344.

Fuel Cell Earth, 2021, 3 pages, https://www.fuelcellearth.com/.

Kynol, 2012, 1 page, http://www.kynol.de/products.html.

* cited by examiner

Pourbaix diagram for hypochlorite

CV scans of SC, CG, KN, CX, and HE carbon electrodes

Breakthrough curves during lead removal

Pourbaix diagrams for copper

Pourbaix diagram for aluminum

Schematic of an EDC device

1 – Input stream, 2 – Treated stream, 3 – Electrical Leads, 4 – Housing, 5 – Electrode 1A, 6 – Current Collector, 7 – Electrode 1B, 8 – Feed spacer (optional), 9 – Separator, 10 – Electrode 2A, 11 – Electrode 2B.

Deposition of copper on CCC cathode

Deposition of iron on CCC cathode

Lead precipitates on carbon cloth

Schematic of a rolled cell

1 – Anode, 2 – Spacer, 3 – Cathode, 4 – Input stream, 5 – Purified Stream, 6 – Electrical Contacts.

FARADIC POROSITY CELL

RELATED APPLICATIONS

This application claims the benefit of (i) U.S. application Ser. No. 62/702,286 by Boehme et al., entitled "Capacitive Coagulation Cell", filed on 23 Jul. 2018, (ii) U.S. application No. 62/758,433 by Boehme et al., entitled "Electro-Dechlorination Cell", filed on 9 Nov. 2018, and (iii) U.S. application Ser. No. 16/417,574 by Lippert et al., entitled "Defined Carbon Porosity for Enhanced Capacitive Charging", filed on 20 May 2019.

FEDERAL FUNDING

The research leading to the invention disclosed herein was partially funded by NIH-National Institute of Environmental Health Sciences Phase I SBIR award number 1R43ES028171-01.

BACKGROUND OF THE INVENTION

Field of the Invention

The field of the invention is removal of metal ions, halide ions, derivatives of metals and halides, and ionic particulates from solutions, e.g., the removal of lead from water, by pairing selected faradic reactions with carbon electrode pore mouth diameter profiling.

Definitions

"Adsorption" means attracting ions in an input stream to and retaining those ions on an electrode surface.

"Agglutination" means removing metal ions, halide ions, derivatives of metals or halides, or particulate metal from an input stream to a cell by one or more of the following: (i) physical adsorption; (ii) capacitive adsorption; (iii) electrochemical pH modulation & metal immobilization; (iv) electrochemical peroxide ($H_2O_2$) generation & metal oxidation; (v) electrodeposition or electroplating; (vi) electrochemical oxidation or reduction; (vii) precipitation; (viii) pore mouth diameter profile, (ix) electrode treatment, (x) electrode spacing, and (xi) flow-by vs. flow-through vs. carbon block cell design.

"BET surface area" means surface area determined by the Brunauer-Emmett-Teller method, which is a physical adsorption-based method using nitrogen to determine the surface area of a material.

"Breakthrough curve" means the course of an effluent adsorptive concentration at the outlet of a fixed adsorber. A breakthrough curve enables the calculation of a technically usable sorption capacity. Breakthrough curves typically plot target species concentration vs. volume treated. See, e.g., FIG. 14 (FIGS. 14a-14c).

"Carbon block" is an extruded carbon material with carbon particles bound with a polymer into a bulk solid form. It is typically used for dechlorination and particle filters. In a carbon block cell design used in an FPC, each of one or more pristine carbon blocks are typically divided into two halves that are electrically isolated in an FPC; one half or each block is used as an anode and the other half of each block is used as a cathode.

"Capacitive adsorption" means adsorption of an ion or other charged species on an electrode as a result of electrical attraction.

"CCC" or "capacitive coagulation cell" or "CCC device" means a purification cell that primarily uses capacitive adsorption to remove metal ions, derivatives of metals, or particulate metal from a liquid (typically aqueous) input stream and produce an output stream with a metal, metal derivative, or particulate content below a government regulated limit. For instance, the US EPA specifies a lead content of 15 ppb as the "action level" for potable or irrigation water.

"CCC Parameter" means a user-selected FPC Parameter in an CCC.

"Cell" means, in general, a plurality of electrodes exposed to an input stream (influent), with an outlet for the output stream (effluent) during operation, a short-circuit switch or power supply attached to the electrodes, a manual or computerized means of controlling the power supply and any in-stream valves, and sensors that monitor cell operation and interface with the manual or computerized means of control. A cell can optionally include a further means of controlling the input stream and the output stream, for instance to select different output stream collection vessels or other dispositions during cell operation. Unlike a capacitive deionization cell, an FPC does not regenerate (aka desorb) the electrodes to produce a waste stream of desorbed target species during operation; instead, an FPC, including CCC or an EDC, is replaced, e.g., when the concentration of a target species in the output stream exceeds a user-selected threshold; replacement criteria other than target species concentration in the output stream, e.g., cumulative volume of through stream for a given FPC, and presence of certain reaction byproducts, may be specified.

"Charging potential" means a voltage applied to a cell to perform work.

"Conductivity" means the electrical conductivity of an input stream, through stream, output stream, or a waste stream. Conductivity is a surrogate measurement for the molarity of ions in an input stream, output stream, or waste stream. Conductivity is directly proportional to molarity of ions in such streams.

"CG" means a carbon that has a predominately mesoporous structure with a nominal surface area of ~700 $m^2/g$. CG was formulated by the inventors using the pore mouth diameter profile method disclosed herein and fabricated for the inventors by Calgon Corporation (Naperville, Ill.). CG is sometimes recited as Calgon® in the Tables.

"CV" means cyclic voltammogram.

"CX" means carbon xerogel. CX electrodes possess a mesoporous structure with a nominal surface area of ~200 $m^2/g$.

"Cycle" means a cycle of operation in which a sequence of positive then negative, or negative then positive, potential has been applied to an FPC electrode.

"DO" means dissolved oxygen.

"E" means a voltage, aka electrical potential; if a direct current, E has a constant polarity (positive or negative).

"Electrode" means a material, typically porous carbon, which is electrically conductive.

"EDC" means an electro-dehalidation cell disclosed in this Application. An EDC is a species of water purification cell within the genus of FPCs.

"EDC Parameter" means a user-selected FPC Parameter in an EDC.

"EDX" means Energy Dispersive X-Ray Analysis.

"$E_o$" is the potential vs. a reference electrode when the electrodes are short-circuited (i.e., $E_o$ is the potential during a short-circuit condition).

"$E_{PZC}$" or "potential of zero charge", means the potential of an electrode at which there is a minimum in ion adsorption at the surface. $E_{PZC}$ can be intentionally shifted by surface modification of a carbon electrode, or inherently relocated as a result of oxidation of an electrode surface by extended applied potential or voltage. The $E_{PZC}$ of a pristine carbon a electrode is typically between −0.1 V and +0.1 V. Shifting the $E_{PZC}$ of an electrode through surface modifications is disclosed in detail in U.S. application Ser. No. 62/702,286 incorporated herein. FPC electrode $E_{PZCS}$ for a given target species vary by water chemistry and are empirically determined.

"Faradic immobilization" means electron transfer to a target species in the electrolyte, or electron transfer to a species in the electrolyte, followed by a homogeneous reaction in solution with the target species of interest, after which the reaction product is adsorbed on an electrode.

"Flow-by" cell design means the through stream in an FPC flows across the surface of the electrodes in an FPC, rather than through the electrodes. Flow-by cell design can provide the following advantages compared to a flow-through cell design: lower pressure drop, higher flow rate, equal degradation of carbon electrodes, equivalent pH regions generated for each electrode pair.

"Flow rate" means the flow rate, typically in L/hr, ml/min, etc., of an input, throughput, output, or waste stream.

"Flow-through" cell design means the through stream in an FPC is forced through the electrodes in an FPC. Flow-through cell design can provide the following advantages compared to a flow-by cell design: more extreme pH regions, better control over outlet pH.

"FPC" or "faradic porosity cell" or "FPC device" means a purification cell that uses agglutination to remove metal ions, halide ions, derivatives (e.g., other species) of target metals or target halides, or particulate metal from a liquid (typically aqueous) input stream and produce an output stream with a decreased metal, halide, or particulate content. Different species of FPC can be used in series or in parallel to remove target species from an aqueous influent to a purification system. An "FPC system" means a water purification system that contains one or more FPCs and optionally other types of purification cells (see definition of "hybrid system"), such as capacitive deionization ("CDI") cells, membrane CDI cells ("MCDI"), inverted CDI ("i-CDI") cells, and non-electrochemical cells and filters. Inclusion of CDI, MCDI, i-CDI cells, or similar desorbing cells in an FPC system requires provision of a waste stream and associated cell controls in an FPC system to accommodate desorption from CDI, MCDI, i-CDI, and similar desorbing cells into the waste stream. CCCs and EDCs are species of FPCs.

"FPC Parameter" means a user-selected value in an FPC of (i) physical adsorption; (ii) capacitive adsorption; (iii) electrochemical pH modulation; (iv) electrochemical peroxide ($H_2O_2$) generation & oxidation of target species; (v) electrodeposition (e.g., electroplating, electrophoretic deposition); (vi) electrochemical oxidation or reduction; (vii) precipitation; (viii) pore mouth diameter profile, (ix) electrode treatment, (x) electrode spacing, and (xi) flow-by vs. flow-through vs. carbon block cell design. One or more FPC Parameters are selected, or "tuned", to remove a target species from a through stream, based on empirical data for a given input water chemistry.

"Halide derivative" means a molecule or compound that contains a halide.

"HE" means a high-efficiency mesoporous carbon. Electrodes made with HE carbon possess a predominately mesoporous structure with a nominal surface area of ~380 $m^2/g$. HE has a formulation of >98% mesoporous carbon with the balance being macroporous carbon. HE is formulated using the pore mouth diameter profile method disclosed in U.S. application Ser. No. 62/702,286 incorporated herein.

"Hybrid system" means a water purification system that contains at least one FPC (CCC or EDC) and at least one other type of water purification cell, e.g., a peroxidation cell, CDI, MCDI, i-CDI, or non-electrochemical cell or filter. The minimal configuration of a hybrid system is series (FPC feeding other cell type, or vice versa). Larger systems can be series only, or have series paths in parallel (to increase throughput).

"Immobilization" means adsorption of a target species on an FPC electrode without later desorption into a purified output stream.

"Input stream" means a liquid, typically water containing various ions and metals, admitted through an inlet to a cell.

"KN" means a microporous carbon marketed as Kynol® available from American Kynol, Inc (Pleasantville, N.Y.). Electrodes made with KN carbon possess a microporous structure with a nominal surface area of ~1800 $m^2/g$.

"Metal" means a metal, metal ion, metal complex, metal particle, or toxin for which a Pourbaix diagram exists and containing a metal selected from the group comprising As, Se, Pb, Ni, Zn, Al, Sc, Ti, V, Cr, Mn, Fe, Co, Ni, Cu, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, and Lu.

"Metal derivative" means a molecule or compound that contains a metal or metalloid.

"Metal speciation" means the different chemical forms ("species") of a metal in a given milieu. For instance, As(III) and As(V) are species of arsenic that can coexist in an aqueous solution at a given pH.

"NHE" means Normal Hydrogen Electrode.

"Output stream" means a liquid that has passed through an FPC and contains a lower molarity of target species than in the input stream.

"Parallel system architecture" means FPCs (and optionally other types of cells and filters) connected in parallel, i.e., the outlet of each FPC (and optionally other types of cells and filters) feeds the system output. A parallel system architecture can be fixed, or can comprise multiple FPCs, a process controller, interconnecting lines, sensors, and valves disposed in the lines and cells.

"Physical adsorption" means physical entrapment of a target species in an electrode pore.

"PMD" means pore mouth diameter, which is the diameter of a pore on the surface of a carbon electrode. A pore may be a dead-end channel or a through channel within a carbon electrode, and typically has a variable channel diameter.

"Point of entry" or "POE" means the location where a water supply feeds a water distribution system in a residence, commercial/industrial building, or other structure.

"Point of use" or "POU" means the location where water is dispensed from a water distribution system to a consumer, beverage dispenser, kitchen appliance, or other end use.

"Polarity" means the polarity of a DC voltage, either positive or negative.

"Pore mouth diameter profile" means the volumetric ratio(s) among microporous, mesoporous, and macroporous carbon in an electrode fabricated according to the pore mouth diameter profile method disclosed in U.S. application Ser. No. 62/702,286 and U.S. application Ser. No. 16/417, 574 incorporated herein. Generally speaking, the larger the average pore mouth diameter, the longer the working lifetime of the electrode and the more permeable the electrode is to a through stream. The average pore mouth diameter is controlled by the ratio of microporous, mesoporous, and macroporous carbon used to fabricate a given carbon electrode.

"Pourbaix diagram" (aka potential/pH diagram, EH-pH diagram or a pE/pH diagram), maps out possible stable (equilibrium) phases of an aqueous electrochemical system. Predominant ion boundaries are represented by lines. As such, a Pourbaix diagram can be read much like a standard phase diagram with a different set of axes. Similar to phase diagrams, Pourbaix diagrams do not address reaction rate or kinetic effects. For soluble species, the lines in a Pourbaix diagram are usually drawn for concentrations of 1 M or $10^{-6}$ M. Sometimes additional lines are drawn for other concentrations.

"Pourbaix operating region" means relating the pH and applied E at a given electrode in an FPC to a Pourbaix diagram to select for immobilization of a target species in a given water chemistry.

"Pristine" in reference to electrodes means without surface modifications; for example, a Spectracarb™ electrode, as supplied by the manufacturer, is pristine.

"Process controller" means a computer operating a process control application that monitors sensors disposed in a system of FPCs (and optionally, other types of cells and filters) to sample input, through, and/or output streams and status of FPCs (and optionally, other types of cells and filters) in a water purification system comprising one or more FPCs and optionally one or more other types of water purification cells or filters. The process controller actuates valves in lines interconnecting a source of aqueous solution to be treated, FPCs (and optionally other cells and filters), and system outlets, thereby enabling the various FPCs (and optionally other cells and filters) to be configured in a series system architecture, series-parallel system architecture, or parallel system architecture. Based on sensor data, the process controller can dynamically adjust FPC Parameters of FPCs in the system (and optionally adjust other cells and filters in the system).

"Purify" means to remove one or more target species from a through stream. Purification includes the removal of metals for which a Pourbaix diagram exists (e.g., As, Pb, Ni, Zn, Al, Cr, Mn, Fe, and Cu), halides (e.g., Cl, Br, chloramines), organics, and biological compounds.

"Rolled cell design" means an FCP cell design in which continuous separator and porous carbon-based electrode materials are physically rolled into a spiral to create a cylinder with multiple, predominantly flow-by, through stream paths through the porous carbon electrodes. To make a rolled cell, sheets of anode material, separator material, and cathode material are stacked and then rolled up to form a cylinder. Current collectors are attached to the anode and the cathode, usually in multiple locations to reduce electrical losses.

"SC" means a microporous carbon marketed as Spectracarb™ available from Engineered Fibers Technology, LLC (Shelton, Conn.). Electrodes made with SC carbon possess a microporous structure with a nominal surface area of ~1900 m²/g.

"SCE" means a saturated calomel electrode, a standard reference electrode commonly used as a reference electrode, e.g., in cyclic voltammetry.

"Series system architecture" means FPCs (and optionally, other types of cells and filters) connected in series, i.e., the outlet of a first FPC feeds the inlet and a second FPC, the outlet of the second FPC feeds the inlet and a third FPC, and so on. A series system architecture can be fixed, or can comprise multiple FPCs (and optionally, other types of cells and filters), a process controller, sensors, interconnecting feed lines, and valves disposed in feed lines between the outlet of one FPC and the inlet of a second FPC.

"Series-parallel system architecture" means a system in which FPCs (and optionally, other types of cells and filters) can be connected in series or in parallel. A series-parallel system architecture can be fixed, or can comprise multiple FPCs (and optionally, other types of cells and filters), a process controller, interconnecting feed lines, sensors, and valves disposed in feed lines between the outlet of one FPC and the inlet of a second FPC, which valves are actuated by the process controller. The typical series-parallel system architecture comprises multiple ranks of a given series of cells, thereby treating the through stream in the same way, but with higher throughput provided by multiple serial paths.

"SHE" means Standard Hydrogen Electrode.

"Shift" means to alter the potential (aka "location") of the $E_{PZC}$ of an electrode by intentional or unintentional chemical or electrochemical modification of the electrode surface (e.g., electrochemical oxidation due to an applied potential or voltage) using the methods disclosed in U.S. application Ser. No. 62/702,286 incorporated herein.

"Species" means a molecule, compound, or particulate in an aqueous stream or adsorbed on a cell electrode.

"Speciation" means the distribution of an element among defined chemical species in a system or within an FPC. For instance, an uncharged metal particle, a metal ion, and a metal complex of a given metal may coexist in solution or suspension at a given pH, which distribution may change as pH changes.

"Stacked cell design" means an FCP cell design in which separate pieces of separator and porous carbon-based electrode materials are stacked layer-by-layer to create a cylinder with multiple, predominantly flow-by, through stream paths through and/or by the porous carbon electrode. Current collectors are attached to the anode and the cathode, usually in multiple locations to reduce electrical losses. FIG. 23 shows a stacked cell design.

"Surface-charge enhanced surface" means an electrode surface that has been imparted with surface charge through chemical or electrochemical methods.

"System" is a plurality of interconnected FPCs (and optionally, other types of cells and filters) controlled manually or by a process controller.

"Target metal" means one or more species of a given metal or metal derivative to be removed using a CCC.

"Target speciation" means one of several ionic states or complexations a target species may assume in an aqueous electrochemical cell as a function of E applied to cell electrodes and pH, as shown in a Pourbaix diagram of the target species.

"Target species" means a molecule, compound, or particulate to be removed using an FPC. "Target species" includes not only the molecule, compound, or particulate as found (aka "identified as a species in a Pourbaix diagram") in the input stream to an FPC, but one or more intermediate and final reactive products created in an FPC that include that molecule, compound, or particulate.

"Through stream" means the liquid stream being treated within a cell; stated differently, the through stream means the stream within a cell and between the inlet to the cell and the outlet from the cell.

"Treat" means to feed an input stream into an operating FPC or system containing FPCs and to recover the purified output stream.

"Treated electrode" means an electrode with an electrode surface modification disclosed herein.

"TDS" means total dissolved solids. The general operational definition is that the solids must be small enough to survive filtration through a filter with two-micrometer pores.

"Untreated electrode" means an electrode without an electrode surface modification disclosed herein, i.e., a pristine carbon electrode.

"Voltage" and "potential" are synonymous herein. Voltage is direct current ("DC") unless otherwise specified.

"Waste stream" means a liquid that has passed through a CDI, MCDI, i-CDI cell, reverse osmosis, ion exchange, or other water purification cell that cycles between adsorption and desorption and contains a higher molarity of ions than in the input stream. Deionization cells, e.g., capacitive deionization cells, can be used in a system containing FPCs. An FPC does not have a waste stream: the output stream from an FPC is purified water. A system that contains deionization cells that periodically desorb molecules will have (i) a purified output stream from deionization cells operating in an adsorption state that is combined with FPC output streams, and (ii) a waste stream from deionization cells operating in a desorption state.

Related Art

Toxic metals, esp. lead, in drinking water and crop irrigation water are a major, worldwide health problem. The problem, and health impacts, are largely unreported until a crisis occurs, as when the water in a municipal water system becomes toxic from lead contamination. At least 18 million Americans were at risk of drinking lead-contaminated water last year. More than 5,000 community water systems violated a federal lead rule. Elevated blood lead levels in children cause irreversible neurological and behavioral disorders, and even low levels have been linked to decreased IQ and lifetime achievement. The U.S. Environmental Protection Agency ("EPA") emphasizes that there is no safe level of lead exposure. The most commonly used filters for residential point-of-use/point-of-entry (POU/POE) lead reduction, e.g., filters using zeolites and ion exchange, fall short—they have limited effective lifetimes, lack substantial lead specificity, and are expensive.

FIG. 1 shows U.S. locations with dangerously high levels of lead in municipal drinking water and the incidence of elevated blood lead levels in young children in the U.S., exposing them to a risk of permanent brain damage, seizures, coma, and even death from lead poisoning. The U.S. Natural Resources Defense Council ("NRDC") recently found 5,363 community water systems in violation of the EPA's lead and copper rule (https://www.epa.gov/dwreginfo/lead-and-copper-rule), a federal requirement for monitoring of lead and copper levels in water. The NRDC report also found 1,110 water systems that exceed the action level for lead (15 ppb in at least 10 percent of homes tested). These systems collectively serve nearly 4 million people. The EPA is considering revising the 1991 Lead and Copper Rule to make regulations more stringent, and an Administrator of the EPA stated that the agency is working on an ambitious 10-year strategy to "declare a war on lead" and described lead in drinking water as "one of the greatest environmental threats we face as a country".

One 2018 test of the municipal water system in Flint, Mich., showed lead levels of 13,000 ppb, which is 866-times the EPA action level for lead in drinking water. The population is becoming more aware and increasingly concerned about the water quality at home, in schools, and in the community. Water fountains in public schools in New York, California, Ohio, and Illinois have tested well above the action level of 15 ppb. Despite corrosion prevention measures taken by public water authorities to minimize the risk of pipes leaching lead into the drinking water system from outdated infrastructure, lead concentrations in drinking water are commonly elevated nationwide. The most effective way to eliminate lead from drinking water is to replace lead lines, an effort that would cost an estimated $30 billion. A better POU/POE device for potable water would be a vastly easier and more cost-effective solution. The problem of lead contamination is underserved because the existing solutions are overwhelmed by high expense, poor efficacy, and/or short device lifetimes.

Lead removal devices currently on the market lack specificity for lead, and device lifetime is limited by the total amount of water volume filtered, regardless of lead concentration. Over time the pressure drop across the filter becomes so large that water can no longer flow through the filter, even if the adsorbent in the filter is not fully consumed, rendering it useless.

Chlorine and/or chloramines are routinely added to the US drinking water supply as disinfectants to control microbial growth. While the removal of microbes is beneficial for human consumption, chlorine and/or chloramine contributes to tap water's unpleasant taste and odor. Therefore, removing chlorine and chloramines before end use is desirable. Chlorine is more volatile than chloramine and easier to remove with a typical consumer's filter pitcher; however, to remove chloramine, specially formulated filters containing activated carbon (catalytic carbon) are required. The presence of chlorine and/or chloramines is also detrimental for water purification processes that rely on polymer membranes, such as reverse osmosis (RO). Most membranes are not resistant to these disinfectants and break down upon exposure, causing irreversible damage and replacement of expensive RO membranes. Drinking water and other water for use in heat and power plants and other industrial processes ("process water") must have chlorine, chloramines, and other halides (esp., bromine and iodine) and halide derivatives removed to reduce corrosion and fouling of process systems. A solution for the technical problem of removing both chlorine and chloramines from water sources without damaging RO membranes and with reduced use of activated carbon filters would not only reduce water purification costs, but improve drinking water and process water quality. Oxidation of water-borne contaminants, as a water purification process, is normally done with hydrogen peroxide or ozone. Oxidation of certain water-borne contaminants facilitates further degradation and ultimate destruction of the contaminants without further intervention.

The technical problem to be solved is to provide (i) a more efficient, less expensive, purification device to produce purified water, especially a device that removes soluble and insoluble lead to below 15 ppb in potable water, which purification device is (ii) easily scalable for residential, municipal, commercial, and industrial use. Applicant has developed a faradic porosity cell ("FPC") that solves the technical problem by agglutination of target species. Two genera of the FPC are disclosed herein: a first genus that uses a novel electro-dehalidation technology to remove chlorine, other halides, chloramine disinfectants, and other halide derivatives from water—called herein the electro-dehalidation cell ("EDC"); and a second genus that uses a novel capacitive coagulation technology to remove metals, metal derivatives, and particulate metal—called herein the capacitive coagulation cell ("CCC"). Applicant's faradic porosity technology is significantly more effective in water purification than commonly used processes such as chemical coagulation, ion-exchange, and adsorbents. The EDC solves the technical problem of reducing the cost, and improving the efficiency, of removing chlorine, chloramines, and other halides and halide derivatives from drinking water and from process water. The CCC solves the technical problem of reducing the cost, and improving the efficiency, of removing metal, metal derivatives, and particulate metal from drinking water and from process water.

BRIEF DESCRIPTION OF THE DRAWINGS

FIGS. 11a-e show cyclic voltammograms (CV) at a scan rate of 0.5 mV/s in 4.3 mM NaCl with carbon as the working electrode, Pt coated Ti as the counter-electrode, and a standard calomel electrode (SCE) as the reference. The CVs were collected using a carbon electrode (different types, as identified), disposed in an electrolyte and held at constant voltage and for a uniform experimental duration. The voltage applied between anodes and cathodes is ramped up then ramped down at the scan rate, and the current response recorded as a CV. In addition to a CV of pristine (0 h) electrodes, each plot shows the results (3 h and 6 h traces) of accelerated oxidation studies performed after use of the electrodes at a constant applied potential of 2.0 V for 3 and 6 hours.

FIG. 11a shows CVs for microporous SC. After 3 hours of electrochemical oxidation, the $E_{PZC}$ has shifted to the right, indicative of the formation of covalent bonds between the oxygen-containing functional groups and the carbon surface of the carbon electrode. After 6 hours, the electrical potential of zero charge ($E_{pzc}$) is no longer present and there is a noticeable decrease in current, signifying pore collapse. The same trend is observed in FIG. 11b for microporous KN.

FIG. 11b shows CVs for microporous KN, which shows the same trend as microporous SC in FIG. 11a.

FIG. 11c shows CVs for CG, a primarily mesoporous carbon. After 3 and 6 hours of electrochemical oxidation, the $E_{PZC}$ has shifted to the right, but the current is maintained due to non-collapsed pores.

FIG. 11d shows CVs for mesoporous CX, which follows the same trend observed for CG in FIG. 11c.

FIG. 11e shows CVs for mesoporous HE, which also follows the same trend observed for CG in FIG. 11c, but HE exhibits more area within the CV plot at 3 h and 6 h compared with CX in FIG. 11d due to a higher electrochemically active surface area, which provides a larger current response; the pore size of CX in FIG. 11d is 10× larger than HE, which is related to stability of the electrode and ultimate lifetime; the larger pore size of CX, however, provides much less surface area than HE.

SUMMARY OF THE INVENTION

To increase the efficiency of removal of metal and halide contaminants from water using an electrochemical device that typically operates under a constant applied potential, Applicant's combining of capacitive adsorption, faradic reactions near or on cell electrodes, and electrode pore mouth diameter profiling creates a new type of electrochemical device, the faradic porosity cell. The first consideration in a faradic porosity cell is the selection and use of carbon-based materials that can generate reactions and vary pH at both the anode (carbon oxidation with water) and the cathode (dissolved oxygen reduction) over long periods of time. Carbon materials with the right porosity and bulk materials properties can produce these reactions over extended time periods, which will enable targeted reactions with incoming constituents (target species) to be removed from an aqueous solution.

The next design consideration is spacing between the anode and the cathode. With decreased spacing, while maintaining electrical isolation between the electrodes, faster reaction rates are possible, which will limit the residence time needed for certain "reaction and immobilization" processes to be accomplished. Electrode spacing is typically less than 1 mm, and is preferably as close as possible without causing a short circuit of anode and cathode or causing an unacceptable pressure drop (the corollary of which is increased residence time and decreased flow rate) within the FPC. Preferable electrode spacing is less 1 mm, preferably less than 200 microns, more preferably less than 50 microns, and most preferably less than 20 microns.

Figure 17A:
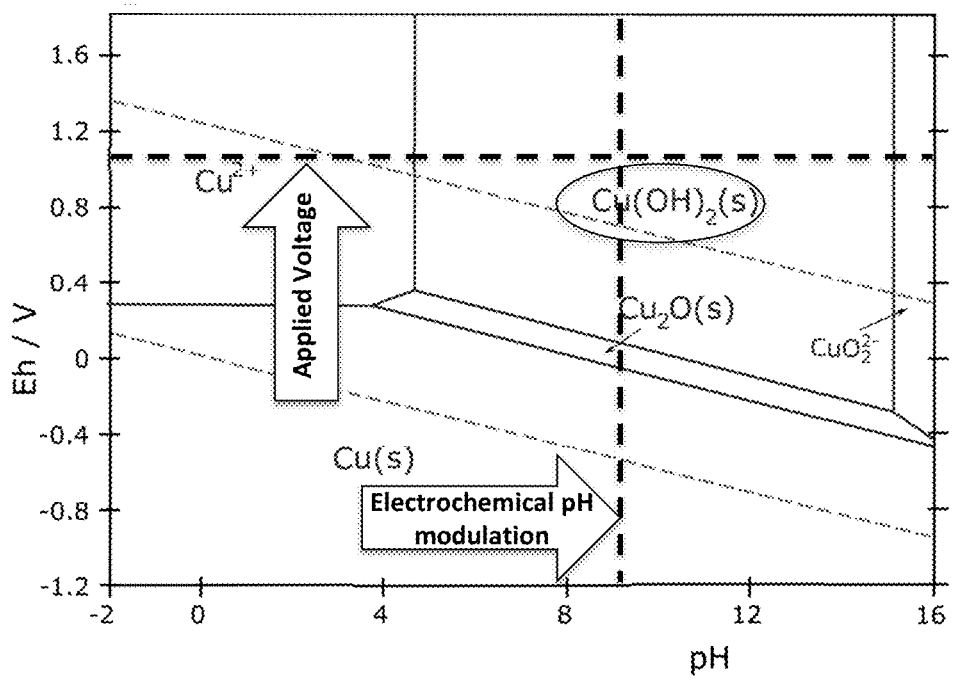
FIG. 17a shows a Pourbaix diagram for Cu showing methods of removal of copper hydroxide [Cu(OH)2] formation.
Figure 17B:
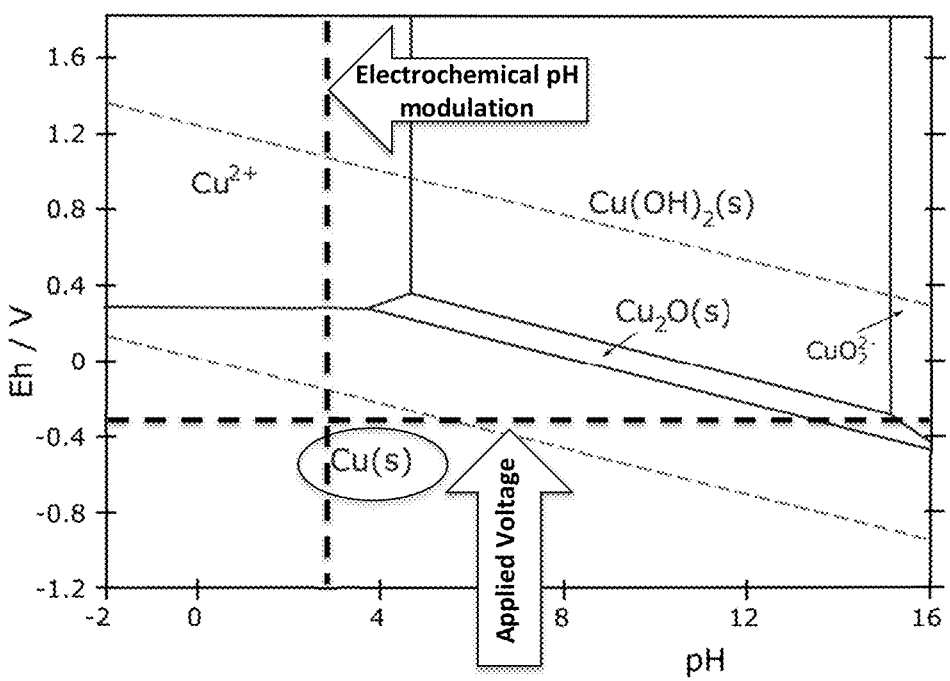
FIG. 17b shows a Pourbaix diagram for Cu showing methods of copper electrodeposition or electroplating [Cu(s)]. (https://commons.wikimedia.org/wiki/File:Cu-pourbaix-diagram.svg).
Figure 18:
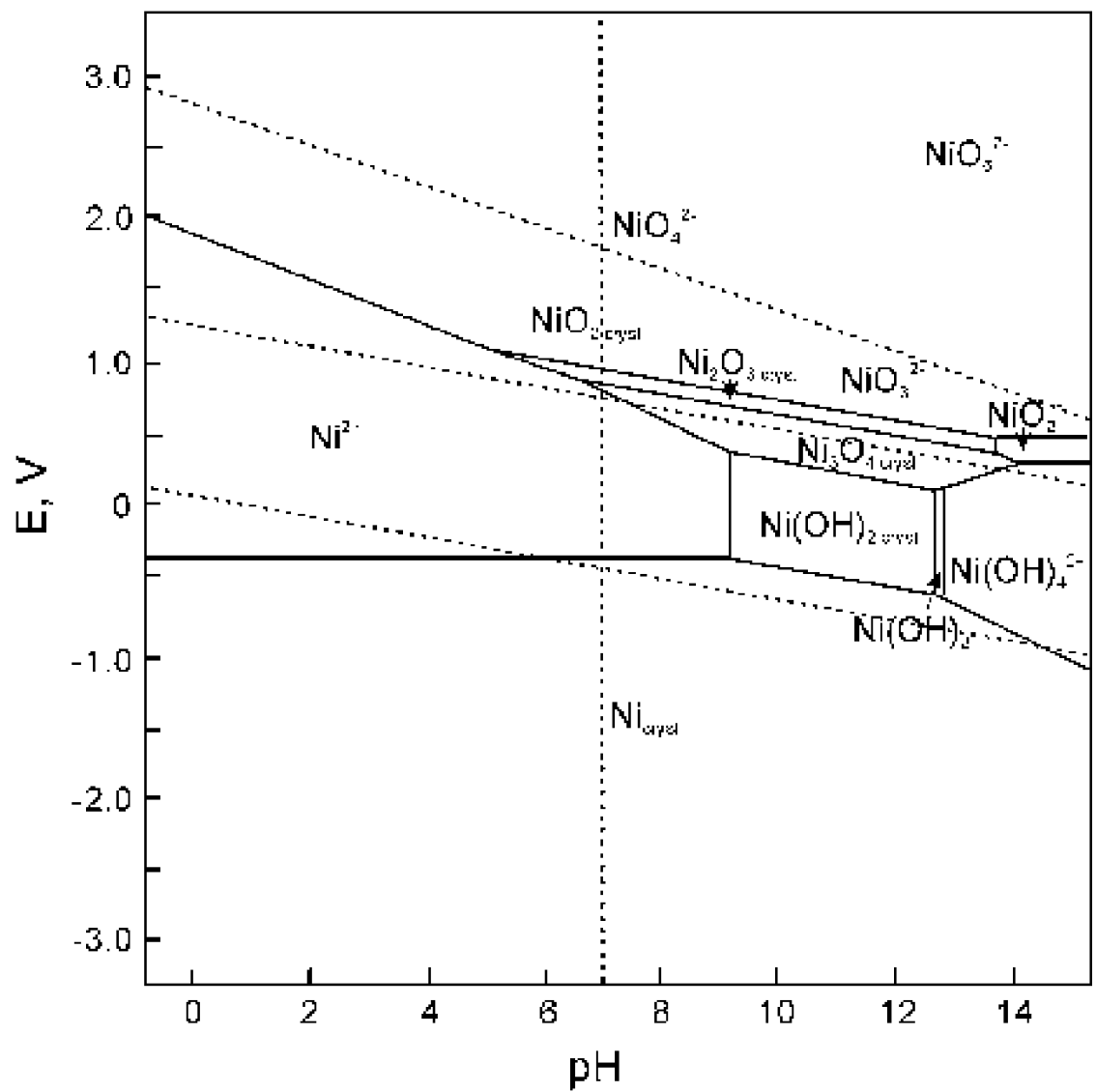
FIG. 18. Pourbaix diagram for Ni. (Ciesielczyk, F., Bartczak, P., Wieszczycka, K., Siwinska-Stefanska, K., Nowacka, M., and Jesionowski, T. (2013). Adsorption of Ni(II) from model solutions using co-precipitated inorganic oxides. Adsorption. 19, 423-434.)
Figure 19:
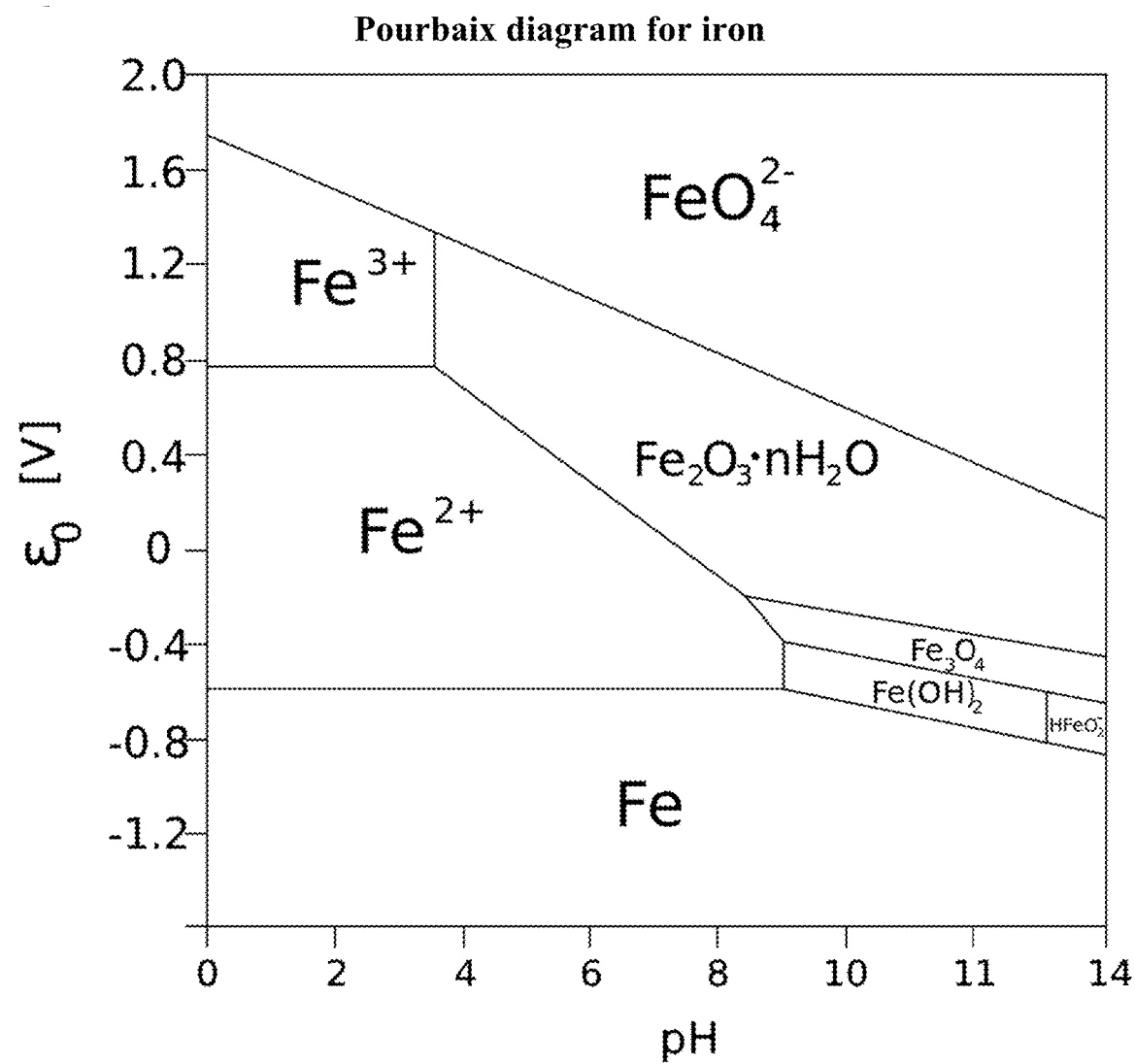
FIG. 19. Pourbaix diagram for Fe. (https://commons.wikimedia.org/wiki/File:Pourbaix_Diagram_of_Iron.svg)
Figure 20:
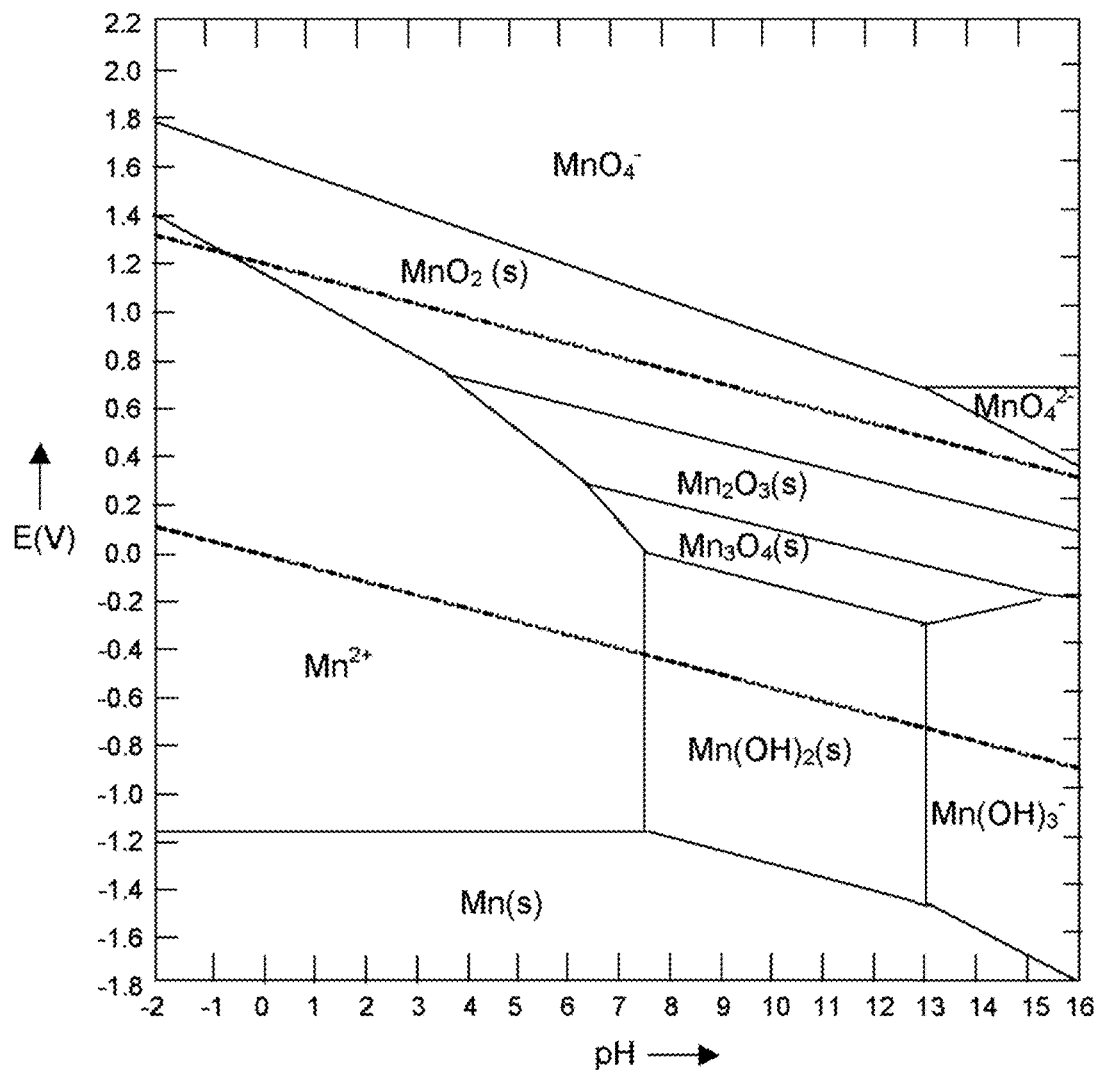
FIG. 20. Pourbaix diagram for Mn. (https://commons.wikimedia.org/wiki/File:Mn_pourbaix_diagram.png)
Figure 21:
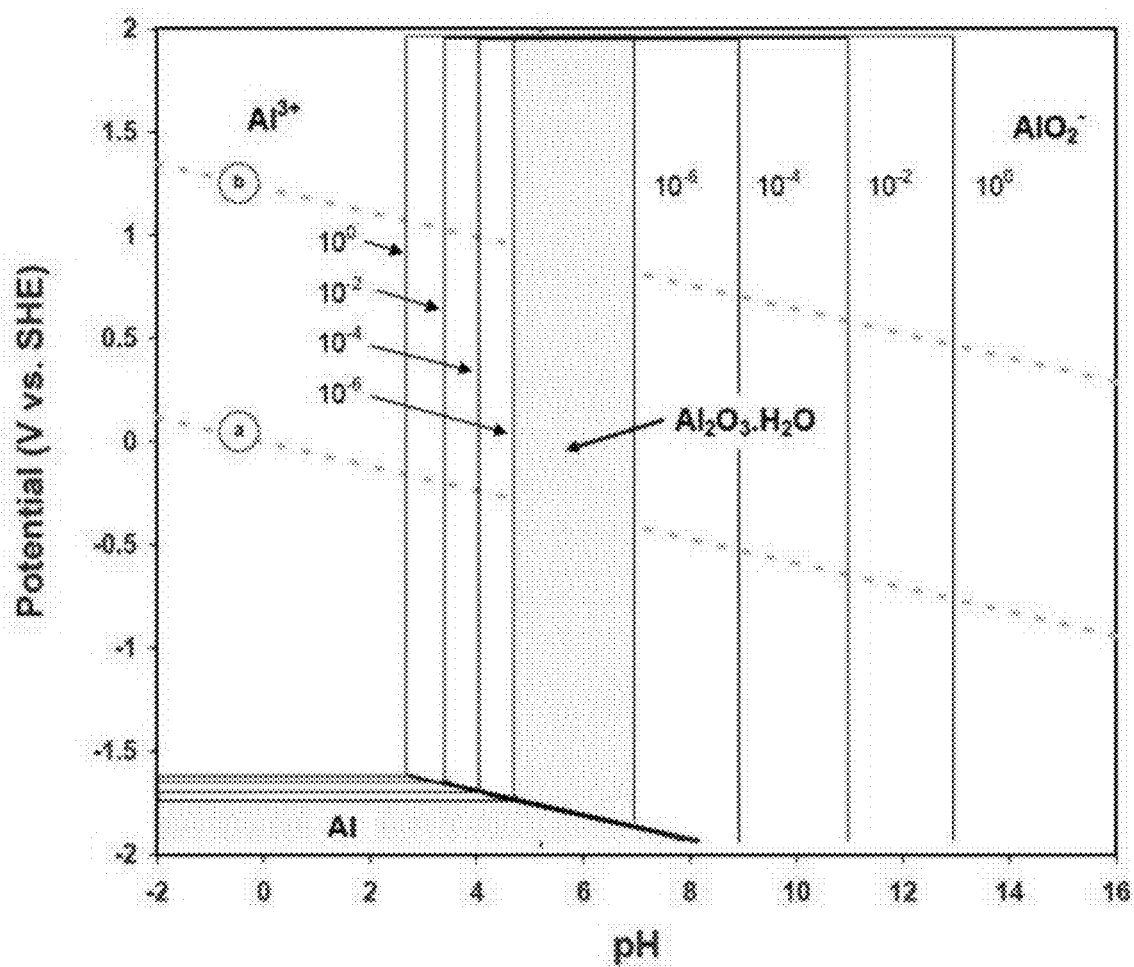
FIG. 21. Pourbaix diagram for Al. (https://corrosion-doctors.org/Corrosion-Thermodynamics/Potential-pH-diagram-aluminum.htm)
Figure 22:
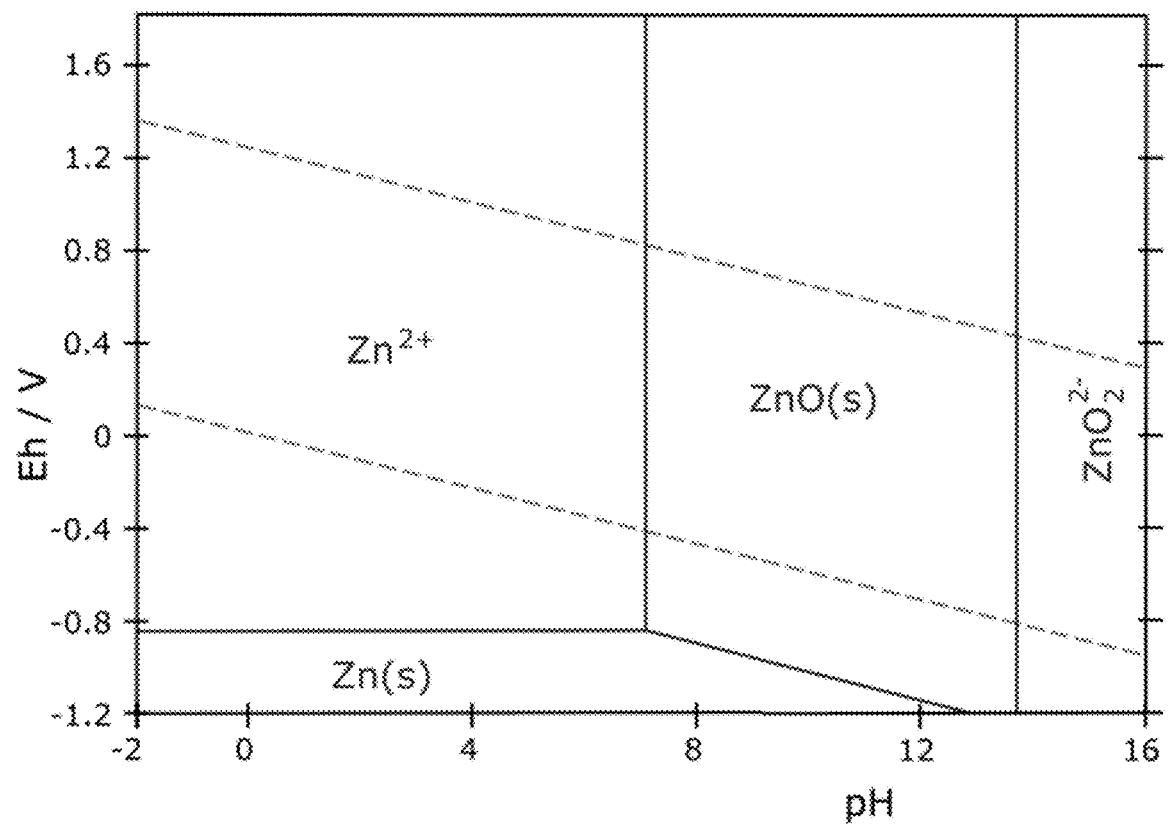
FIG. 22. Pourbaix diagram for Zn. (https://commons.wikimedia.org/wiki/File:Zn-pourbaix-diagram.svg)

Some species of a target species will adsorb by physical entrapment ("physical adsorption") on, or by electrical attraction ("capacitive adsorption") to, an electrode. Other species of a target species are starting materials for reactions (typically, oxidation) that create, directly or indirectly, new species of the target species that are immobilized on an electrode. Immobilization removes the target species from the solution. At a given spacing between the electrodes and matched carbon electrode materials properties, the potential applied to the anode and cathode are selected, based on the Pourbaix diagram of the target species in the input stream. Examples of FPC Parameters for various target species are shown in Table 1. For example, to remove copper, immobilization by plating on an electrode can occur at potentials ranging from ~0.3 V to −0.4 V vs. NHE for pH regions from 0 to 14. In addition, precipitation can occur in the form of copper hydroxide ($Cu(OH)_2$) at the anode at potentials above 0 V vs. NHE and pH values higher than 4 (see FIG. 17). Total cell potentials of approximately 0.4 V are desired for the removal of copper in a faradic porosity cell.

TABLE 1

FPC parameters for various target species

| Target Species | Anode Voltage Range (V) | Cathode Voltage Range (V) | Preferred Anode $E_{PZC}$ Range (V) | Preferred Cathode $E_{PZC}$ Range (V) | PMD Range (nm) | Preferred Operating Voltage (V) | Pourbaix Reference |
|---|---|---|---|---|---|---|---|
| Mn | 0-1.2 | <−1.1 | −0.1-1.0 | −1.0-0.1 | 0-50 | 1.2 | https://commons.wikimedia.org/wiki/File: Mn_pourbaix_diagram.png |
| Fe | 0-1.2 | <−0.5 | −0.1-1.0 | −1.0-0.1 | 0-50 | 0.4-1.2 | https://commons.wikimedia.org/wiki/File: Pourbaix_Diagram_of_Iron.svg |
| Co | >0 | <−0.5 | −0.1-1.0 | −1.0-0.1 | 0-50 | \ | Garcia, E. M, Santos, J. S., Pereira, E. C., and Freitas, M. B. J. G. (2008). Electrodeposition of cobalt from spent Li-ion battery cathodes by the electrochemistry quartz crystal microbalance technique. J. Power Sources. 185(1), 549-553. |
| Ni | 0-1.0 | <−0.4 | −0.1-1.0 | −1.0-0.1 | 0-50 | 1.2 | Ciesielczyk, F., Bartczak, P., Wieszczycka, K., Siwinska-Stefanska, K., Nowacka, M., and Jesionowski, T. (2013). Adsorption of Ni(II) from model solutions using co-precipitated inorganic oxides. Adsorption. 19, 423-434.) |
| Cu | >0 | <0 | −0.1-1.0 | −1.0-0.1 | 0-50 | 0.8-1.2 | https://commons.wikimedia.org/wiki/File: Cu-pourbaix-diagram.svg |
| Zn | >0 | <−0.8 | −0.1-1.0 | −1.0-0.1 | 0-50 | 0.8-1.2 | https://commons.wikimedia.org/wiki/File: Zn-pourbaix-diagram.svg |
| Al | >0 | <−1.3 | −0.1-1.0 | −1.0-0.1 | 0-50 | 0.4 | https://corrosion-doctors.org/Corrosion-Thermodynamics/ Potential-pH-diagram-aluminum.htm |
| Pb | >0.5 | <−0.4 | −0.1-1.0 | −1.0-0.1 | 0-50 | 1.2 | Schock, M. R., Hyland, R. N., and Welch, M. M. (2008). Occurrence of contaminant accumulation in lead pipe scales from domestic drinking-water distribution systems. Environ. Sci. Technol. 42(12), 4285-4291. |
| Pd | >0 | <0 | −0.1-1.0 | −1.0-0.1 | 0-50 | \ | Pourbaix M. J. N., Van Muylder, J., and de Zoubev N. (1959) Electrochemical properties of the platinum metals. Platinum Metals. Rev. 3(3), 100-106. |
| Ag | >0 | <0 | −0.1-1.0 | −1.0-0.1 | 0-50 | \ | Kortenaar, M. V., de Goeij, J. J. M, Kolar, Z. I., Frens, G., Lusse, P. J., Zuiddam. M. R., and van der Drift, E. (2001). Electroless silver deposition in 100 nm silicon structures. J. Electrochem. Soc. 148(1), C28-C33. |
| Ir | >0.4 | <0 | −0.1-1.0 | −1.0-0.1 | 0-50 | \ | https://www.gamry.com/resources/electrochemical-calculators-tools/convert-potentials-to-another-reference-electrode/ |
| Pt | >0 | <0 | −0.1-1.0 | −1.0-0.1 | 0-50 | \ | Pourbaix M. J. N., Van Muylder, J., and de Zoubev N. (1959) Electrochemical properties of the platinum metals. Platinum Metals. A new approach to studies of corrosion resistance and cathodic protection. Rev. 3(2), 47-53. |
| Au | >0.8 | <0 | −0.1-1.0 | −1.0-0.1 | 0-50 | \ | https://www.doitpoms.ac.uk/tlplib/pourbaix/ pourbaix_example.php |
| Hg | >0.3 | <0 | −0.1-1.0 | −1.0-0.1 | 0-50 | \ | https://commons.wikimedia.org/wiki/File:Pourbaix-hg.png |
| Free Cl | <1.5 | <−1.0 | −0.1-1.0 | −1.0-0.1 | 0-50 | 1-3 | Debiemme-Chouvy, Catherine & Hua, Y & Hui, F & Duval, Jean-Luc & Cachet, H. (2014). Corrigendum to "Electrochemical treatments using tin oxide anode to prevent biofouling" [Electrochimica Acta 56/28 (2011) 10364-10370]. Electrochimica Acta. 121. 461.10.1016/j.electacta.2014.01.130 |
| Free Br | <1.2 | <−1.0 | −0.1-1.0 | −1.0-0.1 | 0-50 | \ | Ibid |
| Choramine | <1.4 | <−1.0 | −0.1-1.0 | −1.0-0.1 | 0-50 | 1-3 | www.sedimentaryores.net/Pipe%20Scales/ Chlorine-chloramine.html |

Figure 16:
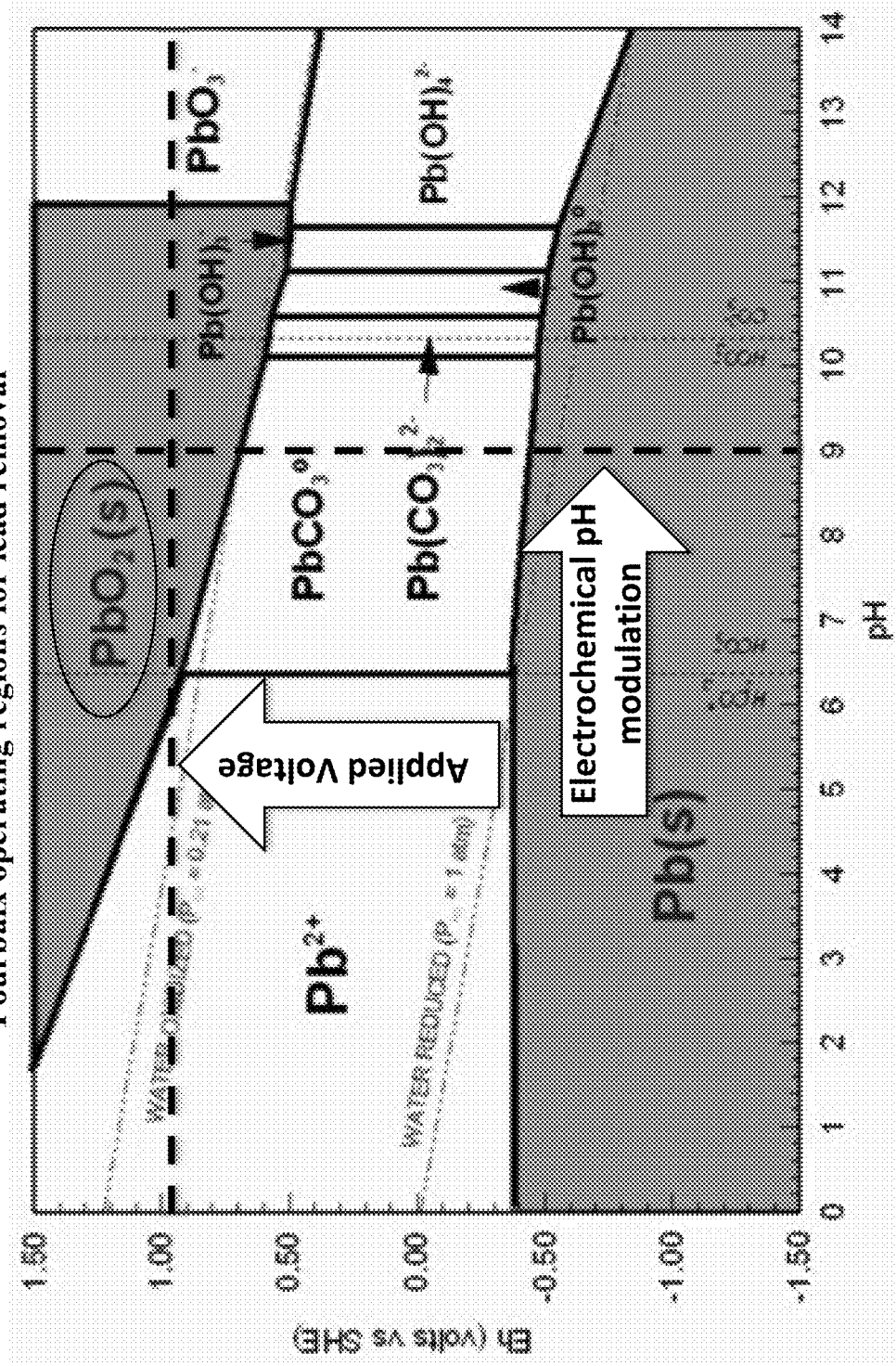
FIG. 16. Pourbaix diagram for Pb. (Schock, M. R., Hyland, R. N., and Welch, M. M. (2008). Occurrence of contaminant accumulation in lead pipe scales from domestic drinking-water distribution systems. Environ. Sci. Technol. 42(12), 4285-4291)

Other target species can be removed under similar mechanisms but under different voltage regions. For example, lead precipitation can occur from the pH and potentials that are generated on the electrode surfaces. At potentials more negative than ~0.4 V vs. NHE and pH regions from 0 to 14, lead can be plated as a solid at the cathode. Precipitation at the anode can also occur as $PbO_2$ if the pH is kept >1.5 and potentials >0.5 V vs. NHE are used (FIG. 16). Finally, oxidation from $H_2O_2$ generated at the cathode can also result in precipitation of target species. The rate of reduction of dissolved oxygen ("DO") near the cathode depends upon the oxidation of the cathode carbon, e.g., by oxidative shifting of the cathode $E_{PZC}$, or as a result of use in situ.

Figure 1:
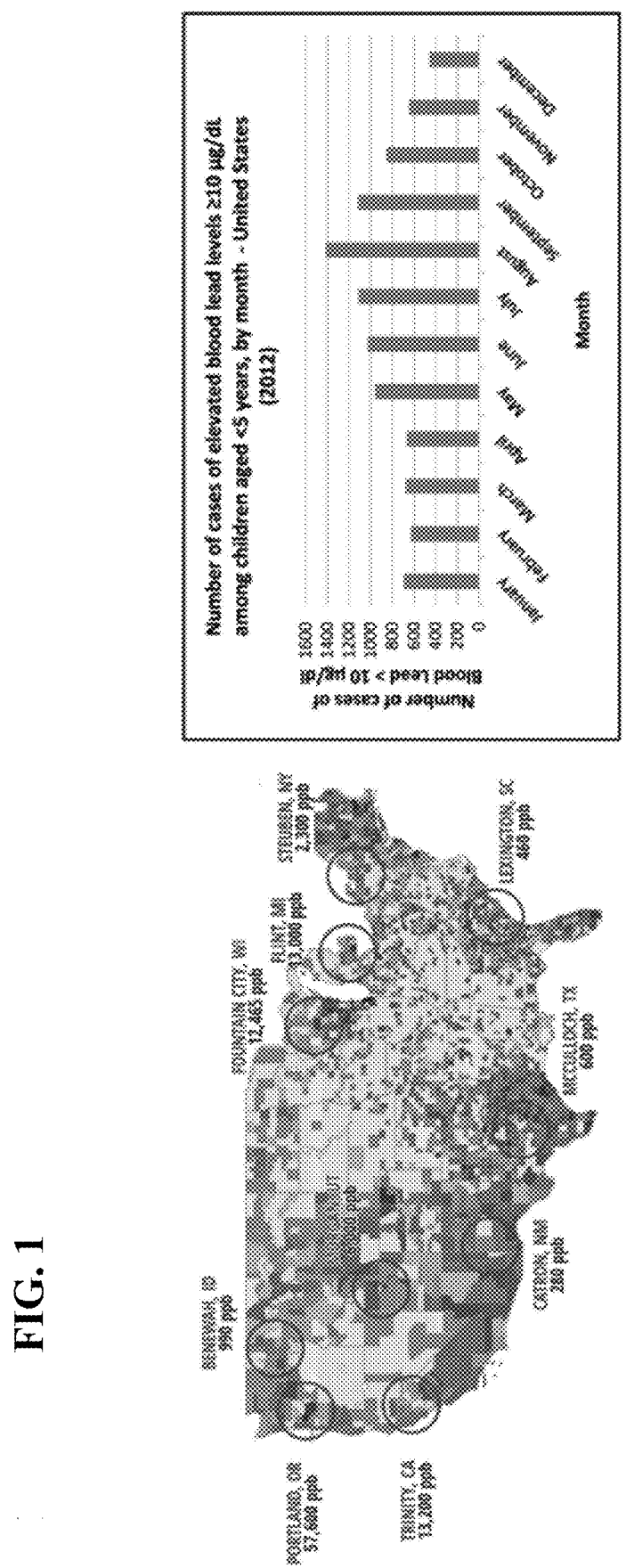
FIG. 1. A map the National Resources Defense Council produced of counties with water systems in violation of the EPA's Lead and Copper Rule (left), and number of cases of children with elevated blood lead levels in 2012 (right).
Figure 2:
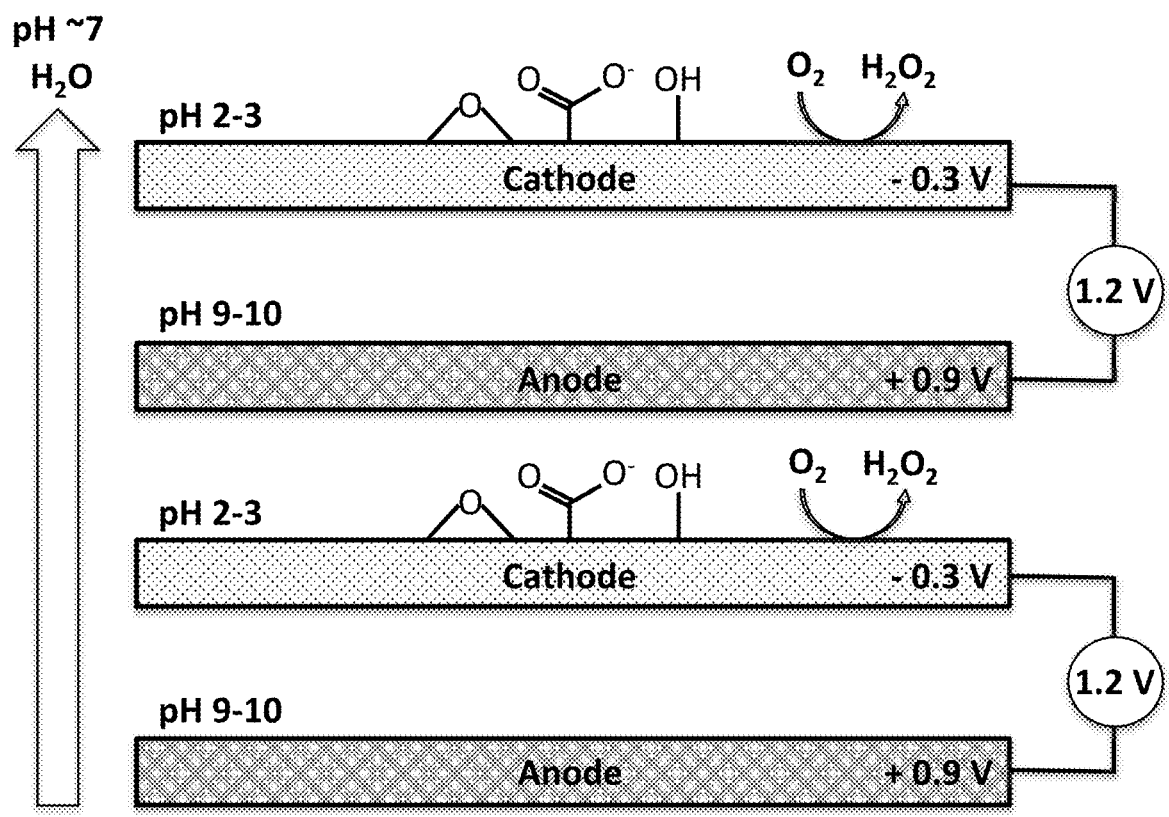
FIG. 2. Schematic of part of a CCC core. The schematic shows 2 pairs (anode and cathode per pair) of electrodes in a CCC core. A CCC typically has more than 10 pairs of electrodes.

Using the Pourbaix diagram for a material can define the pH and voltage needed in a faradaic porosity cell to remove target species of interest. A faradic porosity cell comprises a series of porous carbon anodes and cathodes, typically consisting of reduced cathodes (negative $E_{PZC}$ and positive surface charge) and pristine anodes (although anodes experience a positive $E_{PZC}$ shift ((negative surface charge)) during use), and operated by applying a small voltage, e.g., 1.2 V, across the electrodes. A schematic of an CCC embodiment of an FPC is shown in FIG. 2. An aqueous input stream to be purified is introduced into an FPC through an inlet to the cell; the electrodes in an FPC are immersed in the aqueous stream and a target species is removed from the through stream. After removal of a target species in an FPC, the through stream is discharged from the cell through an outlet for use, storage, or further processing. The electrodes of the cell are connected to a power supply that can apply E+ or E− to a given electrode. A core inventive step of an FPC is the precise matching of E+ applied to the cell anodes and E− to cell cathodes, pore mouth diameter profile of the electrode material, and selected Pourbaix operating region, thereby improving purification efficiency and improving cost/benefit. A Pourbaix diagram operating region shows speciation based on applied E and pH. In an FPC, speciation is driven by the potentials, E+ and E−, applied to the electrodes. Maintaining FPC operation in the selected Pourbaix operating region, with optimized pore mouth distribution ("PMD") profile electrodes, increases removal of the target species far beyond conventional adsorption that occurs on untreated electrodes.

A preferred average pore mouth diameter is in the range of 0.8 nm to 50 nm, and a more preferred average pore mouth diameter range is 2 nm to 20 nm. The applied potential causes redox reactions of the target species (e.g., plating, oxidation, reduction, peroxidation, etc.), and drives faradaic reactions on the carbon electrodes that will change the local pH regions at the anode (acidic) and cathode (basic). The combination of reactions of the target species and the change in pH is controlled by the applied potential. Applied E is typically at constant voltage and will reach a nearly constant current at steady state. Generally speaking, the applied voltage dictates which faradic reactions will occur within an FPC. An FPC will remove target species from a through stream without using treated (i.e., shifted $E_{PZC}$) electrodes, but target species removal may be greater in certain water chemistries when using treated electrodes. If treated electrodes are used, the working voltage window (the potential difference between anode $E_{PZC}$ and cathode $E_{PZC}$) is typically in the range if 0.3 V to 1.23 V.

The FPC invention combines adsorption (physical and capacitive) of target species (e.g., lead, iron, manganese, cadmium, chromium, chlorine, chloramine, etc.) and immobilization (aka coagulation) of the adsorbed target species by optimizing electrode porosity, applied E, and Pourbaix operating region. The optimization of (i) physical adsorption; (ii) capacitive adsorption; (iii) electrochemical pH modulation & target species immobilization; (iv) electrochemical peroxide ($H_2O_2$) generation; (v) electrodeposition (e.g., electroplating, electrophoretic deposition); (vi) electrochemical oxidation or reduction; (vii) precipitation; (viii) pore mouth diameter profile; (ix) electrode treatment, (x) electrode spacing, and (xi) flow-by vs. flow-through vs. carbon block cell design, depends upon target species, input stream water chemistry, and through stream water chemistry.

Reduction only occurs at the cathode of an FPC. Electrochemical reduction is usually described as an applied potential to the cell. The voltage distribution between anode and cathode occurs spontaneously based on the amount of applied voltage, the material properties of the electrodes, and the chemistry of the aqueous solution.

One embodiment of the invention is a capacitive coagulation system and method that uses one or more capacitive coagulation cells that remove metal ions or particulate metal for which a Pourbaix diagram exists, e.g. As, Se, Pb, Ni, Zn, Al, Sc, Ti, V, Cr, Mn, Fe, Co, Ni, Cu, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, and Lu, from an input stream by one or more of the following methods, each of which is a CCC Parameter: (i) physical adsorption; (ii) capacitive adsorption; (iii) electrochemical pH modulation & metal immobilization; (iv) electrochemical peroxide ($H_2O_2$) generation & metal oxidation; (v) electrodeposition (e.g., electroplating, electrophoretic deposition); (vi) electrochemical oxidation or reduction; (vii) precipitation; (viii) pore mouth diameter profile; (ix) electrode treatment, (x) electrode spacing, and (xi) flow-by vs. flow-through vs. carbon block cell design. A CCC can remove lead from water to produce water with lead concentrations below the EPA action level of 15 ppb for potable or irrigation water.

Compared to prior art devices, Applicant's CCC has higher specificity for lead and other metals, removes both dissolved and particulate lead and other metals, has a device lifetime that can be measured in years rather than days or weeks, and uses low cost materials. Applicant's CCC achieves its longevity and efficiency by combining electrochemistry and carbon materials to provide a system that is not saturated, fouled, or inhibited by other constituents in the water such as iron, volatile organic compounds (VOCs), particulates, and natural organic matter (NOM). Applicant's device lifetime is multi-fold longer than the prior art technologies of carbon filtration, ion-exchange filtration, zeolite adsorbents, and reverse osmosis (RO).

Figure 13:
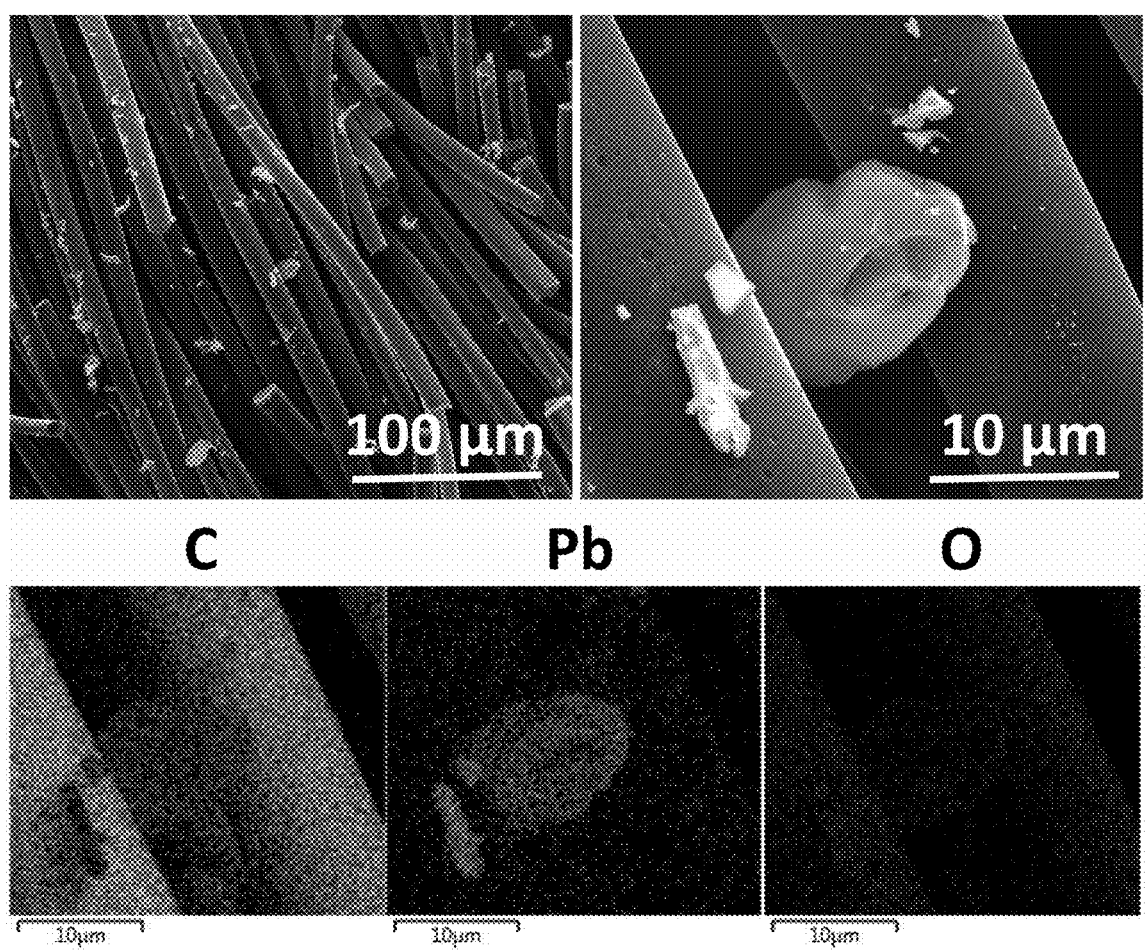
FIG. 13. SEM micrographs and EDX mapping showing the end fate of immobilized lead species. Carbon (C), lead (Pb), and oxygen (O) are mapped in the three panels below, represented by the lightest contrast in each corresponding gray scale image. The carbon electrodes are shown as black and the copper as gray in the grayscale equivalent of the photo. Color photograph of EDX mapping is available.

Combining in a CCC an optimized PMD, applied E, chemical manipulations, and electrochemical manipulations facilitates immobilization (coagulation) of lead onto the carbon electrodes. The adsorbed lead is permanently removed from solution (FIG. 13). This methodology is easily adaptable and applicable to the treatment of iron, manganese, cadmium, chromium, and other metals and metal derivatives. "Tuning" a CCC primarily means selecting (i) a voltage applied between CCC anodes and cathodes based on (ii) analyzing and selecting an operating region in the target species' Pourbaix diagram, and (iii) selecting a pore mouth diameter profile of the CCC carbon electrodes that maximizes removal of a target species. The effluent from an CCC can be used without further processing or can be routed to one or more EDCs, CCCs, or prior art water purification cells for further removal of other target species. Tuning can optionally be further optimized through electrode treatment.

Metal speciation and chemistries can be exploited to selectively remove lead (and other target metals) from water with high efficacy and selectivity, regardless of water chemistry. Through this operation, Applicant's CCC (i) can electrochemically, chemically, and physically remove lead and other target species from drinking water sources, eliminating the need for multiple separation techniques that are currently necessary and driven by varying input stream conditions and pH, and (ii) solves the technical problem of providing a more efficient, less expensive, scalable device for purifying drinking water and process water, especially a device that removes soluble and insoluble lead to below 15 ppb. Adjustment of pH of an input stream may be necessary to improve agglutination of a target species, especially for removal of metals.

In an EDC embodiment of the FPC technology, the EDC Parameters are "tuned" to remove other non-metal target species, e.g., chlorine, chloramines, and other halides and halide derivatives, from the EDC influent. "Tuning" an EDC primarily means selecting (i) a voltage applied between EDC anodes and cathodes based on (ii) analyzing and selecting an operating region in the target species' Pourbaix diagram, and (iii) selecting a pore mouth diameter profile of the EDC carbon electrodes that maximizes removal of a target species. The effluent from an EDC can be used without further processing or can be routed to one or more EDCs, CCCs, or prior art water purification cells for further removal of other target species. Tuning can optionally be further optimized through electrode treatment. Device features and benefits are listed below and in Table 2 and Table 3 in the Drawings.

TABLE 2

Detailed benefits of PTW EDC for chlorine removal

| Parameter | Prior Art | PTW EDC |
|---|---|---|
| Capacity (gallons) | 1000 | 100,000 |
| Free Cl Removal | >99% | >99% |
| Residence Time (seconds) | 80 | 10-15 |
| Operating Cost ($/1000 gallons) | $20-$50 | $ 0.1 |
| Carbon Mass (g) | 200+ | 30 |
| Footprint (sq ft) | 0.133 | 0.130 |

TABLE 3

Detailed benefits of PTW EDC for chloramine removal

| Parameter | Prior Art | PTW EDC |
|---|---|---|
| Capacity (gallons) | 100 | >3000 |
| Chloramine Removal | 75-90% | up to 99% |
| Residence Time (seconds) | 80 | 10-15 |
| Operating Cost ($/1000 gallons) | $200-$500 | $30 |
| Carbon Mass (g) | 200+ | 30 |
| Footprint (sq ft) | 0.133 | 0.130 |

An EDC or CCC optionally uses treated anodes and cathodes made of carbon in which the one or both electrodes' $E_{PZC}$ has been shifted compared to a pristine electrode $E_{PZC}$. Shifting the $E_{PZC}$ of an electrode can change the kinetics of reactions occurring (either positively or negatively). Whether to shift only anodes, or only cathodes, or both types of electrode, and how much $E_{PZC}$ shift to use, depends upon input water chemistry and the target species.

Carbon electrodes are superior to metal electrodes in avoiding or reducing electrolysis, or water splitting, when potentials as high as 3 V are applied to an electrode. An applied potential of more than 1.23 V ("overpotential") can cause electrolysis of water, which produces dangerous hydrogen gas. Metal electrodes can cause hydrogen gas production at <2 V; in contrast, carbon electrodes can sustain higher applied voltages while avoiding substantive water electrolysis.

The inventive steps of an EDC are: (i) decreased power consumption required for reduction of chlorine and chloramines (responsible for taste and odor) through specific carbon electrodes and applied voltage, (ii) can be used on-demand or as continuous treatment, (iii) very scalable, simple design that provides significantly lower cost POU/POE devices as well as lower cost municipal, commercial, and industrial large-scale systems, (iv) similar performance to traditional carbon blocks (such as activated carbon/activated charcoal) but with significantly less carbon needed, (v) similar removal performance of free chlorine with a much shorter residence time, (vi) the use of less carbon, (vii) longer electrode life, especially for the removal of chlorine and chloramine, (viii) finer control over specific removal amounts and output water quality, (ix) better control over balancing rate of target species removal vs. electrode life, and (x) FPC cost/benefit can be adjusted by choice of carbon for FPC electrodes.

DETAILED DESCRIPTION OF THE PREFERRED EMBODIMENTS

During capacitive charging processes, a constant current or voltage is used to charge electrode surfaces for the purposes of energy storage, desalination, or other useful capacitive techniques. Charging and subsequent discharging of electrodes is often carried out for thousands of cycles over a range of voltages and currents, depending on the intended application. Carbon electrodes made of activated carbon are often employed for these capacitive-based charging and discharging processes due to (i) their high specific surface area and resulting high capacitance, and (ii) opportunities to add functional groups to effect surface modifications that improve, inter alia, metal and other target species removal, energy storage and deionization (e.g., desalination of seawater or brackish water). Activated carbon is a form of carbon processed to have numerous small, low-volume pores that increase the surface area available for adsorption or chemical reactions. An FPC can be used to purify wastewater, cooling water, laundry wastewater, water to be purified for human consumption, water to be purified for agriculture, water to be purified for horticulture, water to be purified for use in food, water to be softened, sea water to be purified for human consumption, water to be purified for laboratory use, brackish water to be purified for human consumption or agriculture use, and water to be purified for medical use.

The distribution of pore sizes in a carbon electrode is a critical FPC Parameter that has been overlooked in the prior art of water purification.

Figure 9:
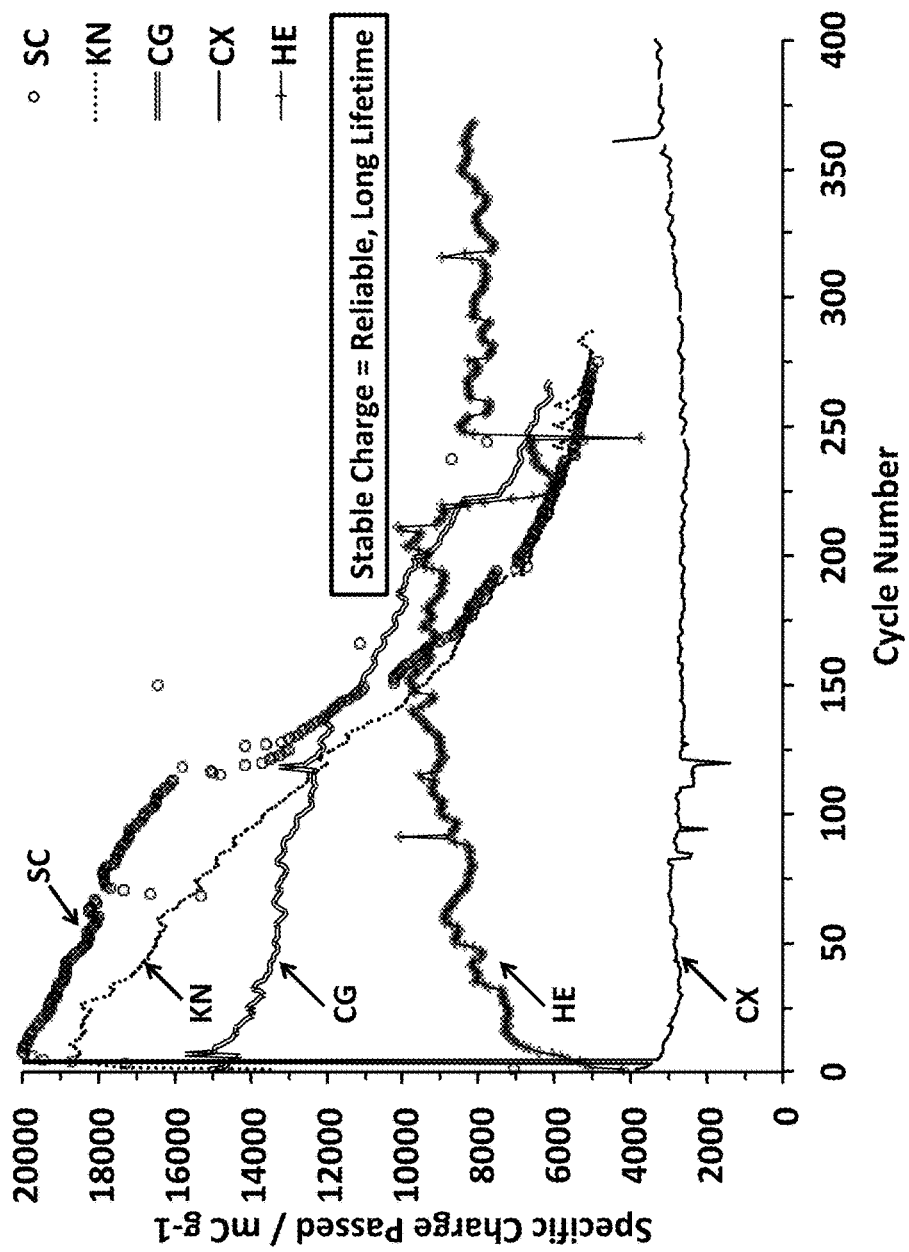
FIG. 9. Charge passed with commercially available microporous carbon [Spectracarb (SC) and Kynol (KN)], a predominately mesoporous carbon [Calgon (CG)], a mesoporous carbon [Carbon Xerogel (CX)], and the inventor's high-efficiency (HE) carbon electrodes, while cycling between applied and short-circuited voltages. The order of the carbon types in the legend is also the order of the starting specific charge passed (y-axis) traces, except CX has a lower y-axis value than HE.

Electrode properties are shown in Table 4; the electrode suppliers are recited in the first column of Table 4. The pore size, or pore mouth diameter ("PMD"), is extremely important in terms of maintaining charge passed and is directly related to the lifetime of the EDC electrodes. PMD is customarily used as representative of the diameter of the associated pore channel within a carbon electrode. FIG. 9 demonstrates the effect of PMD on stability of charge passed. A pore channel (and even the pore mouth) may "collapse" (more accurately, the pore becomes occluded)

after repeated cycles of application of a voltage or potential followed by reverse voltage or potential (or short circuiting or open circuiting of anode(s) and cathode(s)). The pore mouth becomes "roofed" and/or the pore channel becomes "closed", decreasing the surface area of the carbon (esp., the pore channel diameter and length) so that the pore no longer functions effectively. A "roofed" pore mouth blocks access to the interior of the pore. Pore mouth roofing and pore channel collapse cause a decrease in electrode performance and eventual failure of prior art cells.

TABLE 4

Carbon electrode properties

| Carbon | Conductivity (S/cm) | PMD (nm) | Surface Area ($m^2/g$) |
|---|---|---|---|
| Calgon | 0.2 | 1.2-3 | 1000-2000 |
| Kynol | 1.2 | 2.2 | 2000 |
| Fuel Cell Earth | 900 | N/A | <2 |

In an FPC, a target species, if ionized, bearing an electrical charge, or bearing a partial charge due to the asymmetric distribution of electrons in chemical bonds, can be attracted to the carbon electrode due to the applied potential, which produces a driving force to move the target species close to (or in contact with) the carbon electrode. Non-ions and non-charged species of a target species can collide with an electrode surface. Once in contact with the electrode surface, numerous pathways to immobilization of the target species can occur. Local and large pH swings can be controlled to electrochemically produce an alkaline environment, which will produce, e.g., insoluble metal oxides, that precipitate near or on the electrodes and are entrapped in electrode pores. Faradic reactions, such as oxygen reduction reactions at the cathode, can produce hydrogen peroxide which can diffuse away from the electrode and oxidize target metal molecules that are within close proximity: hydrogen peroxide performs indiscriminate oxidation. When target species closer to the electrode are in a localized higher concentration, the statistical chance for hydrogen peroxide to oxidize the target species is greater. Other faradic reactions, such as direct electron transfer (reduction or oxidation) between the target species and electrode can also occur. Once the target species has been attracted to the electrode surface, the carbon electrode can (1) transfer an electron(s) from the electrode to the target species and reduce it so that it is deposited onto the electrode or (2) transfer an electron(s) from the target species to the carbon electrode and oxidize the target species into either an insoluble oxide or hydroxide, or into a more reactive species that can be immobilized through additional electron transfer reactions or pH adjustments. Precipitated species and electrically attracted species are entrapped in electrode pores.

The size and volume of actual pores in activated carbon depend upon the shape, tortuosity (which is usually associated with changes in pore diameter), and channel length of a given pore. Based on micrographs of activated charcoal, and depending on the activation and/or synthesis procedures, some pores in activated carbon can be tubular channels, polygonal channels, spheroid chambers, surface slits, etc. Channels and chambers can be "dead end" or "through" (i.e., a channel or chamber with two surface appearances, aka "pore mouths", with channel continuity between the two pore mouths). Pores in activated carbon are generalized as being tubular channels that have an average pore channel diameter (hereinafter "pore channel diameter") and an average pore mouth diameter. Measuring actual pore channel diameter of billions of pores that rarely have a constant pore channel diameter in a mass of activated carbon is a herculean task, and not reported here. As a generalization, the pore channel diameter is assumed to be identical to the pore mouth diameter.

The diameter of a pore mouth, i.e., the opening of a pore to electrolyte, has a major, and in small pore mouth diameters, predominant, impact on the utilization of that pore for adsorption and on multi-cycle performance in capacitive coagulation. A larger pore mouth diameter (and therefore, pore mouth surface area) will provide significant contact area between the pore channel and the electrolyte. A small pore mouth diameter will have more limited contact area (i.e., "pore mouth surface area"). Pore mouth diameters are defined by IUPAC as microporous, mesoporous, and macroporous with pore mouth diameters of <2 nm, 2-50 nm, and >50 nm, respectively. The lifetime of an adsorption medium has a direct correlation to the pore mouth diameter present on the surface of the material. The concept and ramifications of "pore mouth roofing", aka pore mouth closure, after repeated cycles of adsorption and desorption using an activated carbon electrode, is explained below. A pore mouth "roofs" or "closes", and a pore channel "collapses", after repeated polarity reversal cycles of an FPC so that the surface area of the pore no longer functions effectively in entrapment and adsorption of target species.

Applicant's device incorporating capacitive coagulation technology removed soluble (dissolved) and insoluble (particulate) lead species from tap water to well below the EPA action level in samples spiked with concentrations up to ~300 ppb lead. Efficient lead removal was even demonstrated with concentrations of lead as low 5 ppb in input streams, well below the action level. The prototype device achieved ≥90%, and frequently >99%, specificity for lead removal over other constituents commonly found in tap water, such as calcium ($Ca^{2+}$). Applicant's capacitive coagulation invention was able to achieve this performance in hard, alkaline water where lead species tend to form complexation species that are difficult to remove by commercial off-the-shelf products. A CCC is also unexpectedly capable of removing both soluble (dissolved) and insoluble (particulate) lead, arsenic, nickel, and copper species.

Applicant's capacitive coagulation invention provides in one embodiment for lead removal a POU/POE water purification device capable of meeting NSF/ANSI 53 and 61 certifications at a minimum flow rate of 1 gallon per minute (gpm) regardless of input water source conditions: hardness, pH, alkalinity, and types of disinfection. Additionally, the device is (i) highly specific for target metals, e.g., arsenic, lead, nickel, copper, cadmium, lead, manganese, mercury, and radioactive metals, (ii) more reliable, (iii) more efficient, and (iv) lasts longer than state-of-the-art solutions. Applicant's capacitive coagulation cells provide a more efficient, less expensive, and very scalable water purification device that removes soluble and insoluble lead to below 15 ppb and is suitable for residential as well as scale-up to higher-throughput systems. A detailed Example below focuses on lead removal using capacitive coagulation cells, but adjustment of CCC parameters permit "tuning" of a CCC to remove any other metal or metal derivative for which a Pourbaix diagram exists, such as arsenic, cadmium, manganese, and mercury, as well as Se, Ni, Zn, Al, Sc, Ti, V, Cr, Fe, Co, Ni, Cu, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Er, Tm, Yb, and Lu.

Figure 3:
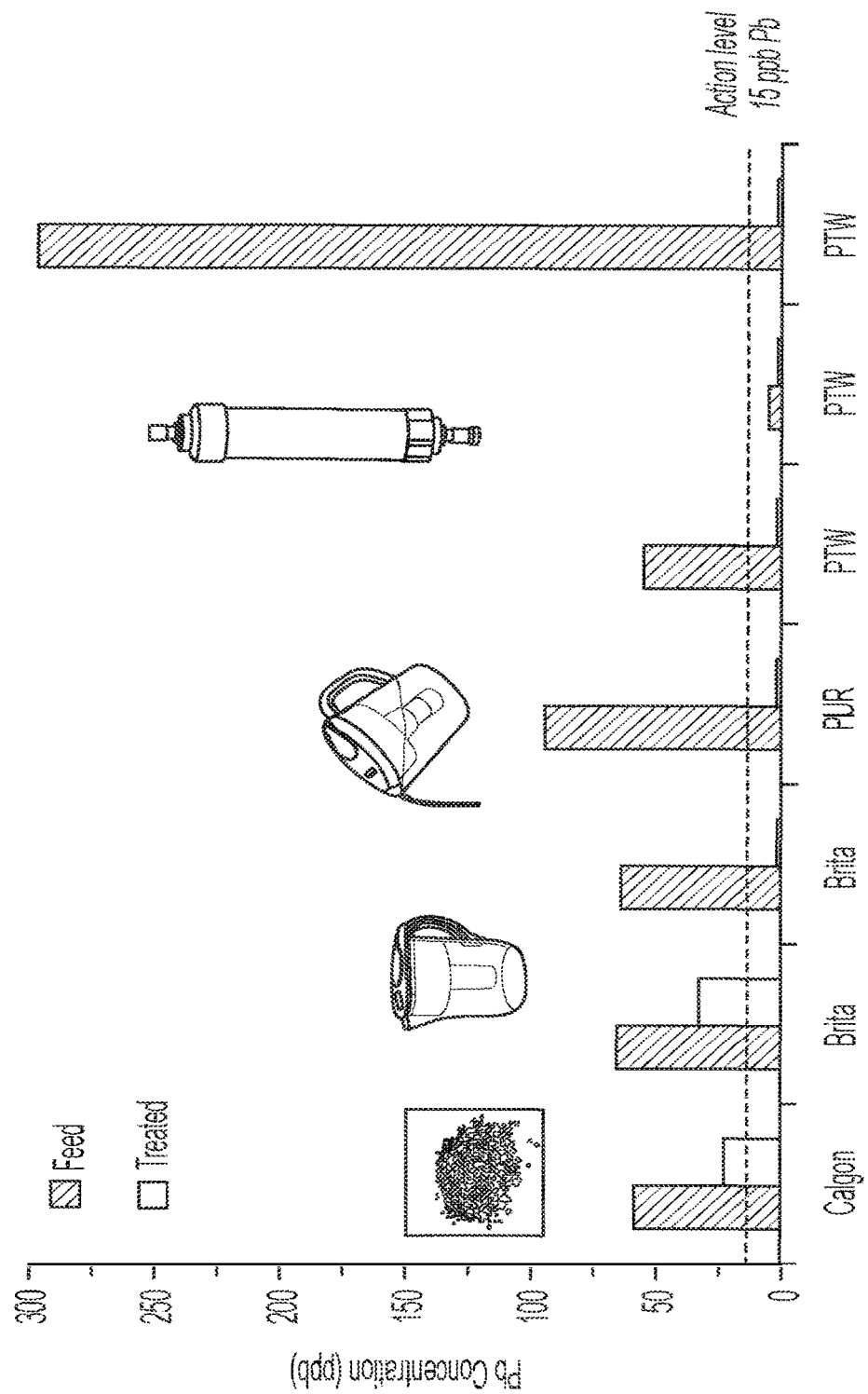
FIG. 3. Lead removal comparison of Applicant's CCC device to commercially available prior art POU devices. Applicant's CCC, denoted as "PTW" in FIG. 2, was tested with different municipal water chemistries that had lead content above the EPA action level. Applicant's CCC outperformed all prior art devices.

In a head-to-head comparison shown in FIG. 3, Applicant's CCC outperformed commercially available POU/POE water purification devices, such as the Brita® Longlast™ and Brita® PUR filters and the Calgon GAC filter material. The Brita® Longlast™ pitcher filter had drastically different performance when tested on two different days based on the change in water chemistry being supplied by the municipal water system in Lexington, Ky. This differing performance emphasizes the need for a more reliable device that performs well in varying water chemistries that occur from day-to-day. Applicant's invention outperformed the Brita® Longlast™ device in both instances.

Figure 4:
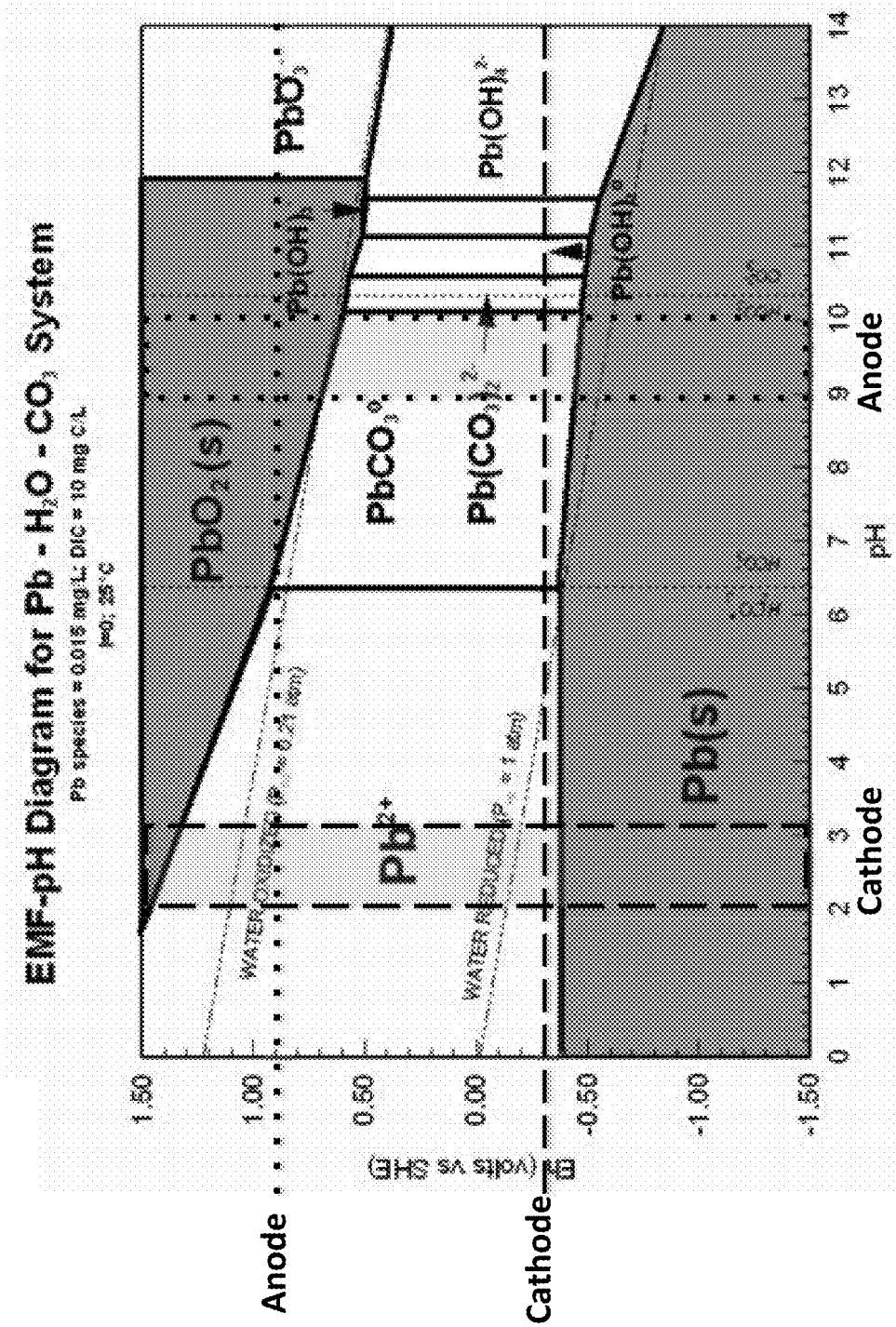
FIG. 4. Pourbaix diagram of lead (Pb) in a carbonate solution showing the Pourbaix operating regions for lead species removal at the intersection of E applied to anode and cathode and resultant pH near each electrode.

Soluble lead ions adsorb onto the carbon electrodes by physical and/or chemical adsorption, a process that is well documented (J. Chem. Technol. Biotechnol. 2002, 77, 458-464, Shekinah, P.; Kadirvelu, K.; Kanmani, P.; Senthilkumar, P.; Subburam, V. and Carbon. 2004, 42, 3057-3069, Swiatkowski, A.; Pakula, M.; Biniak, S.; Walczyk, M.), and undergo additional electro-adsorption onto the cathode under an applied potential. Modulation of the pH can also be exploited to control lead speciation in tap water. At an operating voltage of 1.2 V (as shown in FIG. 4), the potential distribution across the device yields +0.9 V at the anode and −0.3 V at the cathode, and the pH fluctuates between the electrodes, producing a near neutral pH in the bulk. However, while the bulk pH remains relatively constant, there are significant pH swings (aka "plugs") from as acidic as pH 2 and as alkaline as pH 10, which impart significant changes in acid/base chemistry on an electrode surface. Relating the voltage and pH at each electrode to a Pourbaix diagram, operating conditions can be selected to obtain the desired lead speciation in a given water chemistry (FIG. 4, where DIC is dissolved inorganic carbon). A similar approach to manipulating pH was utilized to remove boric acid using capacitive deionization (CDI). Electrochimica Acta. 2011, 56, 248-54, Avraham, E.; Noked, M.; Soffer, A.; Aurbach, D. For most residential and commercial uses, input stream pressure is less than 60 psi, and the porosity of the electrodes typically avoids more than a 20 psi drop at an FPC outlet compared to inlet pressure.

Multiple mechanisms of action occur simultaneously for lead removal during operation in a CCC: physical and electrochemical adsorption, pH modulation yielding acid/base chemistry, and electrochemical/chemical oxidation generating lead oxides and other insoluble species. The effect of applied potential and $H_2O_2$ generation on lead removal from tap water was verified by experimental data. As shown in Table 5, there is some physical adsorption of lead with the carbon electrodes at open circuit. At short-circuit there is a slight improvement in lead removal, but the most dramatic result occurs at an applied voltage of 1.2 V, where the lead concentration drops to nearly 0 ppb. "Feed" is the input stream, and "treated" is the output stream, in the CCCs used in the experiments.

TABLE 5

Lead removal at different applied potentials

| Applied Potential | Sample | $Pb^{2+}$ Concentration (ppb) |
| --- | --- | --- |
| None (open circuit) | Feed | 57.28 |
|  | Treated | 16.14 |
| 0 V (short-circuit) | Feed | 55.26 |
|  | Treated | 10.14 |
| 1.2 V | Feed | 38.04 |
|  | Treated | 2.89 |

Figure 5:
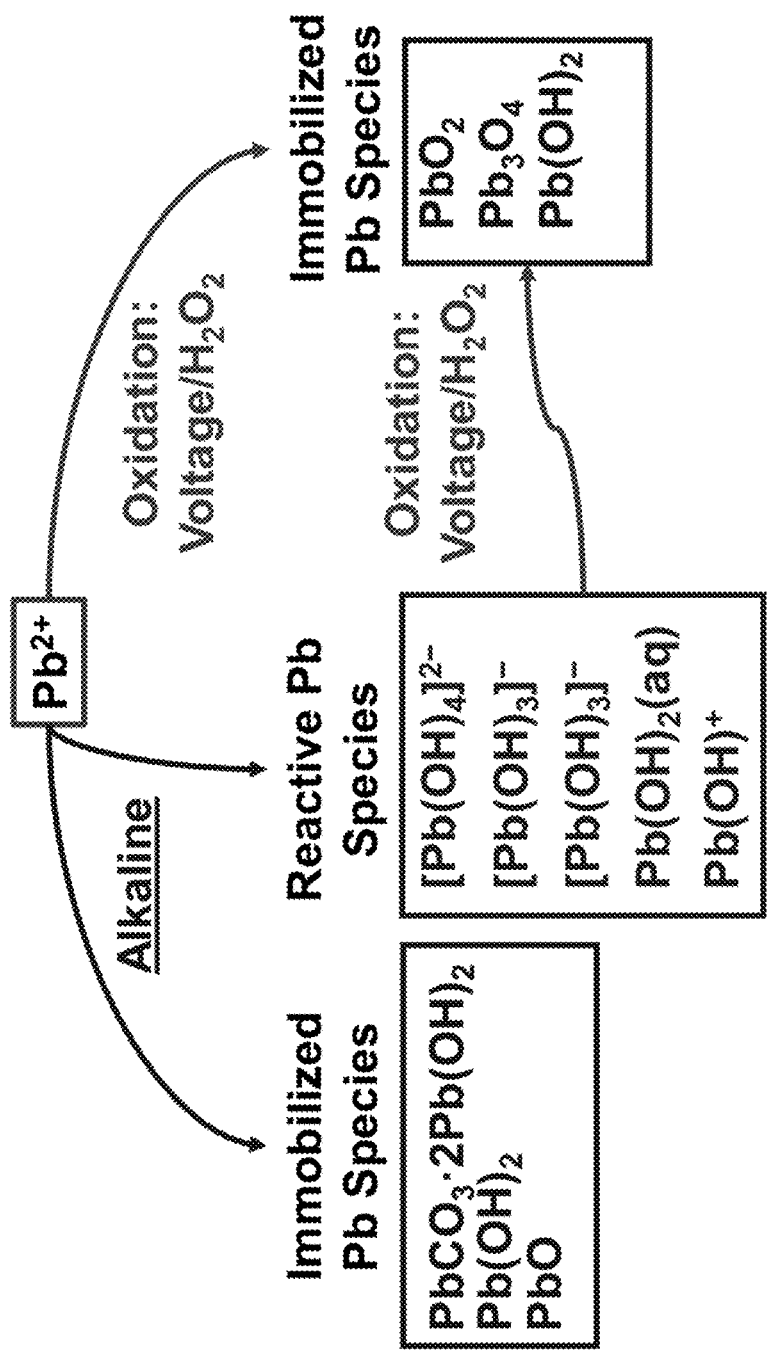
FIG. 5. Agglutination mechanisms for lead (Pb) removal showing lead speciation and pathways for immobilization of Pb species.

FIG. 4, in the Pourbaix diagram of lead (Pb) in a carbonate aqueous solution, shows the Pourbaix operating regions for lead species removal in a CCC at the intersection of E applied to anode and cathode. In a flow-through cell, FIG. 2 shows that the pH region at the start of the cathode is acidic (pH 2-3) while at the start of the anode, it is basic (pH 9-10). In a flow-through cell design (FIG. 2), these pH regions are a result of the reactions that take place at the electrode surfaces and yield fluctuations in pH from 2-10. In FIG. 4, $Pb^{2+}$ is in solution equilibrium in most of the white area (approximately pH 7) between the darker $PbO_2(s)$ and Pb(s) areas; however, in the solution nearest the anode and cathode, $Pb^{2+}$ becomes (i) reactive or (ii) immobilized as other Pb species. FIG. 5 shows the reaction mechanisms by which Pb is removed from solution. In a flow-through cell, the alkaline (pH 9 to pH 10) region near the anode (at applied E of 0.9 V, emanating from the pH generated from the cathode), $Pb^{2+}$ is immobilized (adsorbed on the anode) as $PbCO_3$-$2Pb(OH)_2$, $2Pb(OH)_2$, and $PbO_2$. In the alkaline region near the anode, $Pb^{2+}$ also forms ionic compounds and lead hydroxide (as shown in the middle box of FIG. 5) that are then oxidized into $PbO_2$, $Pb_3O_4$, and $Pb(OH)_2$, which reaction products are then immobilized (adsorbed). Also in a flow-through cell, hydrogen peroxide, generated at the cathode from dissolved oxygen reduction and combined with the acidic pH emanating from the anode (pH 2 to pH 3) with an applied E of −0.4 V is a potent oxidizer. Hydrogen peroxide diffuses into the through stream, including the region near the anode where it oxidizes lead species in the intermediate reactions described above. The immobilized lead species are thereby removed from solution. Additional lead species are susceptible to immobilization through reactions with hydrogen peroxide that is generated via oxygen reduction at the cathode ("peroxidation cell"). Water Research. 2017, 120, 229-237, Tang, W.; He, D.; Zhang, C.; Kovalsky, P.; Waite, T. D. In a hybrid system, FPCs can be using in series with peroxidation cells to provide increased lead removal.

Figure 6:
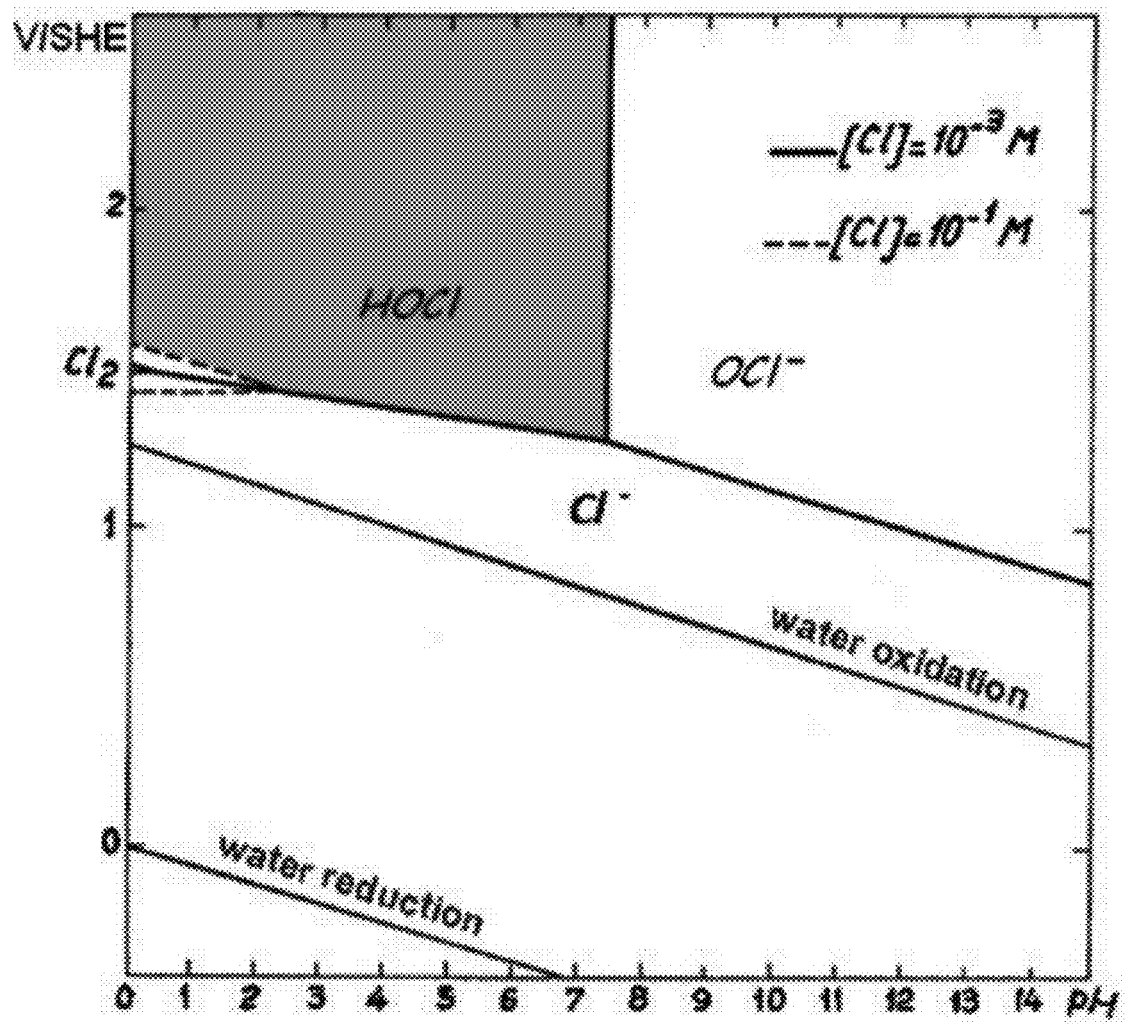
FIG. 6. Pourbaix diagram for hypochlorite. (Debiemme-Chouvy, Catherine & Hua, Y & Hui, F & Duval, Jean-Luc & Cachet, H. (2014). Corrigendum to "Electrochemical treatments using tin oxide anode to prevent biofouling" [Electrochimica Acta 56/28 (2011) 10364-10370]. Electrochimica Acta. 121. 461. 10.1016/j.electacta.2014.01.130.)
Figure 7:
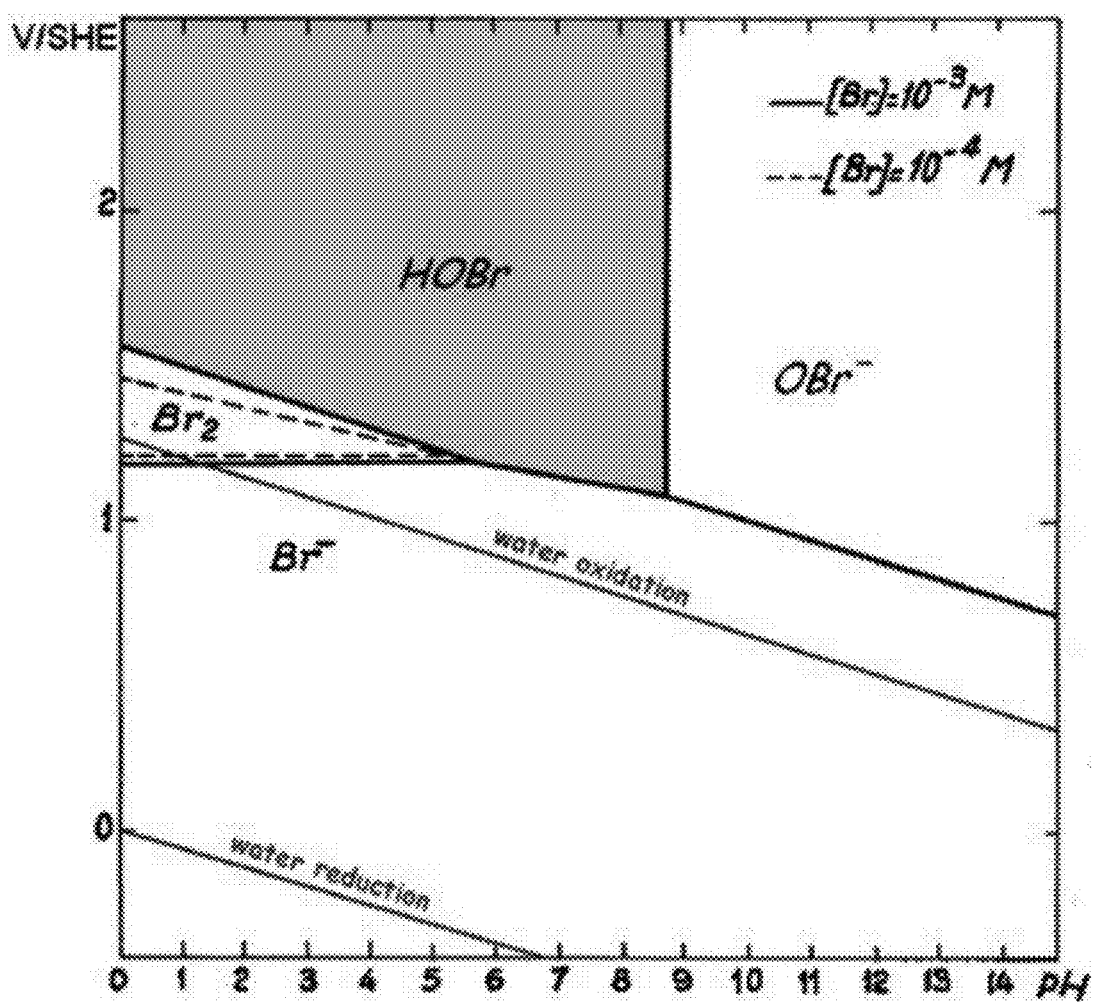
FIG. 7. Pourbaix diagram for hypobromite. (Ibid.)
Figure 8:
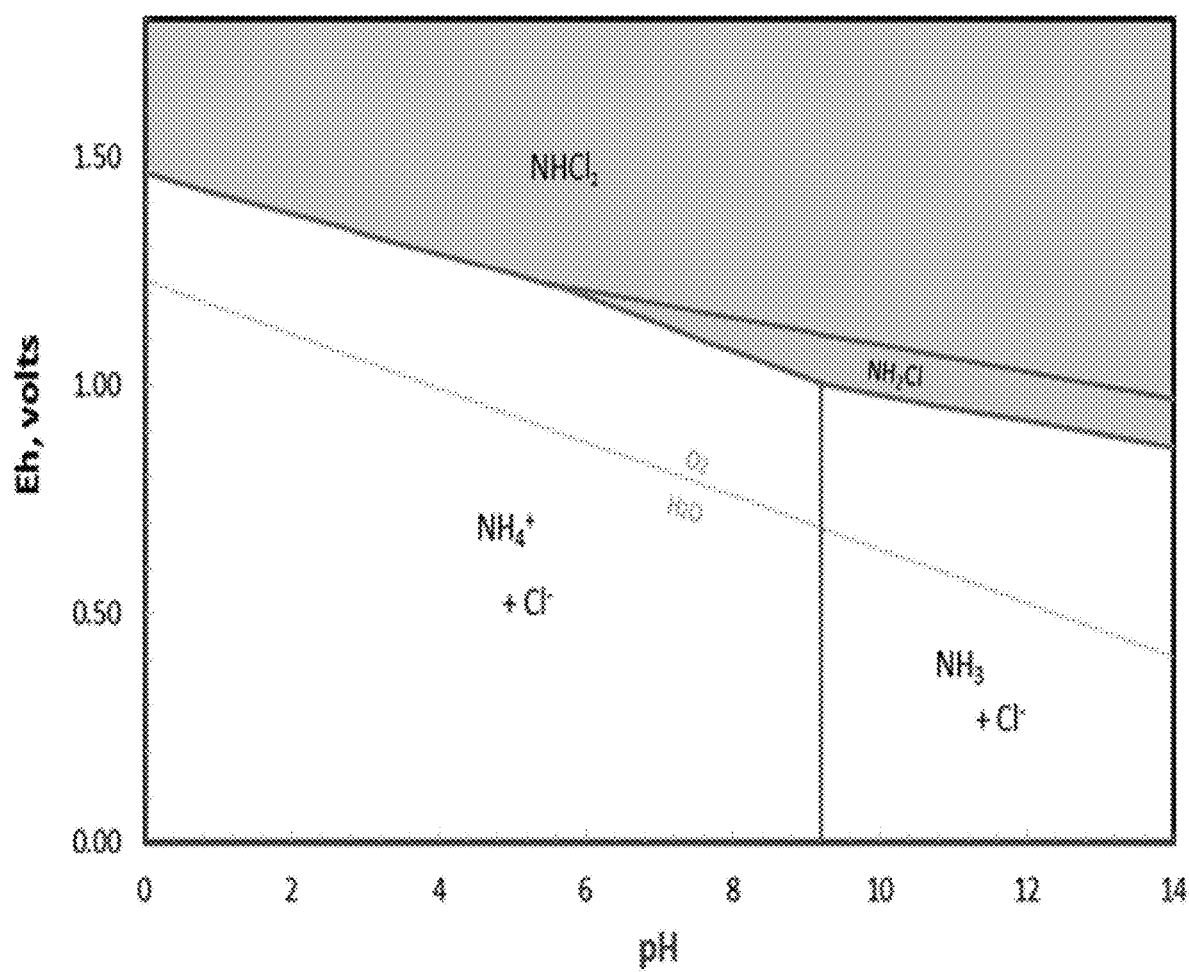
FIG. 8. Pourbaix diagram for mono chloramine ($NH_2Cl$). (www.sedimentaryores.net/Pipe %20Scales/Chlorine-chloramine.html)

In an EDC, a cascading series of chemical-electrochemical-chemical-electrochemical reactions are occurring to decompose free chlorine and chloramine. The pH and operating voltage are correlated through the Pourbaix diagram for a target species. Examples are given below for hypochlorite, hypobromite, and monochloramine and shown in FIG. 6, FIG. 7 and FIG. 8, respectively. Based on the pH and potential distributions at each electrode, the target speciation can be controlled by selecting the pH and voltage to apply. This calibration process determines and controls what species are decomposed at what voltage and in a given influent water chemistry. In FIGS. 6-8, the y-axis is voltage applied between the anode and cathode vs. a standard hydrogen electrode (SHE), and the x-axis is pH.

With reference to FIG. 6, at anode potential of <1.5 V vs. NHE and a total cell potential of <2.5 V applied across anode and cathode, electrochemically generated hydrogen peroxide reacts with "free chlorine" in solutions with pH >7. Direct electrochemical reduction of hypochlorous acid (HOCl) and hypochlorite (OCl⁻) from the carbon cathode converts them into free chloride ions and water. The chloride ion is then capacitively adsorbed (immobilized). While there is no upper limit to the pH (e.g., $H_2O_2$ can be used to dechlorinate effluent from caustic/chlorine odor scrubbers), as a practical matter, pH 8.5 is preferred in order to provide an instantaneous reaction.

With reference to FIG. 7, a Pourbaix diagram for hypochlorite, at an anode potential <1.2 V vs. NHE, a cathode potential of >−1.0 V vs. NHE, and a total cell potential of <2.2 V applied across anode and cathode, electrochemically generated hydrogen peroxide reacts with "free bromine" in solutions with pH >7. Direct electrochemical reduction of hypobromous acid (HOBr) and hypobromite (OBr⁻) from the carbon cathode converts them into free chloride ions and water. The bromine ion is then capacitively adsorbed (immobilized).

With reference to FIG. 8, a Pourbaix diagram for mono chloramine, at an anode potential <1.4 V vs. NHE, a cathode potential of >−1.0 V vs. NHE, and a total cell potential of <2.4 V applied across anode and cathode, direct electrochemical changes in chloramine under acidic conditions produces the ammonium salt. Electrochemically generated (at an EDC cathode) hydrogen peroxide reacts directly with chloramine to produce a mixture of products: chloride ions, nitrite ions, protons (acid), and water. Chloramine reacts with electrochemically generated hydrogen peroxide to produce ammonia which will react further in 2 ways: 1) reaction with electrochemically generated hydrogen peroxide to yield nitrogen and hydrogen gas and water, or 2) reaction with acid to yield ammonium salts. Chloramine will also react directly with electrochemically generated acid in a cascade process to yield trichloramine which is converted into hypochlorous acid in water.

EDCs typically operate with total cell potential of <3.0 V applied across anode and cathode; depending upon target species and input water chemistry, total cell potential of <3.0 V applied across anode and cathode in an EDC is usually between 1.0 V to 3.0 V.

As shown in FIG. 9, the active surface area of SC, KN, and CG carbon electrodes decreases from exposure to cycles of an applied voltage. CX's specific charge passed is stable over repeated cycles, but is lower than the other carbons tested. In contrast, Applicant's HE electrode, formulated with PMD, performs better than the other electrodes after about 220 cycles, and maintains superior performance. In the SC, KN, CG, and CX electrodes, oxide groups form on the surface causing pore roofing and pore collapse, resulting in increased resistance (bulk oxidation). Alternatively, oxide groups can form a resistive oxide layer (surface oxidation). Both scenarios require that the applied voltage increase, according to Ohm's law, to maintain the same amount of current to compensate for this increase in resistance: V=IR, where V is voltage (V), I is current (A), and R is resistance (a).

Figure 10:
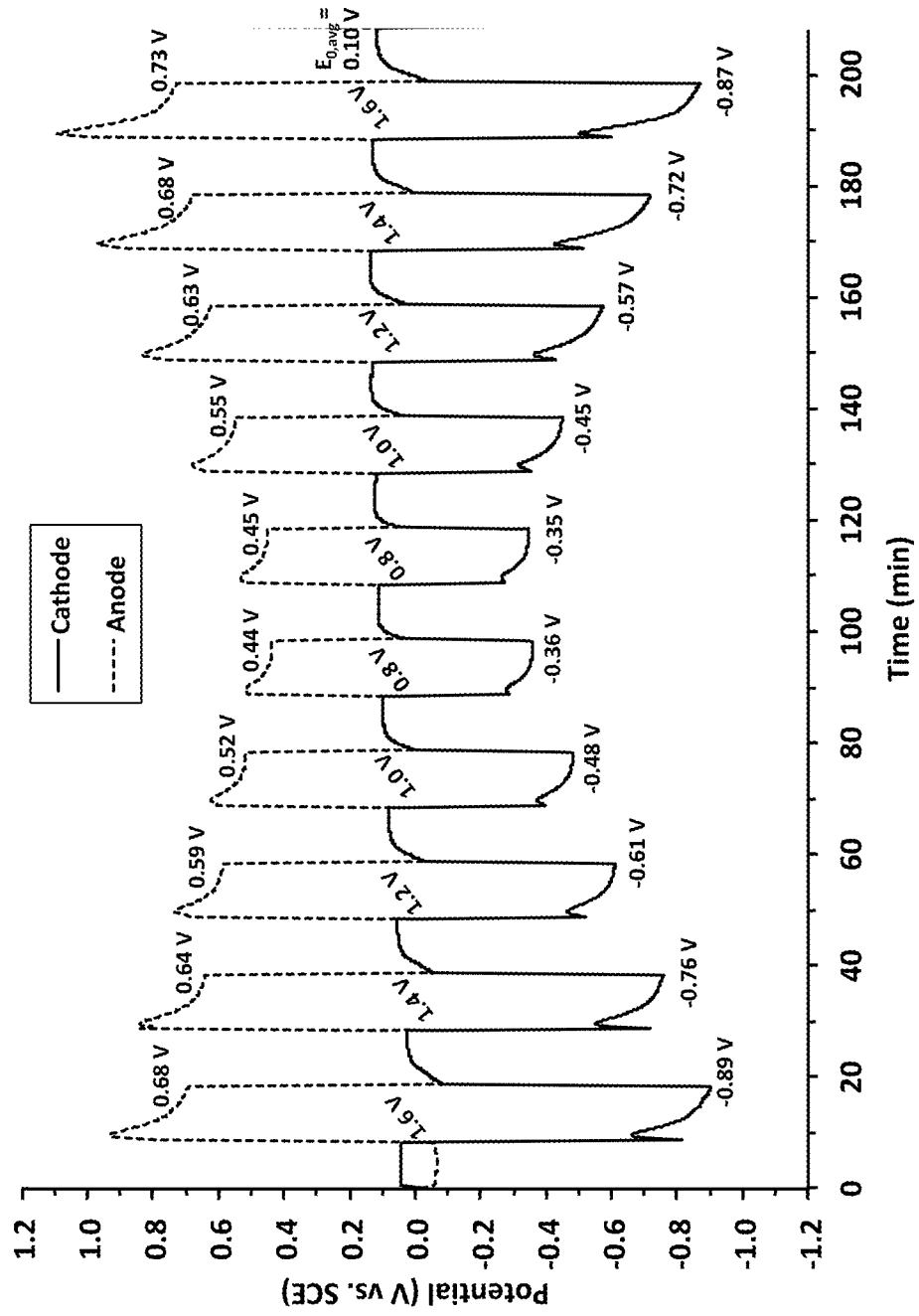
FIG. 10. Potential distribution for Kynol electrodes in a 4-electrode set-up in 4.3 mM NaCl, where pristine Kynol was the anode and cathode, Pt was the counter-electrode, and a standard calomel electrode (SCE) was the reference. The voltage was applied in 0.2 V increments from 1.6 V down to 0.8 V and back up to 1.6 V. $E_{0,avg}$ represents the open circuit voltage of the system.
Figure 11A:
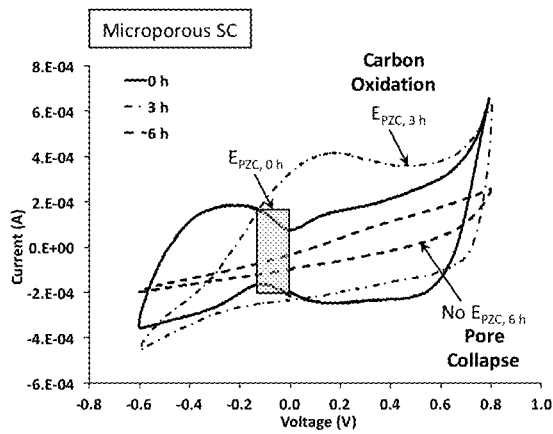
FIGs. 11a-e.
Figure 11B:
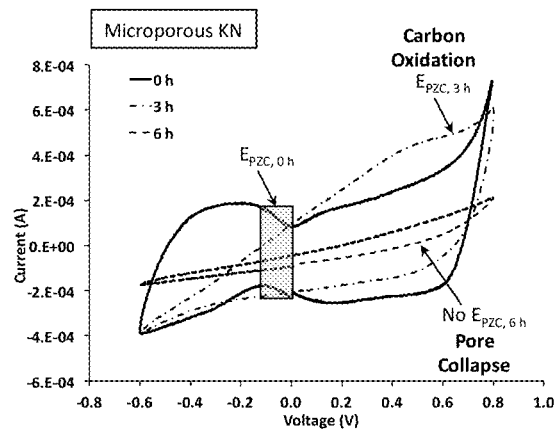
Figure 11C:
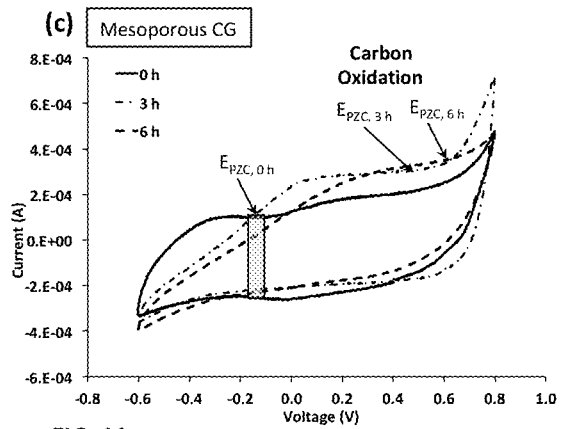
Figure 11D:
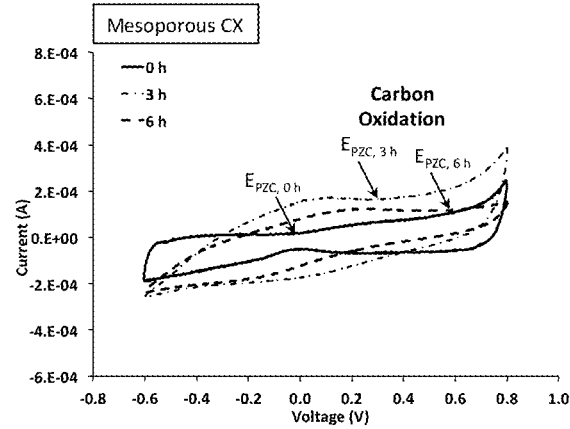
Figure 11E:
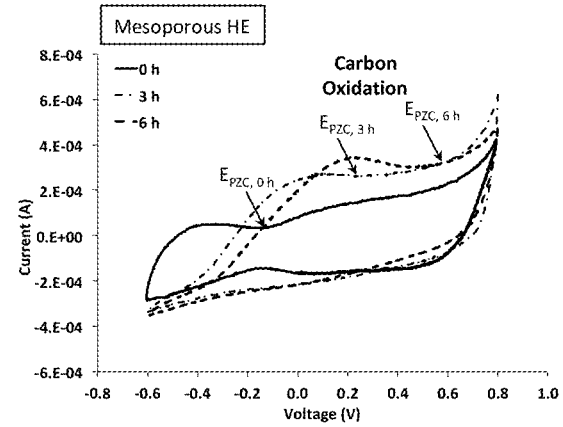

FIG. 10 shows that at a given applied voltage there will be a potential distribution between the anode and cathode in a CCC; the voltage will split between the electrodes, which may not be equal. For example, if 1.6 V is applied to an FPC, the cathode may be at −0.9 V vs. SCE and the anode at +0.7 V vs. SCE (FIG. 10). This in turn affects the FPC operating parameters and frequency of polarity-switching performed in each cycle of operation in an EDC. The active surface area, carbon material, and applied voltage, among other things, affect the potential distribution. The $E_{PZC}$ of an electrode affects the distribution of applied E during the initial use of an electrode, and the potential distribution changes slightly. Balancing of faradic reaction rates at the anode and cathode ultimately stabilize potential distribution Accelerated oxidation studies, shown in FIG. 11, show the effect of pore "collapse and roofing" observed with microporous carbon. This emphasizes that mesoporous carbons can handle a large applied voltage while maintaining charge efficiency and avoiding the effect of pore collapse and roofing. Careful selection of PMD used in an FPC device greatly increases device reliability and lifetime, and thereby reduces water treatment costs.

Figure 12:
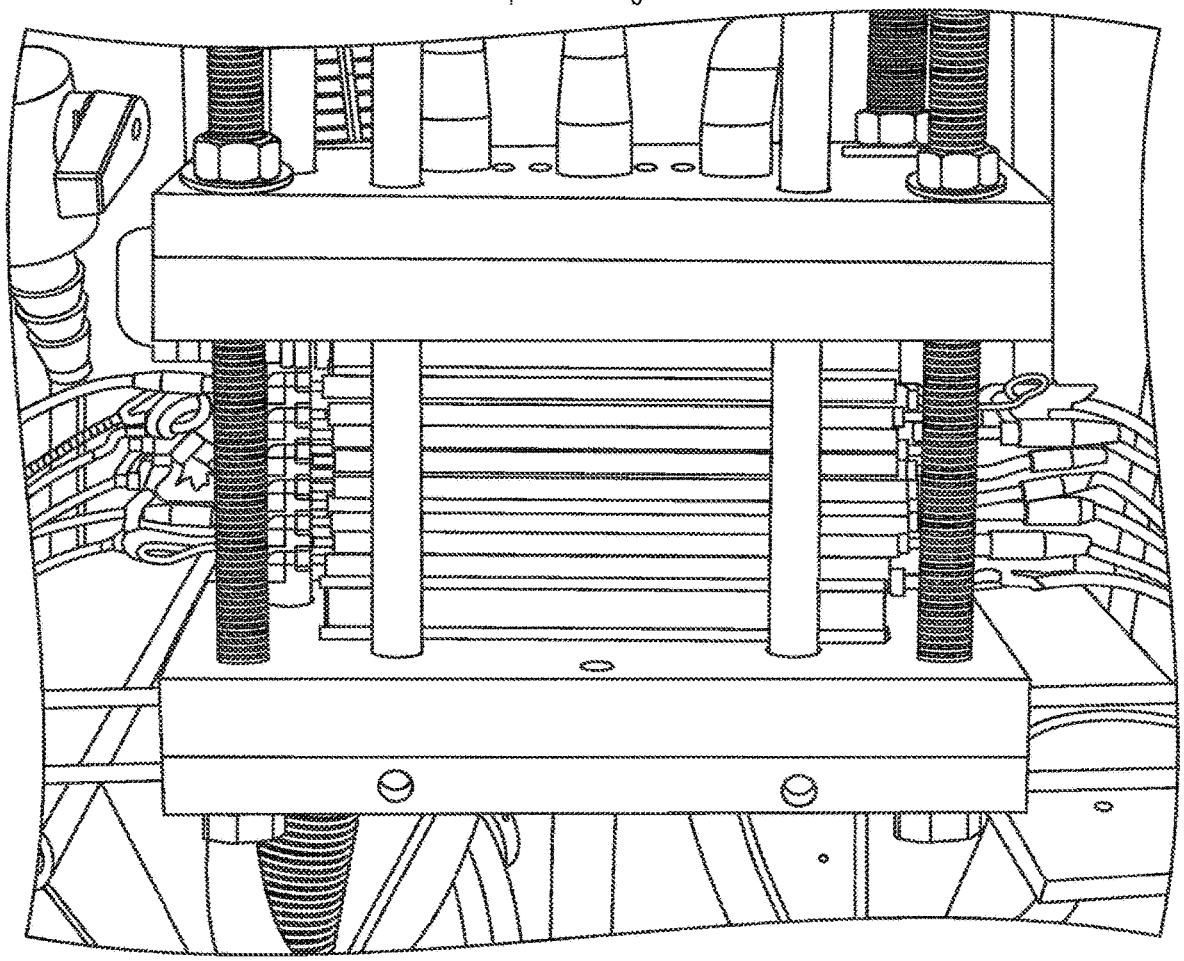
FIG. 12. Bench-scale capacitive coagulation device.

A bench-scale CCC system is shown in FIG. 12. The capacitive coagulation system provides >50% lead removal selectivity vs. non-metal ions. In CCCs tuned (using CCC Parameters) to remove lead ("lead-removal CCC"), lead removal can approach 100%. In one embodiment of a lead-removal CCC, various oxygen-based surface groups are added to the electrode and lead removal below 15 ppb is achieved in all cases for ~50 ppb lead tap water input stream, at a CCC operating voltage of 1.2 V. Using carboxyl functionalized electrodes (aka treated electrodes), as described in U.S. application Ser. No. 62/702,286 incorporated herein, a lead-removal CCC reduced the concentration of lead in the output stream to only 0.05 ppb, equating to 99.9% removal efficiency.

The removal selectivity of dissolved lead was consistently ≥99% compared to $Ca^{2+}$ for the treatment of a consecutive 5 gallons of tap water with concentrations as high as ~10 ppm lead (Table 6), as confirmed by ICP-MS and calculated as percent removal of species. Scanning electron microscopy (SEM) and energy dispersive X-ray spectroscopy (EDX) analyses of the electrodes after filtration confirmed lead immobilization are shown in FIG. 13.

TABLE 6

Lead removal selectivity

| Volume Treated | % Removal $Pb^{2+}$ | |
| --- | --- | --- |
| | ~300 ppb Feed | ~10 ppm Feed |
| 1 gallon | 99.69 | 99.99 |
| 2 gallons | 99.83 | 99.99 |
| 3 gallons | 99.95 | 99.98 |
| 4 gallons | 99.93 | 99.98 |
| 5 gallons | 99.48 | 99.97 |
| Removal Selectivity | ≥99% in all cases | |

Figure 14A:
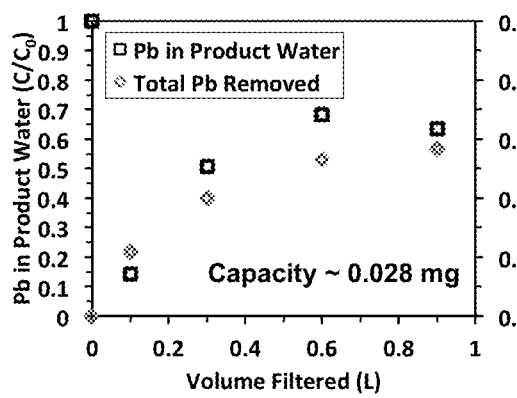
FIGS. 14a-14c. Breakthrough curves for prior art activated carbon packed column (panel in FIG. 14a) and Applicant's CCC device (panels in FIG. 14b and FIG. 14c) experiments. The y-axis on the left has been normalized for the initial lead concentration: (a) 126 ppb, (b) 296 ppb, and (c) 10,000 ppb. The y-axis on the right shows the total Pb removed in mg for the volume treated.
Figure 14B:
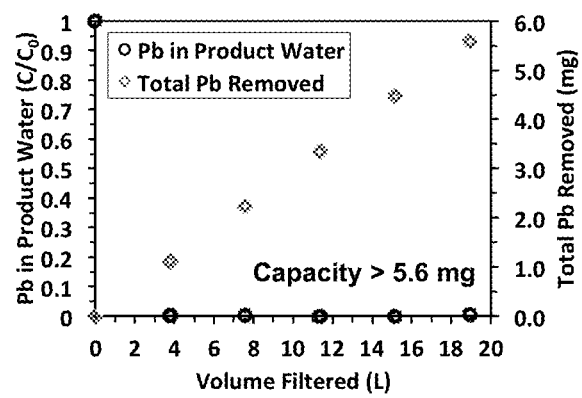
Figure 14C:
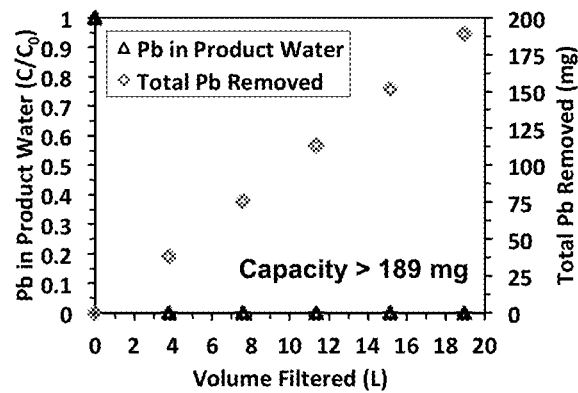

To further study the effect of applied potential on lead removal, tap water spiked with lead was filtered with a packed column filled with activated carbon at no applied potential (passive filtration/physical adsorption) and compared to CCCs operated at 1.2 V (active filtration/capacitive coagulation). The same amount of carbon and flow rate was used for both experiments. Breakthrough curves for these studies are shown in FIG. 14. The packed column initially adsorbed lead, denoted by the abrupt drop in concentration, but after only ~0.3 L of water had passed through the carbon it began to saturate. In contrast, CCCs were able to filter 5 gallons (~19 L) of water up to an astonishing 10,000 ppb and maintain performance, consistently removing lead below a concentration of 2 ppb. This extrapolates to an estimated device capacity of ≥1 g of lead removed per gram of carbon electrode. The prototype device shown in FIG. 9 would yield an overall capacity of ≥500 g of lead, equating to a theoretical volume capacity of ~8.8 million gallons assuming an input stream concentration of 150 ppb lead; other factors impact CCC performance in POU configurations and yield a predicted CCC volume capacity of 100,000 gallons. In contrast, current POU filters only have a volume capacity of approximately 1,500 gallons.

Figure 15:
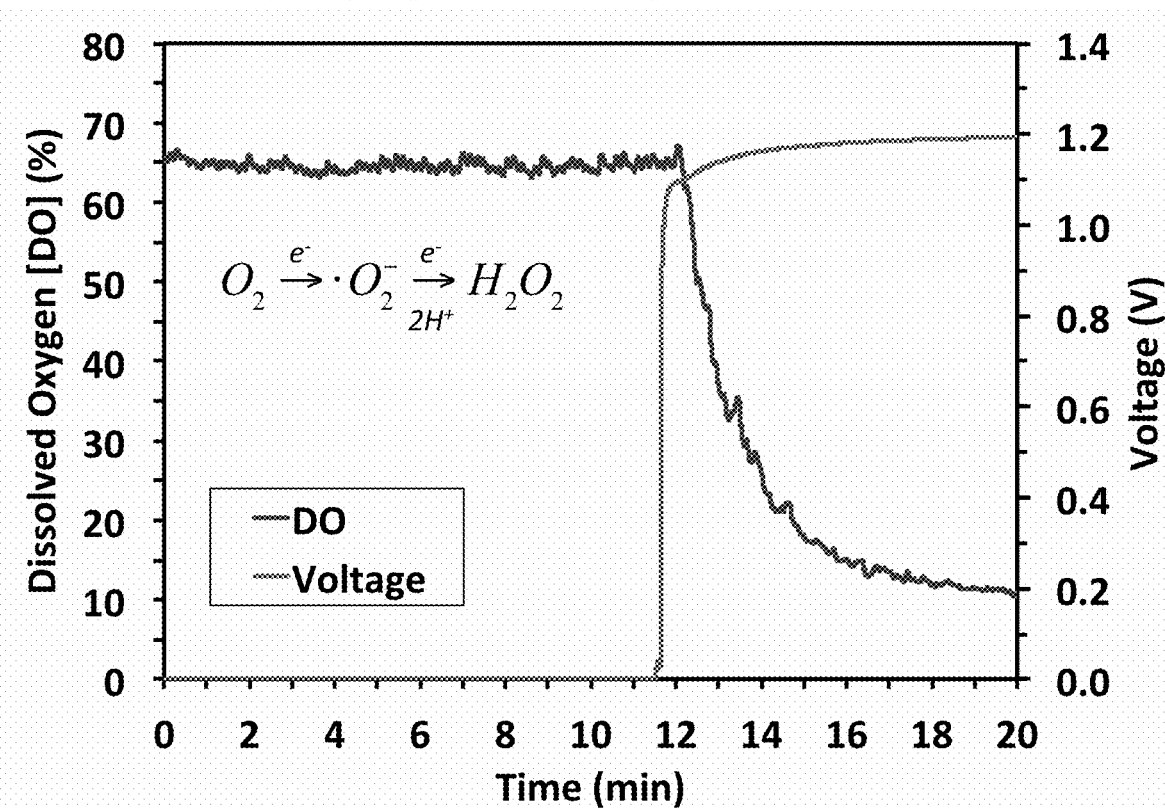
FIG. 15. DO reduction at 1.2 V. DO reduction generates hydrogen peroxide, a potent oxidizer.

Additionally, the dissolved oxygen (DO) dropped to ~10% of saturation, equating to <1 ppm DO, and 1.25 ppm of $H_2O_2$ was measured after filtration at an applied potential of 1.2 V (FIG. 15). These observations reveal that lead removal is influenced by a combination of potential and $H_2O_2$ generation. The Pourbaix diagram in FIG. 4 emphasizes how sensitive lead speciation is to modest changes in water chemistry, such as fluctuations in pH and voltage. The combination of these mechanisms yield the benefits observed with capacitive coagulation used in CCCs.

To test the limitations of Applicant's CCC device, tap water with lead concentrations as low as 5 ppb and as high as 10,000 ppb were processed through CCCs. Lead was successfully removed in all cases at an applied voltage of 1.2 V (Table 7). Even at highly dilute conditions where passive filtration consisting of equilibrium-based adsorption struggle, the capacitive coagulation's active filtration process excels with a selectivity of ≥99% (Table 6).

| Key CCC device performance improvements over prior art devices: |
|---|
| 99.9% lead removal |
| ≥99% selectivity maintained down to ~5 ppb lead |
| Active lead filtration system developed (capacitive coagulation) |
| Permanent lead removal |

TABLE 7

Lead removal at 1.2 V

| Sample | $Pb^{2+}$ Concentration (ppb) |
|---|---|
| Feed | 5.63 |
| Treated | 1.45 |
| Feed | 54.32 |
| Treated | 0.05 |
| Feed | 295.72 |
| Treated | 0.15 |
| Feed | 10,000 |
| Treated | 0.28 |

Higher throughput CCC systems are fabricated by adding more capacitive coagulation cells and/or using larger electrodes in each cell. Such larger systems provide lead removal efficacy from 150 ppb to ≤10 ppb at a flow rate of 1 gpm or higher.

The preferred applied E for removal of Al, Ag, Au, Br, Cl, Co, Cu, Fe, Hg, Ir, Mn, Pb, Pd, Pt, Ni, Zn, and chloramine using an FPC are shown in Table 1.

CCC systems remove lead to below EPA action levels even if the input stream has various combinations of lead content, water hardness, alkalinity, disinfectants, and pH. Water chemistry will impact lead speciation (e.g., day to day variations in municipal water chemistry, the effect of which are shown in FIG. 4 above). Currently there does not exist one device that can treat lead in all of its forms; prior art devices typically use physical entrapment at higher pH and zeolite media at lower pH. In contrast, CCCs can remove lead in all forms (species) commonly found in drinking water sources.

Different operating parameters were explored depending on the water type. Corrosion of internal materials is a common concern with electrochemical-based systems, however little evidence of corrosion has been observed in FPC systems; internal components are designed, and the material is chosen, to be extremely robust, stable, and inert to galvanic and chemical corrosion. In one embodiment of the invention, if lead is found to leach after on/off operation or from the addition of chloramines, the FPC system can be designed to switch to open circuit or a small potential when not in use, and an inexpensive carbon block pre-filter is added to remove chloramines. An optional post-filter is added if small pieces of the carbon cloth are found to flake off over time.

Operational adjustments for specific water chemistries. Analysis of typical input stream feeding a given FPC device permits adjustments to optimize operating parameters for specific water chemistries (adjustments are to optimize physical and electrochemical adsorption of lead, pH modulations, and oxidation to lead oxides and other insoluble species). Typical operating parameters are adjusted as follows:

Operating voltage. To obtain the potential distribution, a three-electrode set-up is used with a cathode, anode, and a standard calomel electrode (SCE) as the reference. The potential at each electrode is recorded at open circuit, short-circuit, and up to a voltage of 1.4 V with 0.2 V increments. The pH and operating voltage are correlated through the Pourbaix diagram. Based on the pH and potential distributions at each electrode, the lead speciation can be controlled by selecting what voltage to apply. This calibration process determines and controls what lead species precipitate at what voltage and in a given input stream water chemistry.

Oxygen reduction and $H_2O_2$ generation. Oxygen reduction at the cathode generates $H_2O_2$ that can react with lead species to facilitate the formation of lead oxides. There is a significant reduction in DO at an applied voltage of 1.2 V and measured 1.25 ppm $H_2O_2$ in the filtered water. The operating voltage is controlled to amplify this reaction for maximal lead removal. Experiments conducted at open circuit, short-circuit, and up to a voltage of 1.4 V with 0.2 V increments, and the pH, DO, and $H_2O_2$ concentrations at the outlet typically remove lead to below EPA action levels.

Carbon conductivity. FPC devices typically use a microporous carbon with a moderate conductivity (carbon B in Table 8). A comparative study of carbons with different properties, Table 8, was conducted to elucidate their effect on lead removal via capacitive coagulation.

TABLE 8

Carbon properties

| Carbon | Conductivity (S/cm) | Pore Size (nm) | Surface Area ($m^2/g$) |
|---|---|---|---|
| A | 0.2 | 1.2-3 | 1000-2000 |
| B | 1.2 | 2.2 | 2000 |
| C | 900 | N/A | <2 |

The CCC lead removal technology relies on (i) physical adsorption; (ii) capacitive adsorption; (iii) electrochemical pH modulation and metal immobilization; (iv) electrochemical peroxide ($H_2O_2$) generation & metal oxidation; (v) electrodeposition (e.g., electroplating, electrophoretic deposition); (vi) electrochemical oxidation; (vii) precipitation; (viii) pore mouth diameter profile, (ix) electrode treatment, (x) electrode spacing, and (xi) flow-by vs. flow-through vs. carbon block cell design. A combination of these factors, or a cascade of these factors, causes speciation and immobilization of target species that become trapped in the pore network of the carbon electrodes, which results in a purified effluent. It is imperative that the carbon electrodes are conductive. The more conductive the carbon material, the more uniform the current distribution was across the electrodes, which typically results in increased $H_2O_2$ generation and a more efficient lead removal process. The pore size and surface area are related to the adsorption capacity and tortuosity of the material. Pore size and surface area also affect $H_2O_2$ generation in an FPC device.

POU/POE device design. A POU/POE FPC product design parameters include: (1) Residence time and size of device was identified to achieve a flow rate of 1.5 gpm; and (2) Effective lead removal, defined by a reduction in dissolved lead levels from 150 ppb to <10 ppb and removal selectivity >90% over non-metal divalent ions, at 1.5 gpm for at least 150 gallons of water treated.

Residence time of the water: The residence time is a measure of the average time a volume of water remains in the device (volume/flow rate). In other words, it is the time required to filter a given amount of water. The internal volume of the device and flow rate dictates the residence time. In the bench-scale CCC device, at a flow rate of 20 ml/min, a residence time of 5 min typically gives the desired removal. The residence time for the flow rate at which the performance reaches a peak is selected as the design specification and the device is sized appropriately.

Pressure drop: The pressure drop across a FPC device is increasingly important as the flow rate increases. A pressure drop of <20 psi is considered acceptable and is below a normal inlet water pressure for residential and municipal buildings of ~45 psi.

Ultimate capacity of a FPC device. For NSF/ANSI certification, the lead concentration must be reduced from 150 to 10 ppb, and POU systems on the market are rated to treat up to 120 gallons of water. This translates into ~1 gallon of water treated per gram of carbon for a pitcher system and ~1.6 gallons of water treated per gram of carbon for an under-the-sink system. One embodiment of the CCC device can treat 2 gallons of water at 1.5 gpm to bring lead levels from 150 ppb to ≤10 ppb. Ultimate capacity of the system is obtained from a lead removal curve. Pressure drop issues typically arise after >1 g of lead removal per gram of FPC carbon electrode. CCC embodiments for POU/POE use can include a lead sensor and/or pressure drop sensor to alert a user to replace the device.

FPC replacement threshold ranges for various embodiments. In general, a CCC is replaced when the target metal concentration in the output stream exceeds the relevant threshold level, e.g., 15 ppb for lead concentration and 1.3 ppm for copper (see the Lead and Copper Rule, a regulation published by the EPA in 1991 (https://www.epa.gov/groundwater-and-drinking-water/national-primary-drinking-water-regulations). The threshold level (aka sorption capacity) could be specified by a government agency, or user selected. Municipal and industrial wastewater discharge limits are different from drinking water limits; the metal concentration thresholds are typically higher. There are effluent guidelines for different industries (https://www.epa.gov/eg).

FPC Regeneration. When a FPC output stream metal concentration equals or exceeds the threshold level, rather than replacing the FPC, some types of FPCs can be regenerated (e.g., in a CCC, the adsorbed metal ions and particles desorbed (removed) from the CCC electrodes). One method of CCC regeneration is by flushing acid through the cell to dissolve coagulated metals and regenerate the electrodes. During this "acid regeneration" step, the output stream is diverted to a receptacle in which the highly concentrated waste stream is collected for other processing. After an acid regeneration step, the CCC is flushed with water until the output stream reaches pH 7 (or other target pH) before normal CCC operation (i.e., removal of metal ions and particles from the through stream) is resumed. Another method of CCC regeneration is by electrolysis or electrochemical regeneration in an acidic solution; electrolysis (aka electrochemical) regeneration converts metal oxides to soluble metal ions, which are then flushed out of the CCC with water and collected in a waste receptacle. Electrolysis is an electrochemical reaction that requires the application of an external voltage to drive a reaction that is non-spontaneous. Any insoluble metal species that have formed on the electrodes can be dissolved into solution using a small voltage, typically up to 5 V, applied across the CCC. CCC regeneration can also be a sequence of acid regeneration followed by electrolysis, or vice versa.

Multiple FPCs, in series, each of which FPCs targets the same or a different species. Multiple FPCs connected in series (outlet to inlet) tuned to remove the same target species act to successively reduce the concentration of the target species in a single pass of an input stream through the FPCs connected in series (accomplishing the same level of target species removal as operating a single cell in batch mode multiple times). Adjustment of FPC Parameters, e.g., pH of the through stream and voltage applied to the cell electrodes of a given cell, of multiple cells connected in series to different FPC Parameters and EDC Parameters, as the case may be, enable each cell in a series to remove a different target species from the through stream in a single pass. Pourbaix diagrams, which show the speciation of a target species at a given voltage and pH, best illustrate the "cell series" concept. Pourbaix diagrams for lead (FIG. 16) and copper (FIG. 17) are used to explain the immobilization of different metals in a CCC series. The horizontal dashed lines represent the applied voltage; the applied voltage can move along the vertical axis. The vertical dashed lines represent the pH; the pH can move along the horizontal axis. The region where these lines intersect represents the species of the metal that will exist at these conditions. The operating conditions depicted in FIG. 16 and FIG. 17a would immobilize (adsorb on a CCC electrode) Pb and Cu as $PbO_{2(s)}$ (FIG. 16) and $Cu(OH)_{2(s)}$ (FIG. 17), effectively removing each metal from the feed stream. The operating conditions depicted in FIG. 17b would electrodeposit or electroplate Cu on the electrode as $Cu_{(s)}$. Pourbaix diagrams for nickel, iron, manganese, aluminum, and zinc have also been included (FIG. 18 to FIG. 22). A similar approach to manipulating the applied voltage and pH can be taken to remove these metals. The operating conditions selected to form insoluble species may differ for each target species, and there could be several possibilities for a given target species depending on the speciation depicted in the Pourbaix diagram.

Applied voltage and electrochemical pH modulation are selected to remove target species of Ni, Fe, Mn, Al, and Zn from CCC influent using the Pourbaix diagrams shown in FIGS. 18-22, respectively, as explained below. Those of skill in the art can select an applied voltage and electrochemical pH modulation to remove a given species of a target element or complex. Copper is removed by the CCC via electrodeposition, hydroxide precipitation, and/or oxidation to copper oxides.

FPC control system. FPC Parameters for a given FPC are monitored and controlled using a computer system that monitors and/or controls various sensors, interfaces, valves, and peripheral equipment, and is commonly known as a process control computer (aka process controller), a computer generally associated with continuous or semi-continuous production operations involving materials such as chemicals and petroleum, whether in liquid, solid, or gas phases. The process control computer enables FPC Parameters to be applied to one or more FPCs in a system and changes in through-stream routing, e.g, changes that convert a series system architecture to a series-parallel system architecture.

Extension of FPC design to other target species for which Pourbaix diagrams exist. In addition to Pb, Ni, Zn, Al, Cu, Fe, Mn, Cl, Br, and chloramine, the FPC Parameters, and the system and methods disclosed above, can be applied to remove a metal and halide species identified in the Pourbaix diagrams for As, Se, Sc, Ti, V, Cr, Co, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, Lu, and other halides.

Examples

Figure 23:
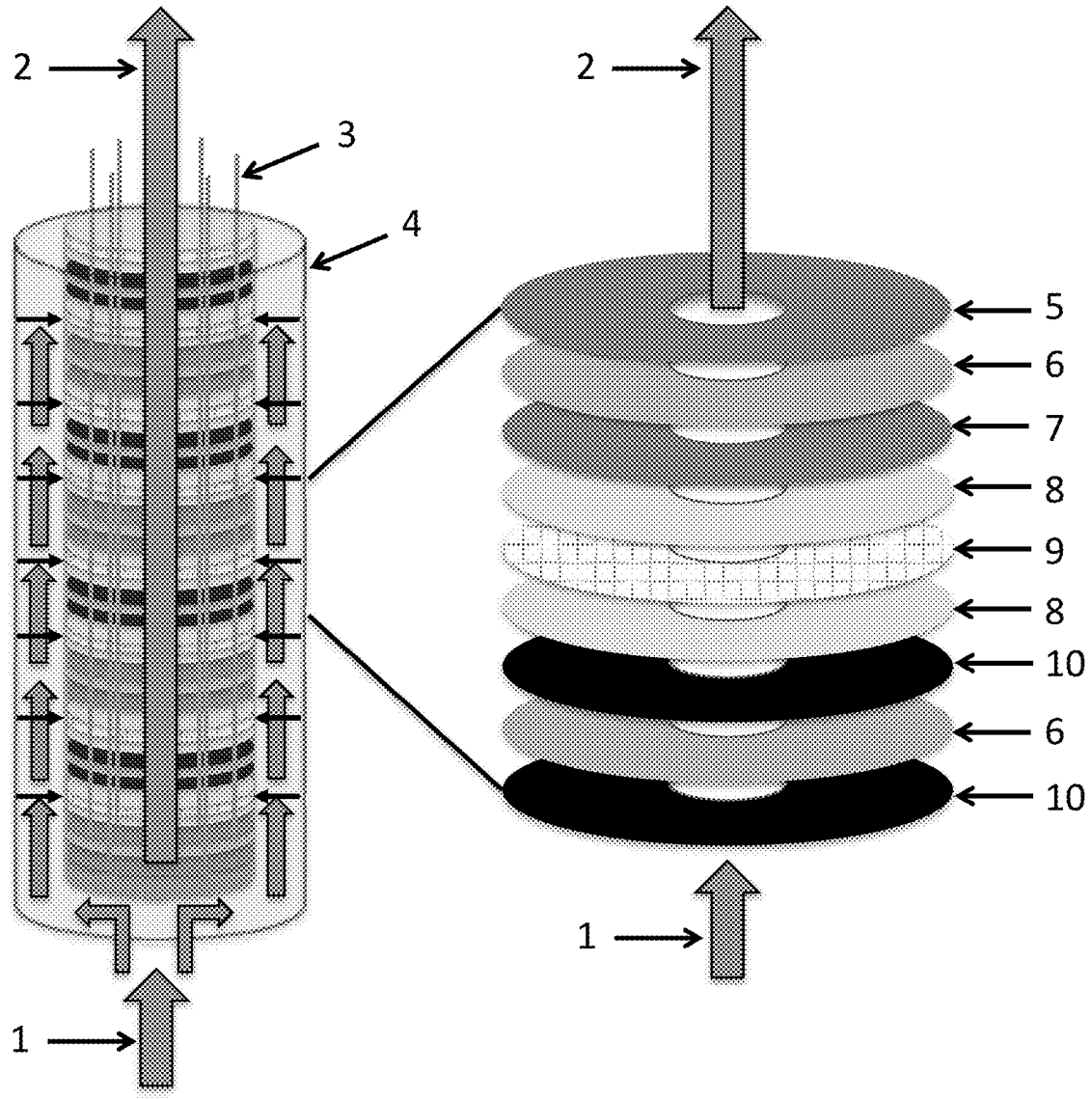
FIG. 23. Schematic of an EDC device with stacked cell design. The feed (influent, or input stream) flows in the bottom of the device, proceeds through an annular space near the wall of the cell housing, then flows centripetally over the electrode surfaces to the axial channel, and is then discharged (effluent or output stream) through the axial channel to the FPC outlet. Feed spacers are optional; a feed spacer (shown in FIGS. 23 and 29) is an additional layer of material between anode and cathode that can optionally be added to create a larger flow channel for the through stream.
Figure 24:
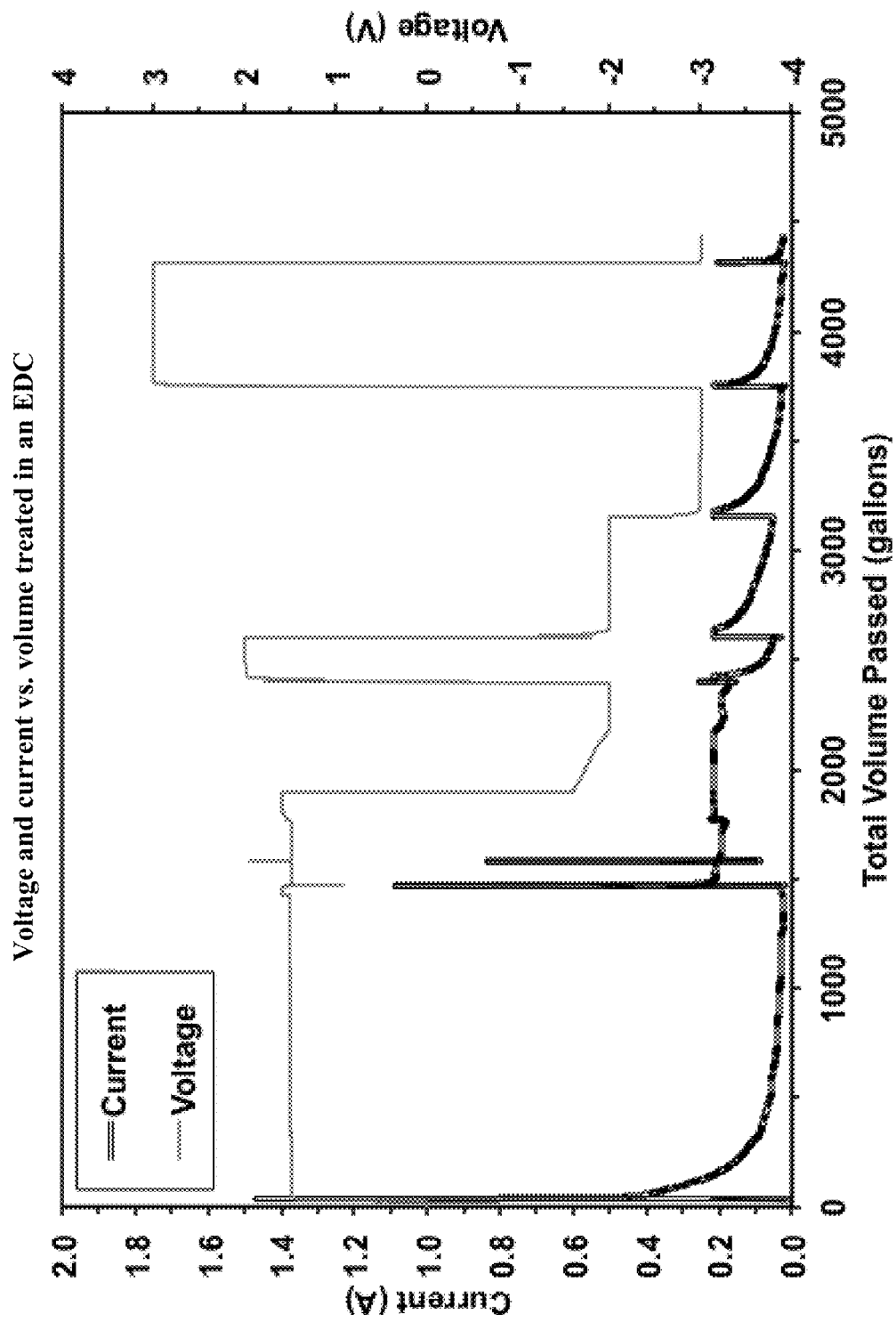
FIG. 24. Applied voltage and current transients as a function of volume treated at a flow rate of 300-500 ml/min for EDC experiments conducted with Calgon as both electrodes. Current spikes at ~1500 and ~1600 gallons are due to noise (inadvertent physical movement of the electrical leads) and can be neglected. At ~1800 gallons, operation was switched from applying a constant voltage to applying a constant current of ~0.2 A, observed as a straight line. The voltage decay (voltage is reading as negative, but the total cell voltage is increasing with constant current) seen at this condition is a consequence of applying a constant current. The subsequent switching also occurred at constant current, but the voltage reached the cutoff value quickly and the system essentially behaved as though at constant voltage.

Performance tests of EDCs were conducted to verify removal of total chlorine, free chlorine, chloramine, and peroxide ($H_2O_2$) using carbon electrodes and voltages of <3.0 V. Measurements were made using analytical test kits. Experiments were conducted with a flow-by cell design and 14 pairs of electrodes in an alternating series of anode-cathode-anode-cathode (variable number of repeats of anode-cathode) anode-cathode (FIG. 23). In the flow-by design shown in FIG. 23, the input stream proceeds through an annular space near the wall of the cell container, then flows centripetally over the electrode surfaces to the axial channel, and is then discharged through the axial channel to the FPC outlet. A positive voltage is applied to the anodes and a negative voltage is applied to the cathodes. The polarity of the voltage applied to a given electrode is periodically switched (converting each anode into a cathode, and each cathode into an anode) to ensure that all electrodes degrade at the same rate and to extend the lifetime of the EDC device. An example is shown in FIG. 24. The polarity-switching interval for a given EDC can be arbitrarily set (e.g., every hour) or can be set based on one or more EDC parameters, e.g., current threshold, voltage threshold, rate of current decrease at constant voltage, percentage of current decrease at constant voltage, rate of voltage decrease at constant current, percentage of voltage decrease at constant current, total volume treated, and concentration of target species in EDC effluent. Preferred polarity-switching points are (i) a percentage decrease in current at a constant applied voltage, (ii) a percentage increase in voltage at a constant applied current, (iii) total volume treated, and (iii) concentration of target species in effluent. Depending on a target species, percentage decreases or increases may be detected before a rise in concentration of the target species in the effluent is detected, or vice versa (see Figures below plotting V vs. concentration of target species in effluent). Three types of carbon were examined. Electrode properties are shown in Table 4.

Capacitive coagulation experiments were conducted to test Cu removal using 16 pairs of carbon electrodes (~13 g of carbon), in which the cathodes were pristine SC and the anodes were nitric acid oxidized SC. The FPC was operated at short-circuit (0 V). A 1 L feed solution of ~100 ppm Cu [$Cu(NO_3)_2$] in direct injection ("DI") $H_2O$ was treated at a flow rate of 20 ml/min. Samples were analyzed by inductively coupled plasma (ICP) with optical emission spectrometer (OES) and the results in Table 9 show that approximately ⅓ of the Cu was removed in a single pass.

TABLE 9

ICP-OES results for $Cu^{2+}$ removal

| Sample | $Cu^{2+}$ Concentration (ppm) |
|---|---|
| Untreated | 96 |
| Treated | 66 |

Figure 25A:
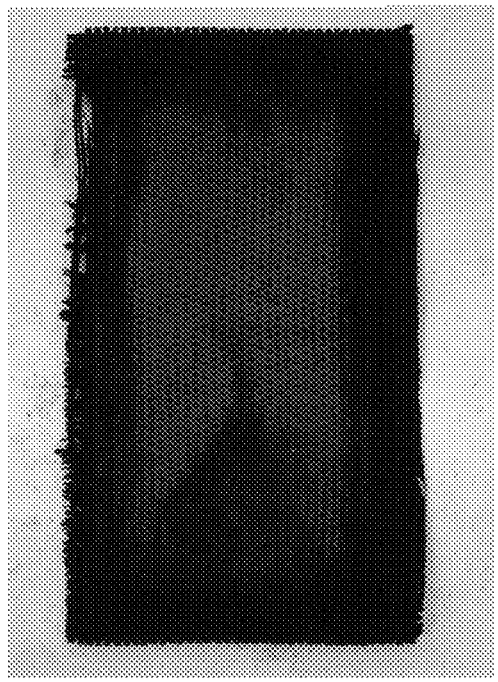
FIG. 25a shows copper deposition on the cathode at an applied potential of 1.2 V.
Figure 25B:
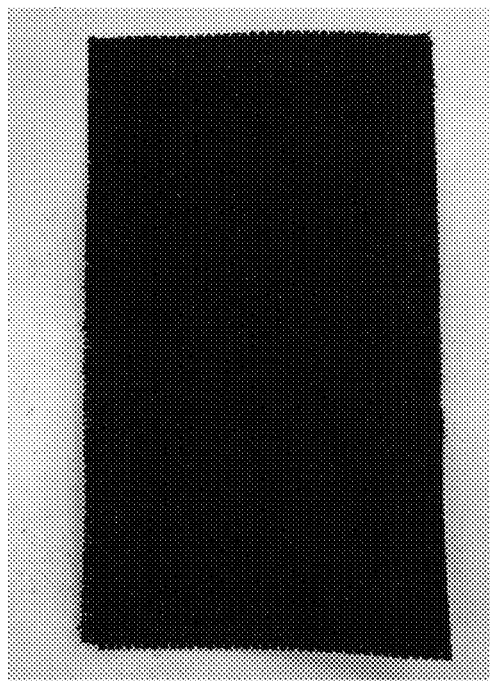
FIG. 25b shows no copper deposition on the cathode at an applied potential of 1.2 V. The carbon electrodes are shown as black and the copper as gray in the grayscale equivalent of the photo. Color photograph of copper deposited on the cathode available.

Capacitive coagulation experiments were conducted to test Cu removal using 12 pairs of carbon electrodes (~10 g of carbon), in which the cathodes and anodes were both pristine SC. The FPC was operated at an applied potential of 1.2 V on the cathode. A 18.5 L feed solution of ~50 ppm Cu [$Cu(NO_3)_2$] and ~50 ppm Ca ($CaCl_2$)) in DI $H_2O$ was treated at a flow rate of 20 ml/min. During operation Cu plated out of solution onto the cathode, shown as a grayish deposit in FIG. 25a.

Flow-by capacitive coagulation experiments were conducted to test Cu removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~2 ppm Cu [$Cu(NO_3)_2$] in tap $H_2O$ was treated at a flow rate of 100 mL/min. Samples were taken before and after filtration with the cell and the $Cu^{2+}$ concentration measured with ICP-OES. ~78% Cu removal was achieved at all conditions tested (Table 10).

TABLE 10

ICP-OES results for $Cu^{2+}$ removal from tap water

| Sample | $Cu^{2+}$ Concentration (ppm) | Removal (%) |
|---|---|---|
| Untreated | 2.30 | n/a |
| Treated at 0.8 V | 0.52 | 77.5 |
| Treated at 1.0 V | 0.52 | 77.6 |
| Treated at 1.2 V | 0.52 | 77.6 |

Flow-by capacitive coagulation experiments were conducted to test Cu removal at low pH using 14 pairs of carbon electrodes (~30 g of carbon), in which the cathodes were nitric acid oxidized KN and the anodes were pristine carbon. The FPC was operated at 1.2 V. A 1.5 L feed solution of ~10 ppm Cu [$Cu(NO_3)_2$] in tap $H_2O$ was treated at a flow rate of 100 mL/min. The pH was adjusted to 2.8 using concentrated $H_2SO_4$. Samples were taken before and after filtration with the cell and the $Cu^{2+}$ concentration measured with ICP-OES. Cu was very effectively removed (Table 11), with a removal of 99.8%.

TABLE 11

ICP-OES results for $Cu^{2+}$ removal from tap water at pH 2.8

| Sample | $Cu^{2+}$ Concentration (ppm) | Removal (%) |
|---|---|---|
| Untreated | 10.29 | n/a |
| Treated | 0.02 | 99.8 |

Flow-by capacitive coagulation experiments were conducted to test Ni removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~50 ppm Ni [$Ni(Cl)_2$] in tap $H_2O$ was treated at a flow rate of 100 mL/min. Samples were taken before and after filtration with the cell and the $Ni^{2+}$ concentration measured with ICP-OES. The highest removal of ~63% was achieved at 1.2 V (Table 12).

TABLE 12

ICP-OES results for $Ni^{2+}$ removal from tap water

| Sample | $Ni^{2+}$ Concentration (ppm) | Removal (%) |
|---|---|---|
| Untreated | 49.21 | n/a |
| Treated at 0.8 V | 36.96 | 24.9 |

TABLE 12-continued

ICP-OES results for $Ni^{2+}$ removal from tap water

| Sample | $Ni^{2+}$ Concentration (ppm) | Removal (%) |
|---|---|---|
| Treated at 1.0 V | 24.56 | 50.1 |
| Treated at 1.2 V | 18.36 | 62.7 |

Figure 26:
FIG. 26. Rust colored Fe-oxide deposits on the separators at the cathode surface after experiment. The carbon electrodes are shown as black and the iron as gray deposits on the white separators in the grayscale equivalent of the photo. Color photograph of copper deposited on the cathode available.

Capacitive coagulation experiments were conducted to test Fe removal using 16 pairs of carbon electrodes (~14 g of carbon), in which the cathodes were pristine SC and the anodes were nitric acid oxidized SC. The cell was operated at short-circuit (0 V). A 18.5 L feed solution of 100 ppm Fe [$Fe(Cl)_3$] or 25 ppm $FeCl_3$ in DI $H_2O$ was treated at a flow rate of 20 ml/min. The concentration of Fe steadily decreased with treatment, ICP-OES results are shown in Table 13. For the higher concentration experiment (100 ppm Fe), Fe-oxides formed at the cathode as rust-colored precipitates on the separators, shown as a grayish deposit (FIG. 26).

TABLE 13

ICP-OES results for $Fe^{2+}$ removal

| Sample | $Fe^{2+}$ Concentration (ppm) |
|---|---|
| Untreated | 5.73 |
| Treated | 0.10 |

Flow-by capacitive coagulation experiments were conducted to test Fe removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~15 ppm Fe [$Fe(Cl)_3$] in tap $H_2O$ was treated at a flow rate of 100 mL/min. Samples were taken before and after filtration with the cell and the $Fe^{3+}$ concentration measured with ICP-OES. ~99.9% Fe removal was achieved at all conditions tested (Table 14).

TABLE 14

ICP-OES results for $Fe^{2+}$ removal from tap water

| Sample | $Fe^{2+}$ Concentration (ppm) | Removal (%) |
|---|---|---|
| Untreated | 15.37 | n/a |
| Treated at 0.8 V | 0.015 | 99.9 |
| Treated at 1.0 V | 0.012 | 99.9 |
| Treated at 1.2 V | 0.013 | 99.9 |

Flow-by capacitive coagulation experiments were conducted to test Mn removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~20 ppm Mn [$Mn(SO_4)$] in tap $H_2O$ was treated at a flow rate of 100 mL/min. Samples were taken before and after filtration with the cell and the $Mn^{2+}$ concentration measured with ICP-OES. ~99.8% Mn removal was achieved at 1.2 V (Table 15).

TABLE 15

ICP-OES results for $Mn^{2+}$ removal from tap water

| Sample | $Mn^{2+}$ Concentration (ppm) | Removal (%) |
|---|---|---|
| Mn Feed | 18.93 | n/a |
| Treated at 0.8 V | 8.43 | 55.5 |
| Treated at 1.0 V | 0.53 | 97.2 |
| Treated at 1.2 V | 0.041 | 99.8 |

Flow-by capacitive coagulation experiments were conducted to test Al removal using 14 pairs of carbon electrodes (~30 g of carbon), in which the cathodes were nitric acid oxidized KN and the anodes were pristine carbon. The FPC was operated at applied potentials of 0.4, 0.8, and 1.2 V. A 1.5 L feed solution of ~30 ppm Al from a wastewater sample was treated at a flow rate of 100 mL/min. Samples were taken before and after filtration with the cell and the $Al^{3+}$ concentration measured with ICP-OES. ~99.9% Al removal was achieved at 0.4 V (Table 16).

TABLE 16

ICP-OES results for $Al^{3+}$ removal from tap water

| Sample | $Al^{3+}$ Concentration (ppm) | Removal (%) |
|---|---|---|
| Feed | 31.58 | n/a |
| Treated at 0.4 V | 0.05 | 99.9 |
| Treated at 0.8 V | 5.84 | 81.5 |
| Treated at 1.2 V | 12.05 | 61.8 |

Flow-by capacitive coagulation experiments were conducted to test Zn removal using 14 pairs of carbon electrodes (~30 g of carbon), in which the cathodes were nitric acid oxidized KN and the anodes were pristine carbon. The FPC was operated at applied potentials of 0.4, 0.8, and 1.2 V. A 1.5 L feed solution of ~35 ppm Zn [$Zn(C12)$] in tap $H_2O$ was treated at a flow rate of 100 mL/min. Samples were taken before and after filtration with the cell and the $Zn^{2+}$ concentration measured with ICP-OES. ~40.8% Zn removal was achieved at 1.2 V (Table 17).

TABLE 17

ICP-OES results for $Zn^{2+}$ removal from tap water

| Sample | $Zn^{2+}$ Concentration (ppm) | Removal (%) |
|---|---|---|
| Feed | 35.39 | n/a |
| Treated at 0.8 V | 23.75 | 32.9 |
| Treated at 1.0 V | 22.95 | 35.1 |
| Treated at 1.2 V | 20.94 | 40.8 |

Figure 27A:
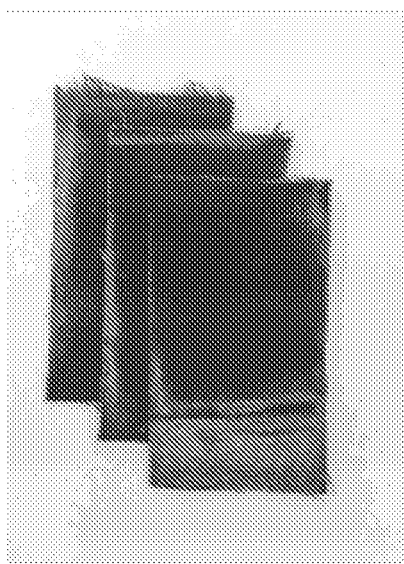
FIGS. 27a shows carbon cloth with white precipitates.
Figure 27B:
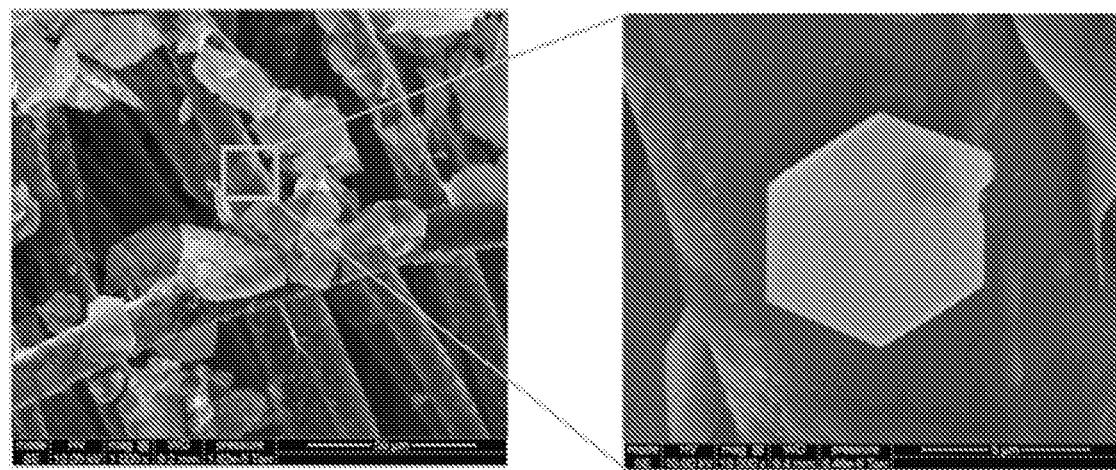
FIG. 27b shows scanning electron microscopy (SEM) micrographs of the cloth showing a Pb crystal.
Figure 28:
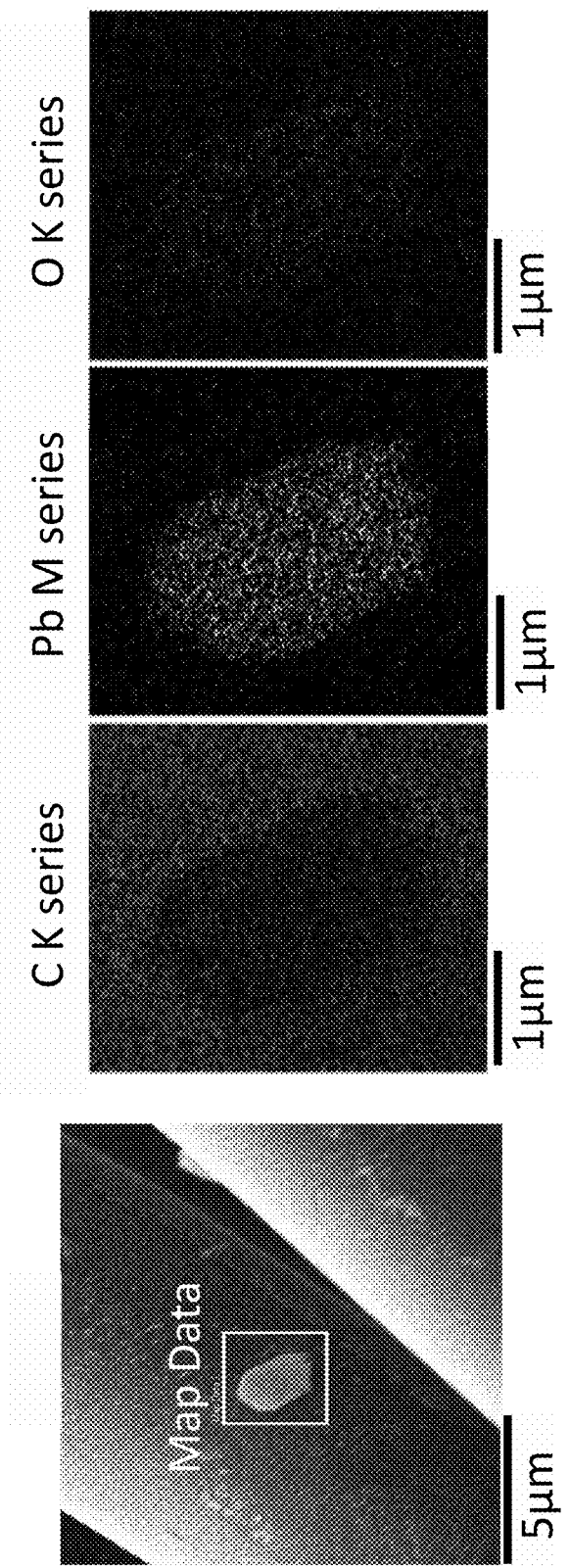
FIG. 28. EDX mapping of a Pb crystal from FIG. 27 confirming that the crystal is lead oxide by the presence of both lead and oxygen. Carbon (C), lead (Pb), and oxygen (O) are mapped in the three panels to the right, represented by the lightest contrast in each corresponding gray scale image. Color photograph of EDX mapping is available.

To study the physical adsorption of Pb on pristine and oxidized Kynol, packed columns were filled with ~5 g of carbon and 1 L of ~100 ppm Pb [$Pb(NO_3)_2$] in DI $H_2O$ was filtered at a flow rate of 20 mL/min. The results in Table 18 provide evidence that Pb is physically adsorbing to the carbon. Additionally, there was considerable white precipitate on the pristine Kynol electrodes after filtration (FIG. 27) that were confirmed by energy dispersive X-ray spectroscopy (EDX) to be lead oxide (FIG. 28).

TABLE 18

ICP results for treated water after flowing through packed columns

| | $Pb^{2+}$ Concentration (ppm) | |
|---|---|---|
| Sample | Pristine | Nitric acid oxidized |
| Feed | 73.87 | 94.94 |
| $1^{st}$ pass | 6.12 | 32.33 |
| 4 h | 17.11 | 36.45 |

*Conductivity reading was 0 μS/cm

Flow-through capacitive coagulation experiments with a 1 L feed solution of ~50 ppb Pb [Pb(NO$_3$)$_2$] in tap H$_2$O, 12 pairs of pristine carbon electrodes HO g), and a flow rate of 20 mL/min, showed Pb removal to well below the federal action level of 15 ppb in a single pass (Table 19 and Table 20). The cell was operated at short-circuit (0 V) and an applied potential of 0.8 and 1.2 V. Pb was spiked in several times to test removal. The experiments in Table 20 were performed with pristine anodes and nitric acid oxidized cathodes at 1.2 V. Samples were taken before and after filtration through the cell and the Pb$^{2+}$ concentration measured with a handheld sensor from ANDalyze and/or inductively coupled plasma mass spectroscopy (ICP-MS). "\" in the Tables means "not measured".

TABLE 19

Results for feed and treated water with Kynol anodes and cathodes

| Sample | $Pb^{2+}$ Concentration (ppb)* | ICP-MS (ppb) |
|---|---|---|
| Feed | 45, 58 | 44.96 |
| 1.2 V | <12 | 1.21 |
| Spike 1 | 50 | \ |
| 0.8 V | <12 | \ |
| Spike 2 | ~50 | \ |
| 0.8 V | <2 | \ |
| Spike 3 | ~50 | \ |
| 1.2 V | <2 | \ |
| Spike 4 | 32 | \ |
| 1.2 V Single pass | 3 | \ |

*Measurements taken with ANDalyze sensor

TABLE 20

Results for feed and treated water with pristine Kynol anodes and nitric acid oxidized Kynol cathodes

| Sample | $Pb^{2+}$ Concentration (ppb)* | ICP-MS (ppb) |
|---|---|---|
| Feed (50 ppb Pb) | 21, 44, 51 | 51.72 |
| sample 1 | <2 | 0.2 |
| sample 2 | <2 | \ |
| Spike 1 | >100 | \ |
| sample 1 | 12, 17 | \ |
| sample 2 | <2 | \ |
| sample 3 | <2 | \ |
| Spike 2 | ~50 | \ |
| sample 1 | <2 | \ |
| sample 2 | <2 | \ |
| sample 3 | <2 | \ |
| sample 4 | 3 | \ |
| Spike 4 | 23 | 19.9 |
| Single pass | <2 | 2.18 |

*Measurements taken with ANDalyze sensor

Flow-by capacitive coagulation experiments with 1.5 L feed solutions of ~5 to ~275 ppb Pb [Pb(NO$_3$)$_2$] in tap H$_2$O, 14 pairs of carbon electrodes (~30 g), pristine anodes and nitric acid oxidized cathodes, and a flow rate of 100 mL/min, also showed Pb removal to well below the federal action level of 15 ppb in a single pass (Table 21) The cell was operated at an applied potential of 1.2 V. Samples were taken before and after filtration with the cell and the Pb$^{2+}$ concentration measured with a handheld sensor from ANDalyze and/or ICP-MS. From the results it was made clear that Pb was being permanently removed from solution.

TABLE 21

Results for feed and treated water with pristine Kynol anodes and nitric acid oxidized Kynol cathodes

| Sample | $Pb^{2+}$ Concentration (ppb)* | ICP-MS (ppb) |
|---|---|---|
| Feed | ~50 | \ |
| sample 1 | <2 | \ |
| sample 2 | <2 | \ |
| sample 3 | <2 | \ |
| Spike 1 | >100 | \ |
| sample 1 | <2 | \ |
| Spike 2 | 5 | 54.32 |
| sample 1 | <2 | 0.05 |
| Spike 3 | 74 | \ |
| sample 1 | <2 | \ |
| Spike 4 | 39 | \ |
| sample 1 | <2 | \ |
| Spike 5 | 17 | 5.63 |
| Single pass - 1.2 V | <2 | 1.45 |
| Spike 6 - 15 ppb Pb | 11 | \ |
| sample 1 | 2 | \ |
| Spike 7 * 150 ppb Pb | 300 | 273.22 |
| sample 1 | 12 | 12.17 |

*Measurements taken with ANDalyze sensor

Flow-through capacitive coagulation experiments with a 1 L feed solution of ~50 ppb Pb [Pb(NO$_3$)$_2$] in tap H$_2$O, 12 pairs of carbon electrodes (~10 g), and a flow rate of 20 mL/min were carried out at open-circuit voltage (OCV), short-circuit (0 V), and applied potentials of 0.4 to 1.4 V with 0.2 V increments. Various oxygen-containing surface groups were tested, as well as carbons with differing properties. Samples were taken after a single pass through the cell and the Pb$^{2+}$ concentration measured with a handheld sensor from ANDalyze and/or ICP-MS.

The experimental results in Table 22 are for pristine anodes and citric acid oxidized cathodes. Pb was removed at OCV and short-circuit, but was more effectively removed under applied potential. The best result was obtained at 1.2 V, where 92% of the Pb was removed.

TABLE 22

Pb removal results for pristine Kynol anodes and citric acid oxidized Kynol cathodes

| Sample | $Pb^{2+}$ Concentration (ppb)* | ICP-MS (ppb) |
|---|---|---|
| Spike 1 - 50 ppb | 90 | 40.09 |
| Single pass - OCV | 22 | 13.44 |
| Spike 2 - 50 ppb | 72 | 57.28 |
| Single pass - OCV | 12 | 16.14 |
| Spike 3 - 50 ppb | 104 | 68.40 |
| Single pass - short-circuit | 5 | 12.02 |
| Spike 4 - 50 ppb | \ | 55. |
| Single pass - short-circuit | \ | 10.14 |
| Spike 5 - 50 ppb | 86 | 67.98 |
| Single pass - 0.4 V | 14 | 13.36 |
| Spike 6 - 50 ppb | 72, 90 | 61.41 |
| Single pass - 0.6 V | 2, 5 | 7.26 |

TABLE 22-continued

Pb removal results for pristine Kynol
anodes and citric acid oxidized Kynol cathodes

| Sample | $Pb^{2+}$ Concentration (ppb)* | ICP-MS (ppb) |
|---|---|---|
| Spike 7 - 50 ppb | 32 | 26.94 |
| Single pass - 0.8 V | 13 | 8.99 |
| Spike 8 - 50 ppb | 52 | 50.70 |
| Single pass - 1.0 V | 31 | 10.04 |
| Spike 9 - 50 ppb | <2 | 38.04 |
| Single pass - 1.2 V | \ | 2.89 |
| Spike 10 - 50 ppb | \ | 29.91 |
| Single pass - 1.4 V | \ | 7.26 |
| Spike 11 (150 ppb) | \ | 129.41 |
| Single pass - 1.2 V | \ | 5.32 |

*Measurements taken with ANDalyze sensor

The experimental results in Table 23 are for pristine anodes and nitric acid oxidized cathodes. The measured concentrations of Pb are below the spiked value of ~50 ppb. The pH was close to 9 and there was likely insoluble Pb species not being accounted for in the measurement. An orange precipitate was also observed on the last pristine piece of carbon (anode), visible on the perimeter of the filter paper.

TABLE 23

Pb removal results for pristine Kynol
anodes and nitric acid oxidized Kynol cathodes

| Sample | $Pb^{2+}$ Concentration (ppb)* | ICP-MS (ppb) |
|---|---|---|
| Spike 1 - 50 ppb | >100, 112 | 58.33 |
| Single pass - OCV | >100, 48 | 27.51 |
| Spike 2 - 50 ppb | \ | 13.69, 12.15 |
| Single pass - OCV | \ | 26.60, 25.19 |
| Spike 3 - 50 ppb | 6 | 5.70 |
| Single pass - short-circuit | <2 | 5.40 |
| Spike 4 - 50 ppb | <2, 30 | 4.06 |
| Single pass - short-circuit | 10 | 5.00 |
| Spike 5 - 50 ppb | <2, 15 | 2.52 |
| Single pass - 0.4 V | <2 | 4.39 |
| Spike 6 - 50 ppb | \ | 3.09 |
| Single pass - 0.6 V | \ | 1.95 |
| Spike 7 - 50 ppb | <2 | 2.42 |
| Single pass - 0.8 V | 8 | 2.24 |
| Spike 8 - 50 ppb | \ | 24.38 |
| Single pass - 1.0 V | \ | 6.67 |
| Spike 9 - 50 ppb | \ | 17.87 |
| Single pass - 1.2 V | \ | 9.51 |
| Spike 10 - 50 ppb | \ | 3.83 |
| Single pass - 1.4 V | \ | 22.31 |
| Spike 11 (150 ppb) | \ | 10.52 |
| Single pass - 1.2 V | \ | 2.92 |

*Measurements taken with ANDalyze sensor

The experimental results in Table 24 are for pristine anodes and oven oxidized cathodes at 340° C. for 72 h. Pb removal was observed at short-circuit and 1.2 V. The dissolved oxygen (DO) was also monitored throughout the experiment and decreased with applied voltage, suggesting that oxygen is being reduced to $H_2O_2$ (Table 25).

TABLE 24

Pb removal results for pristine Kynol
anodes and oven oxidized Kynol cathodes

| Sample | $Pb^{2+}$ Concentration (ppb)* | ICP-MS (ppb) |
|---|---|---|
| Spike 1 - 50 ppb | 19 | 24.9 |
| Single pass - OCV | 3 | 3.7 |
| Spike 2 - 50 ppb | \ | 9.4 |
| Single pass - short-circuit | \ | 0.9 |
| Spike 7 - 50 ppb | >100 | 34.0 |
| Single pass - 1.2 V | <2 | 0.8 |

*Measurements taken with ANDalyze sensor

TABLE 25

Conductivity (κ), pH and DO
values for samples listed in Table 2

| Sample | κ (μS/cm) | pH | DO (%) |
|---|---|---|---|
| Spike 1 - OCV | 450 | 4.90 | 46.3 |
| Spike 2 - short-circuit | 473 | 6.15 | 59.8 |
| Spike 3 - 1.2 V | 217 | 6.04 | 17.3 |

Three carbons were tested: Kynol, Zorflex, and Fuel Cell Earth. Their properties are listed in Table 26. Results using Zorflex are shown in Table 27 and Table 28. The DO decreased and lead removal improved with applied voltage.

TABLE 26

Carbon properties

| Carbon | Conductivity (S/cm) | Pore Size (nm) | Surface Area (m²/g) |
|---|---|---|---|
| Zorflex | 0.2 | 1.2-3 | 1000-2000 |
| Kynol | 1.2 | 2.2 | 2000 |
| Fuel Cell Earth | 900 | N/A | <2 |

TABLE 27

Pb removal results for pristine Zorflex
anodes and nitric acid oxidized Zorflex cathodes

| Sample | $Pb^{2+}$ Concentration (ppb)* | ICP-MS (ppb) |
|---|---|---|
| Spike 1 | >100 | 36.1 |
| Single pass - OCV | 23 | 8.1 |
| Spike 2 | ~50 | 59.7 |
| Single pass - short-circuit | \ | 9.6 |
| Spike 7 | ~50 | 67.5 |
| Single pass - 1.2 V | 17 | 5.0 |

*Measurements taken with ANDalyze sensor

TABLE 28

Conductivity (κ), pH, and
DO values for samples listed in Table 26

| Sample | κ (μS/cm) | pH | DO (%) |
|---|---|---|---|
| Spike 1 - OCV | 644 | 6.16 | 64.2 |
| Spike 2 - short-circuit | 639 | 6.33 | 65.5 |
| Spike 3 - 0.4 V | 611 | 6.55 | 68.3 |

TABLE 28-continued

Conductivity (κ), pH, and
DO values for samples listed in Table 26

| Sample | κ (μS/cm) | pH | DO (%) |
|---|---|---|---|
| Spike 4 - 0.6 V | 591 | 6.60 | 54.4 |
| Spike 5 - 0.8 V | 626 | 6.84 | 58.4 |
| Spike 6 - 1.2 V | 440 | 6.21 | 6.6 |

Results using Kynol are shown in Table 18-Table 24, as well as below in Table 29, Table 32 and Table 36. For the results shown in Table 29 only OCV, short-circuit, and an applied potential of 1.2 V were tested. Lead removal to very low levels even at a starting concentration of ~10 ppb was achieved, and the DO concentration dropped to below 6% at 1.2 V. SEM/EDX confirmed Pb deposits on the electrodes (FIG. 13).

Fuel Cell Earth (www.fuelcellstore.com) is a graphitic cloth and is highly conductive. Results are shown in Table 30 and Table 31. There was no measurable current in either case, owing to its very low surface area. When the cell was taken apart after the first experiment (Table 30) there was orange precipitate on all filter paper, regardless of location in the cell. The experiment was repeated with pristine carbon for both the anode and cathode, and samples were taken after 3 h of cycling as opposed to a single pass (Table 31). In this case there was no lead removal at open circuit, some at short-circuit, and much more at an applied potential of 1.2 V. The DO remained unchanged regardless of applied potential, and $H_2O_2$ was measured to be 0 ppm at 1.2 V. Pb removal is likely occurring due to pH swings at the electrode surface and not by reacting with $H_2O_2$.

TABLE 29

Pb removal results for pristine Kynol
anodes and nitric acid oxidized cathodes

| Sample | κ (μS/cm) | pH | DO (%) | $Pb^{2+}$ Concentration (ppb) |
|---|---|---|---|---|
| Spike 1 | 508 | 6.30 | 43.9 | 29.1 |
| Single pass - OCV | 423 | 6.91 | 56.4 | 5.3 |
| Spike 2 | \ | \ | \ | 34.6 |
| Single pass - short-circuit | 421 | 7.05 | 60.6 | 7.7 |
| Spike 274 |  | 6.46 | 20.0 | 36.8 | 36.8 |
| Single pass - 1.2 V | 270 | 6.54 | 15.6 | 5.4 (3*) |
| Spike 4 | 305 | 6.35 | 16.2 | 14.6 |
| Single pass - 1.2 V | 301 | 6.40 | 14.7 | 5.2 |
| Spike 5 | 299 | 6.33 | 12.2 | 8.9 |
| Single pass - 1.2 V | 297 | 6.29 | 12.2 | 0.6 (<2*) |
| Spike 6 - 1.2 V | 326 | 6.10 | 10.2 | \ |

*Measurements taken with ANDalyze sensor

TABLE 30

Pb removal results for pristine Fuel Cell Earth
anodes and nitric acid oxidized Fuel Cell Earth cathodes

| Sample | $Pb^{2+}$ Concentration (ppb)* | ICP-MS (ppb) |
|---|---|---|
| Spike 1 | 48 | 31.1 |
| Single pass - OCV | 3 | 3.5 |
| Spike 4 | \ | 85.7 |
| Single pass-short-circuit | 17 | 15.2 |
| Spike 9 | 65 | 42.0 |
| Single pass - 1.2 V | <2 | 2.4 |
| Spike 14 | ~50 | \ |
| Single pass - 80 ml/min 1.2 V | <2 | 1.7 |

*Measurements taken with ANDalyze sensor

TABLE 31

Pb removal results for pristine
Fuel Cell Earth anodes and cathodes

| Sample | κ (μS/cm) | pH | DO (%) | $Pb^{2+}$ Concentration (ppb) |
|---|---|---|---|---|
| Spike 1 | \ | \ | \ | 125 |
| Single pass - OCV | 671 | 7.73 | 61.4 | 125 |
| Spike 2 | 671 | 7.73 | 61.4 | 125 |
| Single pass - short-circuit | 562 | 7.87 | 66.2 | 85 |
| Spike 3 | 562 | 7.87 | 66.2 | 85 |
| Single pass - 1.2 V | \ | \ | \ | 28 |
| 3 h - 1.2 V | 596 | 8.11 | 68.0 | 3 |
| Spike 4 | 671 | 8.28 | 71.4 | ~150 |
| 3 h - OCV | 670 | 8.29 | 70.4 | 146 |
| Spike 5 | 670 | 8.29 | 70.4 | 146 |
| 3 h - 1.2 V | 627 | 8.18 | 71.1 | 5 |

*Measurements taken with ANDalyze sensor

The same series of experiments as described above was conducted with Pb spiked into synthetic tap water (Table 32 and Table 33 This water did not contain any carbonates and had a similar concentration of other ionic species in our tap water. Pb removal was observed at OCV and short-circuit, with slightly more removal at 1.2 V. The DO concentration was low throughout the experiment.

TABLE 32

Pb removal results for pristine Kynol anodes
and nitric acid oxidized cathodes in synthetic tap water

| Sample | $Pb^{2+}$ Concentration (ppb)* | ICP-MS (ppb) |
|---|---|---|
| Spike 1 | 63 | 58.7 |
| Single pass - OCV | <2 | 6.1 |
| Spike 2 | >100 | 86.5 |
| Single pass - 1.2 V | 5 | 6.4 |
| Spike 3 | \ | 12.7 |
| Single pass - 1.2 V | \ | 3.6 |
| Spike 7 | 31 | \ |
| Single pass - 0.6 V | 11 | \ |

*Measurements taken with ANDalyze sensor

TABLE 33

Conductivity (κ), pH and DO values for samples listed in Table 31

| Sample | κ (μS/cm) | pH | DO (%) |
|---|---|---|---|
| Spike 1-OCV | 468 | 5.16 | 7.30 |
| Spike 2-1.2 V | 350 | 6.02 | 5.94 |
| Spike 3-1.2 V | 329 | 5.89 | 5.22 |
| Spike 7-0.6 V | 452 | 6.12 | 6.01 |

Breakthrough curves were obtained for packed columns of pristine or nitric acid oxidized carbon (~5 g) and 1 L of ~150 ppb Pb [Pb(NO$_3$)$_2$] tap H$_2$O was filtered at a flow rate of 20 mL/min (Table 34 and Table 35). In this case, Pb removal is occurring via physical adsorption (passive filtration) as opposed to capacitive adsorption and coagulation (active filtration) with our device. The initial Pb concentration decreases dramatically, but both carbons saturate quickly at ~0.3 L of water treated and become ineffective. Pristine carbon appears to be more effective for physical adsorption of lead as compared to oxidized carbon at the conditions tested. To determine when a flow-through embodiment of a FPC device becomes saturated, 5 gallons of water were treated at 1.2 V in a single pass with 12 pairs of electrodes (~10 g) at 20 mL/min. Sustained performance for 5 gallons of water treated was obtained (Table 36). The concentration of lead remained low after filtration, whereas the concentration of calcium (Ca$^{2+}$) was approximately constant, demonstrating a selectivity >99% for lead. This experiment was repeated with a flow-by device where 5 gallons of water were treated at 1.2 V in a single pass with 14 pairs of electrodes (~30 g) at 100 mL/min (Table 37). Pb removal was maintained for the total volume passed, even from an extremely high starting Pb concentration.

TABLE 34

Results for treated water after flowing through packed column of pristine Kynol (reduced carbon)

| Sample | Pb$^{2+}$ Concentration (ppb)* |
|---|---|
| Feed | 120 |
| 1 min | 5 |
| 3 min | 13 |
| 5 min | 41 |
| 15 min | 66 |
| 30 min | 46 |
| 45 min | 56 |

*Measurements taken with ANDalyze sensor

TABLE 35

Results for treated water after flowing through packed column of nitric acid oxidized Kynol (oxidized carbon)

| Sample | Pb$^{2+}$ Concentration (ppb)* |
|---|---|
| Feed | 178 |
| 1 min | <2 |
| 15 min | 128 |
| 30 min | 116 |
| 45 min | 106 |

*Measurements taken with ANDalyze sensor

TABLE 36

Results for 5 gallons of treated water with pristine Kynol anodes and nitric acid oxidized cathodes from ~300 ppb Pb feed solution

| | | | | Pb$^{2+}$ Concentration | | Ca$^{2+}$ Concentration |
|---|---|---|---|---|---|---|
| Sample | κ (μS/cm) | pH | DO (%) | ANDalyze (ppb) | ICP-MS (ppb) | ICP-MS (ppb) |
| Feed | 458 | 7.00 | 17.3 | 275 | 295.72 | 42.21 |
| 1 gallon | 470 | 7.10 | 17.2 | <2 | 0.92 | 42.29 |
| 2 gallons | 470 | 7.14 | 16 | <2 | 0.50 | 44.72 |
| 3 gallons | 479 | 7.09 | 11.4 | <2 | 0.15 | 44.83 |
| 4 gallons | 488 | 7.25 | 10.4 | <2 | 0.19 | 47.05 |
| 5 gallons | \ | \ | \ | <2 | 1.53 | 47.27 |

TABLE 37

Results for 5 gallons of treated water with pristine Kynol anodes and nitric acid oxidized cathodes from ~10,000 ppb Pb feed solution

| Sample | Pb$^{2+}$ Concentration (ppb)* | ICP-MS (ppb) |
|---|---|---|
| Feed | ~10,000 | 2149.42 |
| 1 gallon | <2 | 0.28 |
| 2 gallons | \ | 0.29 |
| 3 gallons | \ | 0.38 |
| 4 gallons | \ | 0.49 |
| 5 gallons | <2 | 0.58 |

*Measurements taken with ANDalyze sensor

A flow-by capacitive coagulation experiment with a 1.5 L feed solution of ~150 ppb Pb [Pb(NO$_3$)$_2$] in tap H$_2$O, 14 pairs of carbon electrodes (~30 g), and a flow rate of 300 mL/min was carried out at and applied potential 1.2 V (Table 38). Samples were taken before and after a single pass through the cell and the Pb$^{2+}$ concentration measured with a handheld sensor from ANDalyze. The treated sample was at the limit of detection of the sensor.

TABLE 38

Lead removal at 300 mL/min

| Sample | Pb$^{2+}$ Concentration (ppb) | Removal (%) |
|---|---|---|
| Untreated | ~150 | n/a |
| Treated | 2 | 97.73 |

A flow-by capacitive coagulation experiment with a 1.5 L feed solution of ~150 ppb Pb [Pb(NO$_3$)$_2$] in tap H$_2$O at a pH of 2.83, adjusted with concentrated H$_2$SO$_4$, 14 pairs of carbon electrodes (~30 g), and a flow rate of 100 mL/min was carried out at and applied potential 1.2 V (Table 39). Samples were taken before and after a single pass through the cell and the Pb$^{2+}$ concentration measured with a handheld sensor from ANDalyze. The treated sample was below the limit of detection of the sensor.

TABLE 39

Lead removal at pH 2.83

| Sample | Pb$^{2+}$ Concentration (ppb) | Removal (%) |
|---|---|---|
| Untreated | 88 | n/a |
| Treated | <2 | 97.73 |

A flow-by capacitive coagulation experiment with a 1.5 L feed solution of ~150 ppb Pb in a Pb-acid battery manufacturer wastewater sample, 14 pairs of carbon electrodes (~30 g), and a flow rate of 100 mL/min was carried out at and applied potential 1.2 V (Table 40). Samples were taken before and after a single pass through the cell and the $Pb^{2+}$ concentration measured with a handheld sensor from ANDalyze. The effluent was well below the assigned Pb discharge limit of 0.6 ppm.

TABLE 40

Lead removal at pH 2.83

| Sample | $Pb^{2+}$ Concentration (ppb) | Removal (%) |
| --- | --- | --- |
| Untreated | 88 | n/a |
| Treated | <2 | 97.73 |

A rolled cell design was used for capacitive coagulation experiments with a 1.5 L feed solution of ~150 ppb Pb [$Pb(NO_3)_2$] in tap $H_2O$, ~14 g of carbon electrodes, pristine anodes and nitric acid oxidized cathodes, and flow rates of 50, 100, and 200 mL/min, all showed Pb removal to below the federal action level of 15 ppb in a single pass (Table 41). The cell was operated at an applied potential of 1.2 V. Samples were taken before and after filtration with the cell and the $Pb^{2+}$ concentration measured with a handheld sensor from ANDalyze.

TABLE 41

Lead removal results for a rolled cell design

| Sample | $Pb^{2+}$ Concentration (ppb) | Removal (%) |
| --- | --- | --- |
| Untreated | 122 | n/a |
| Treated at 50 ml/min | 8 | 93.4 |
| Untreated | ~150 | n/a |
| Treated at 100 ml/min | 8 | 94.7 |
| Untreated | ~150 | n/a |
| Treated at 200 ml/min | 13 | 91.3 |

Figure 29:
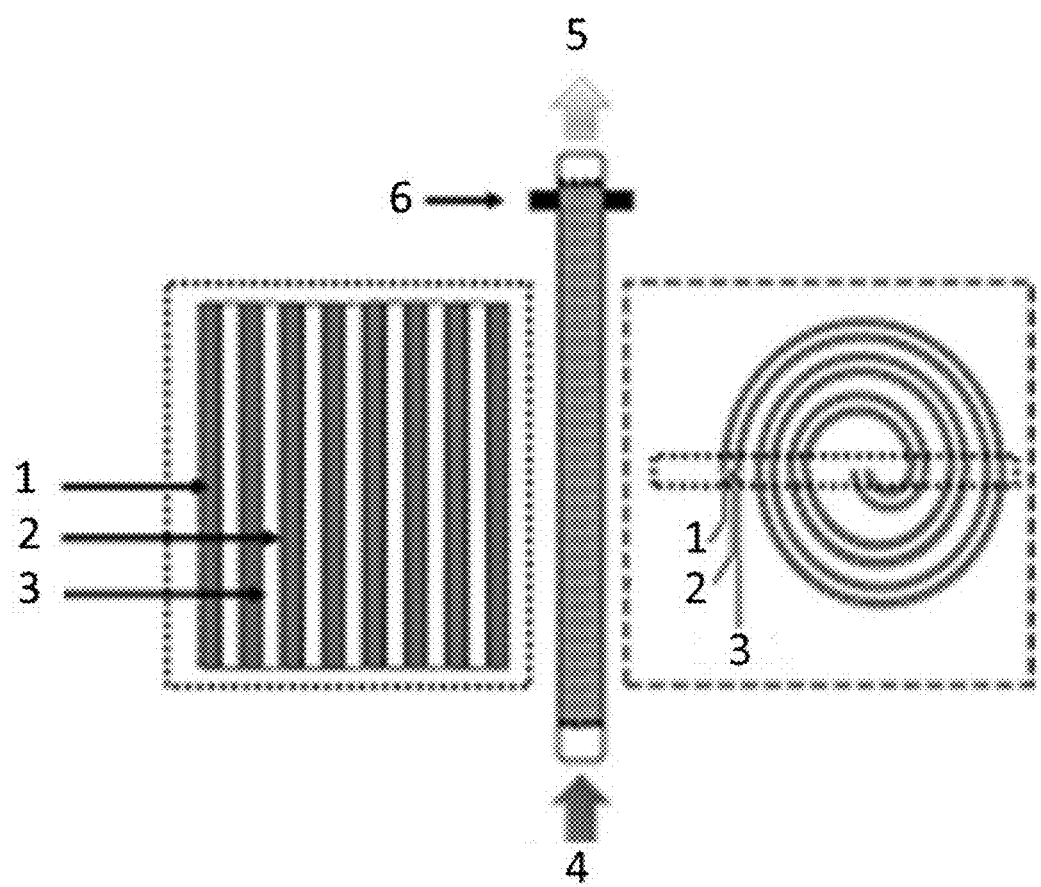
FIG. 29. Schematic of a rolled cell design in which continuous separator and porous carbon-based electrode materials are physically rolled into a spiral to create a cylinder with multiple, predominantly flow-by, through stream paths through the porous carbon electrode.

A rolled cell design was used for capacitive coagulation experiments with a 1.5 L feed solution of ~50 ppb Pb [$Pb(NO_3)_2$] and 2.5 ppm Pb in tap $H_2O$, as well as ~10 ppm Cu in tap water. Pb removal was below the federal action level of 15 ppb for the lower concentration and <1 ppm for the higher concentration (Table 42). Cu removal was >99% (Table 43). A schematic of a rolled cell is shown in FIG. 29.

TABLE 42

Results for Pb removal from tap water with a rolled cell architecture. Feed 2 was adjusted to pH 5.08 with sulfuric acid.

| Sample | Pb (ppm) |
| --- | --- |
| Feed 1 | 0.028* |
| Treated 1 | <0.002* |
| Feed 2 | 2.45** |
| Treated 2 | 0.83** |

*Measurement taken with ANDalyze sensor
**ICP-OES measurements

TABLE 43

ICP-OES results for Cu removal from tap water with a rolled cell architecture. The feed was adjusted to pH 2.4 with sulfuric acid.

| Sample | Cu (ppm) |
| --- | --- |
| Feed | 9.67 |
| Treated | <0.01 |

A series cell architecture was used for capacitive coagulation experiments with a solution of 2.5 ppm Pb [$Pb(NO_3)_2$] in tap $H_2O$ and ~30 g of carbon electrodes at 1.2 V. A consecutive 5 gallons of water were treated and concentrations were consistently below 48 ppb (Table 44).

TABLE 44

ICP-OES results for Pb removal from tap water with a series cell architecture. The feed was adjusted to pH 5 with sulfuric acid.

| Sample | Pb (ppm) |
| --- | --- |
| Feed | 2.53 |
| 2 Gallons Treated | 0.015 |
| 3 Gallons Treated | 0.026 |
| 4 Gallons Treated | 0.045 |
| 5 Gallons Treated | 0.048 |

Carbon blocks were used for capacitive coagulation experiments with a 1.5 L feed solution of ~50 ppb Pb [$Pb(NO_3)_2$] in tap $H_2O$ (Table 45). Pb removal was below the federal action level of 15 ppb.

TABLE 45

ICP-OES results for Pb removal from tap water with a carbon block architecture.

| Sample | Pb (ppb) |
| --- | --- |
| Feed | 55.35 |
| Treated | 4.48 |

Industrial wastewater containing multiple metal species, Cu, Fe, and Mn, at concentrations in the ppm range was used for flow-by capacitive coagulation experiments. Flow rates of 0.5, 1.0, and 1.5 L/min were tested at 1.2 V. Cu was reduced by >98%, Fe by >14%, and Mn by >87% (Table 46).

TABLE 46

ICP-OES results for metals removal from an industrial wastewater sample at increasing flow rates. The feed was adjusted to pH 5 with sulfuric acid. Ca concentration remains unchanged, demonstrating the exceptional selectivity of the cell for metals.

| | Feed | Treated (ppm) | | |
| --- | --- | --- | --- | --- |
| Parameter | (ppm) | 0.5 L/min | 1.0 L/min | 1.5 L/min |
| Ca | 60.53 | 63.12 | 61.718 | 58.21 |
| Cu | 4.39 | 0.083 | 0.071 | 0.070 |
| Fe | 0.34 | 0.0008 | 0.0007 | 0.0007 |
| Mn | 0.43 | 0.18 | 0.15 | 0.11 |

Reverse osmosis (RO) concentrate, or brine, containing multiple metal species, Cu, Fe, and Mn, at concentrations in the ppb range was used for flow-by capacitive coagulation experiments. Flow rates of 0.1, 0.5, and 1.0 L/min were tested at 1.2 V. Cu was reduced by >99%, Fe by >99%, and Mn by >74% (Table 47).

TABLE 47

ICP-MS results for metals removal from reverse osmosis (RO) brine at increasing flow rates.

| Parameter | Feed (ppb) | Treated (ppb) | | |
|---|---|---|---|---|
| | | 0.1 L/min | 0.5 L/min | 1.0 L/min |
| Cu | 9.85 | <0.034 | <0.034 | 0.75 |
| Fe | 14.56 | 2.95 | 4.17 | 6.50 |
| Mn | 105.57 | 13.07 | 24.06 | 41.43 |

Total and free chlorine were measured before and after treatment with an EDC tuned for chlorine removal. Chloramine was estimated from the difference between total and free chlorine. Free chlorine removal of >99% and chloramine removal of up to 99% was obtained. A voltage <3.0 V was applied to the cell during operation. Flow rates of 100 to 500 ml/min were tested. A total of ~210 gallons of water was treated before degradation in performance was observed, strictly due to charge loss from pore collapse.

Figure 30:
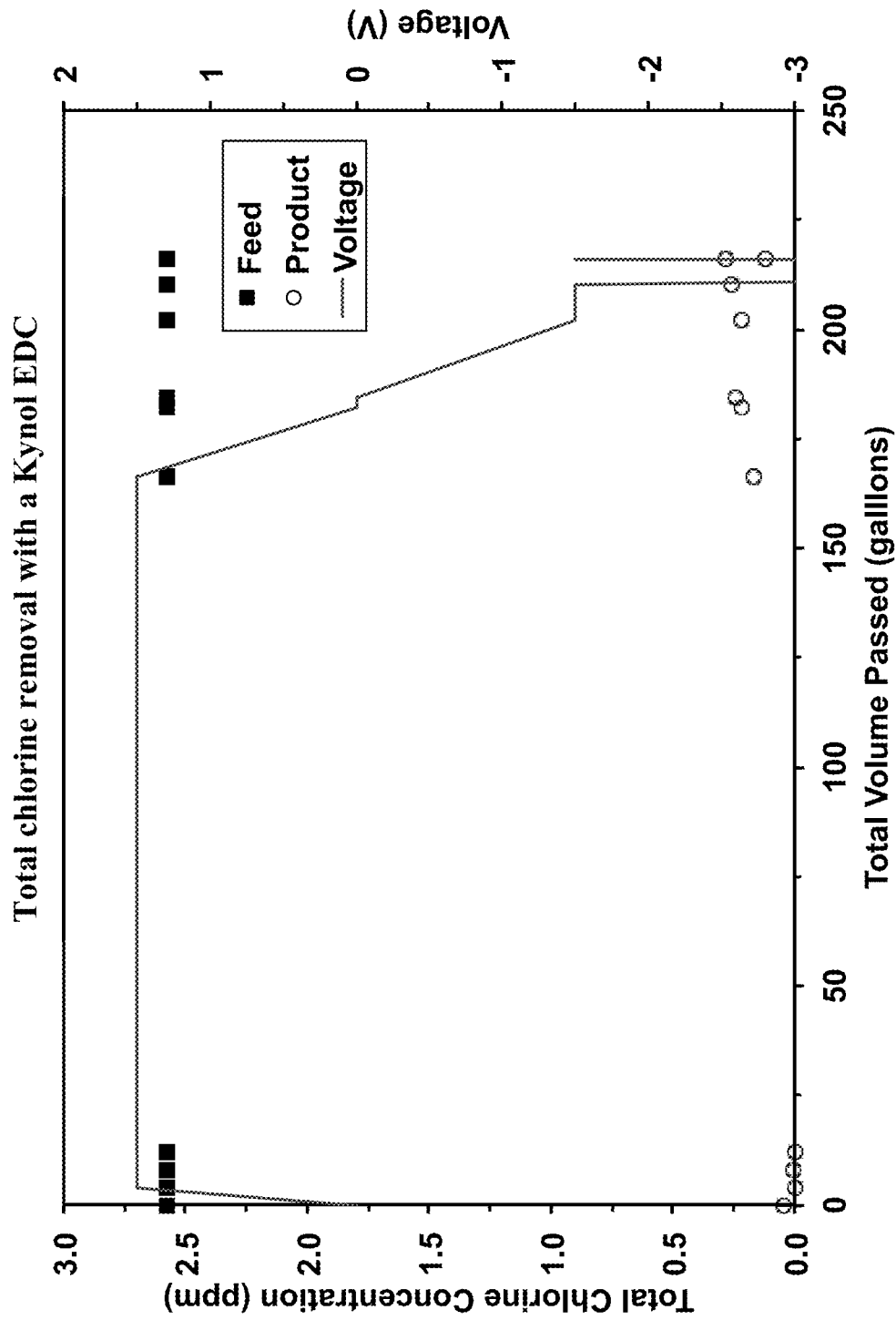
FIG. 30. EDC experiments conducted with Kynol as both electrodes. Concentration of total chlorine in the feed and product streams, and applied voltage, as a function of volume treated at a flow rate of 500 ml/min is shown.
Figure 31:
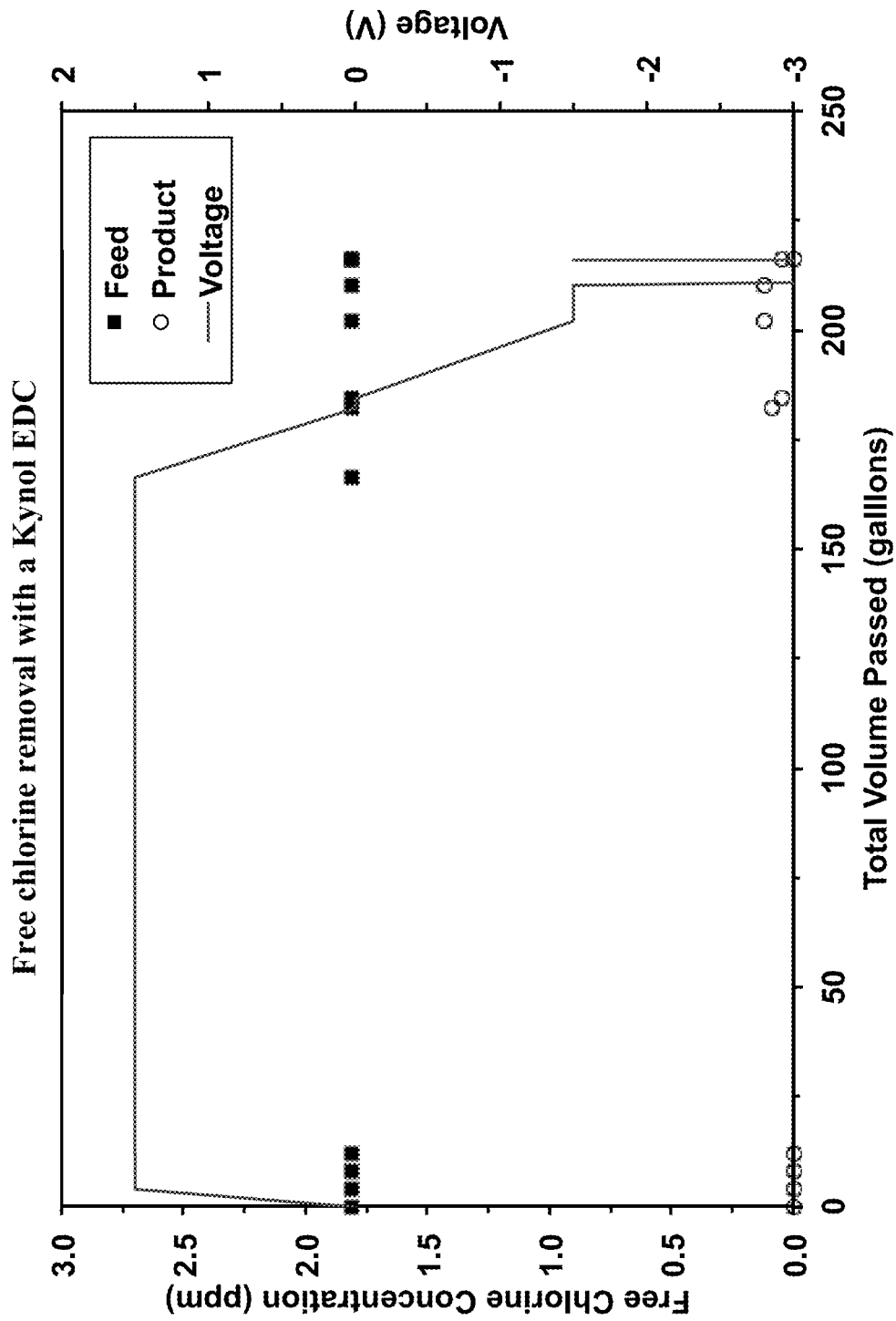
FIG. 31. EDC experiments conducted with Kynol as both electrodes. Concentration of free chlorine in the feed and product streams, and applied voltage, as a function of volume treated at a flow rate of 500 ml/min is shown.
Figure 32:
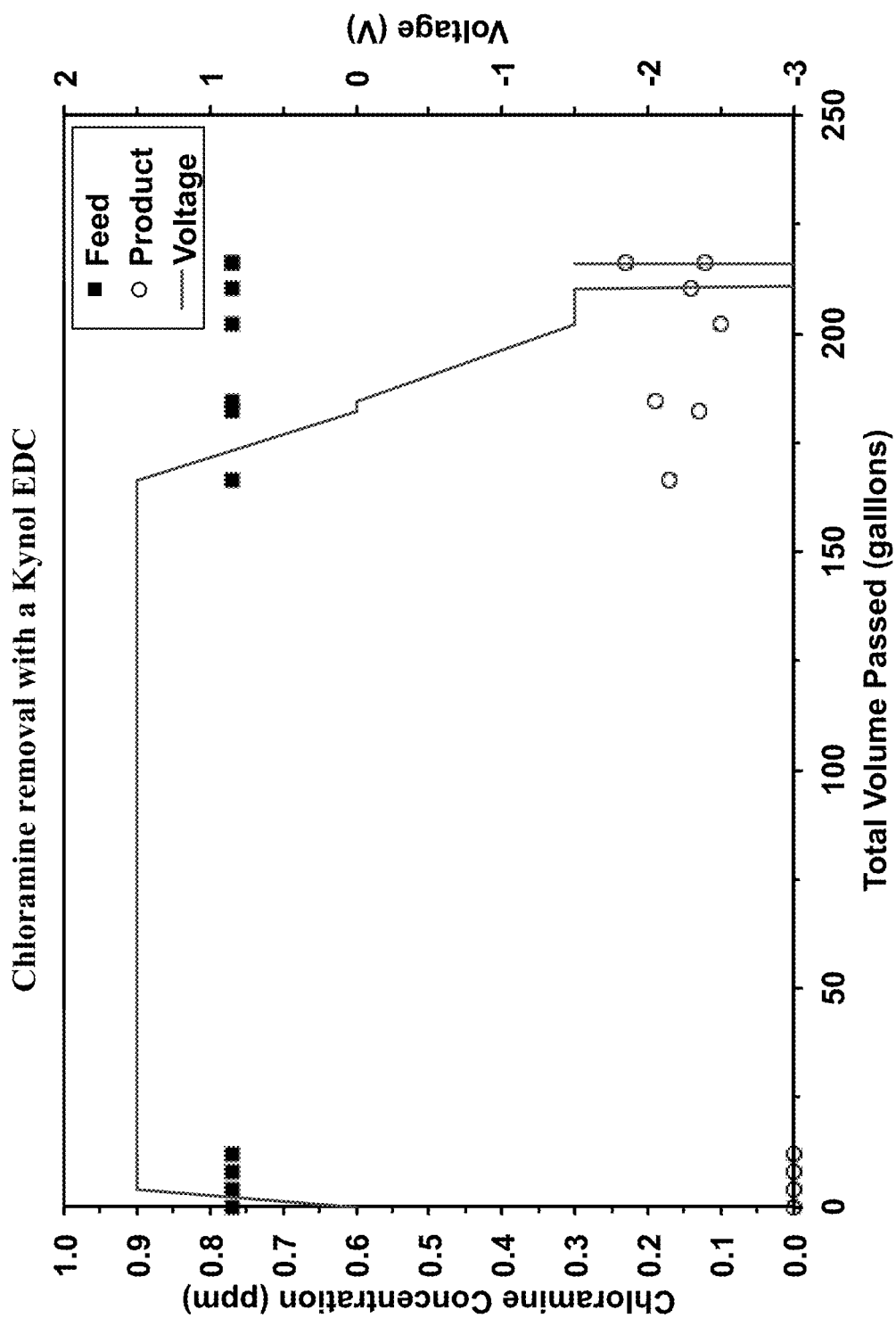
FIG. 32. EDC experiments conducted with Kynol as both electrodes. Concentration of chloramine in the feed and product streams, and applied voltage, as a function of volume treated at a flow rate of 500 ml/min is shown.
Figure 33:
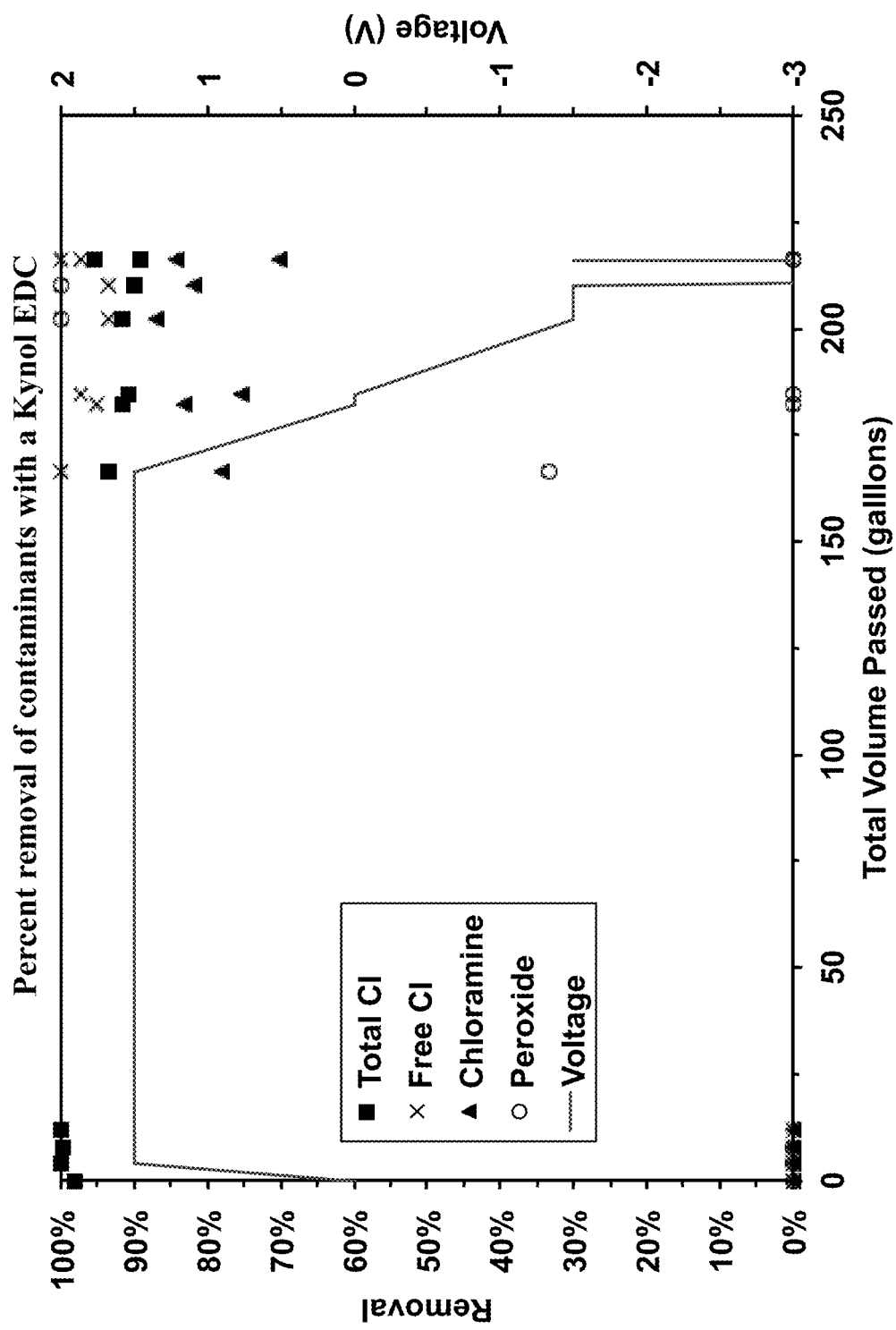
FIG. 33. EDC experiments conducted with Kynol as both electrodes. Percent removal of total chlorine, free chlorine, chloramine, and peroxide after treatment of tap water with the EDC, and applied voltage, as a function of volume treated at a flow rate of 500 ml/min is shown.

Oxidized Kynol (nitric acid treatment) was used as the anode and pristine Kynol as the cathode when V >0; electrodes are switched when V<0. Total chlorine in the feed (influent) and product (effluent) streams is shown in FIG. 30; a clear reduction of total chlorine in the effluent was observed. FIG. 31 and FIG. 32 show the concentration of free chlorine and chloramine in the feed and product streams, respectively. FIG. 33 shows the % removal of each disinfectant. Free chlorine removal of >99% and chloramine removal of ~80% was obtained. Peroxide removal of up to 100% was also achieved after treatment with the EDC.

Figure 34:
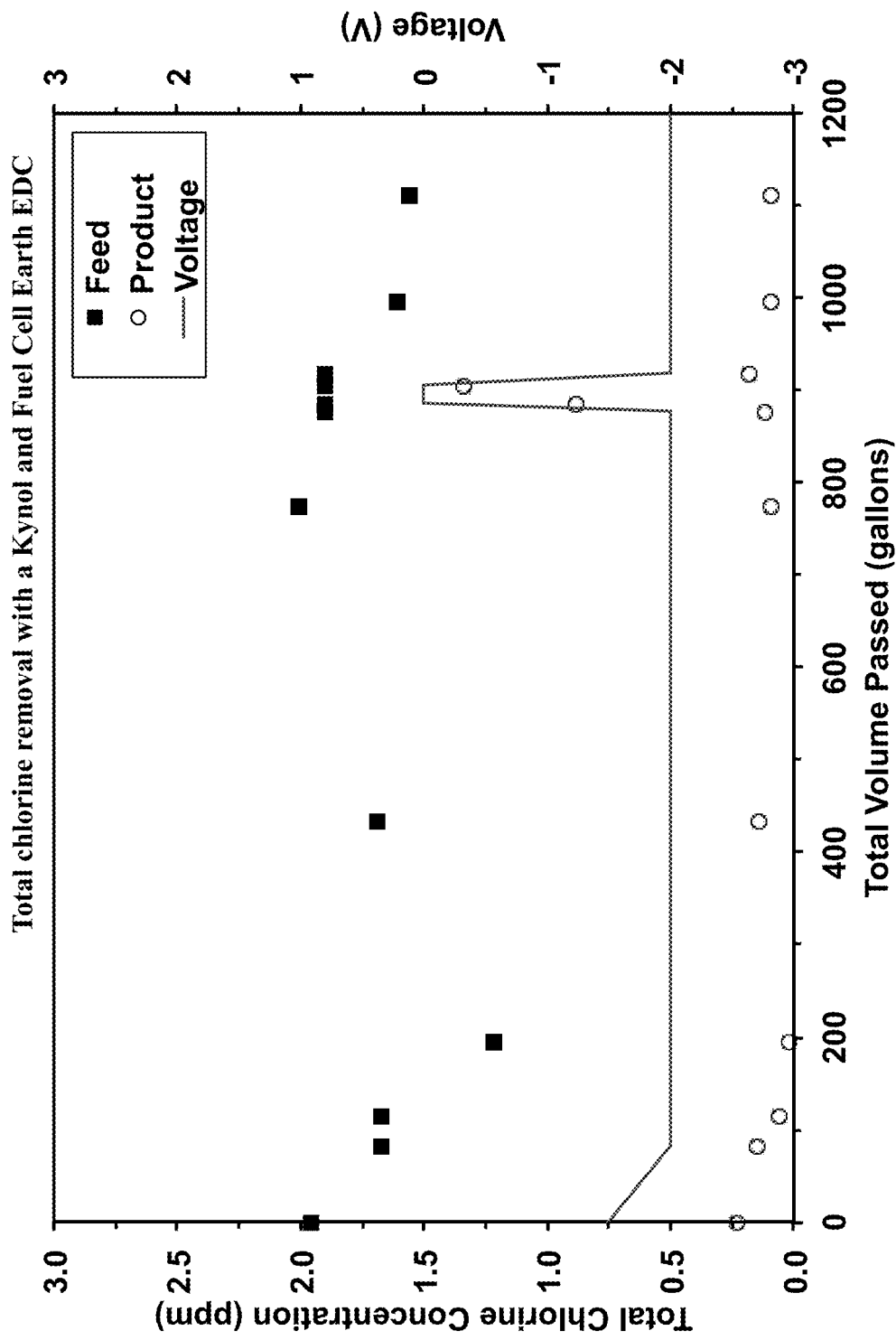
FIG. 34. EDC experiments conducted with oxidized Kynol as one electrode and Fuel Cell Earth as the other. Concentration of total chlorine in the feed and product stream, and applied voltage, as a function of volume treated at a flow rate of 300-500 ml/min.
Figure 35:
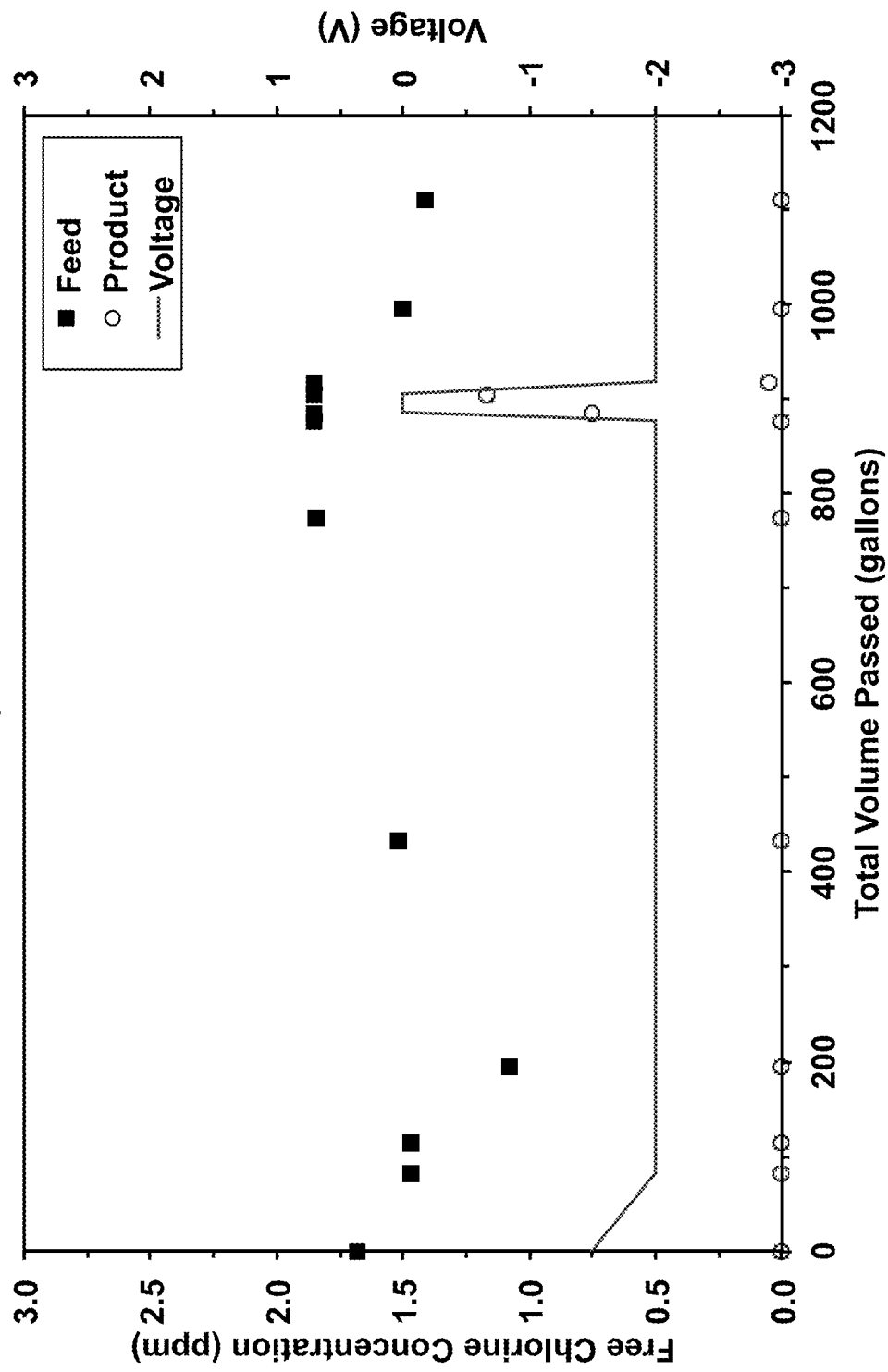
FIG. 35. EDC experiments conducted with oxidized Kynol as one electrode and Fuel Cell Earth as the other. Concentration of free chlorine in the feed and product stream, and applied voltage, as a function of volume treated at a flow rate of 300-500 ml/min.
Figure 36:
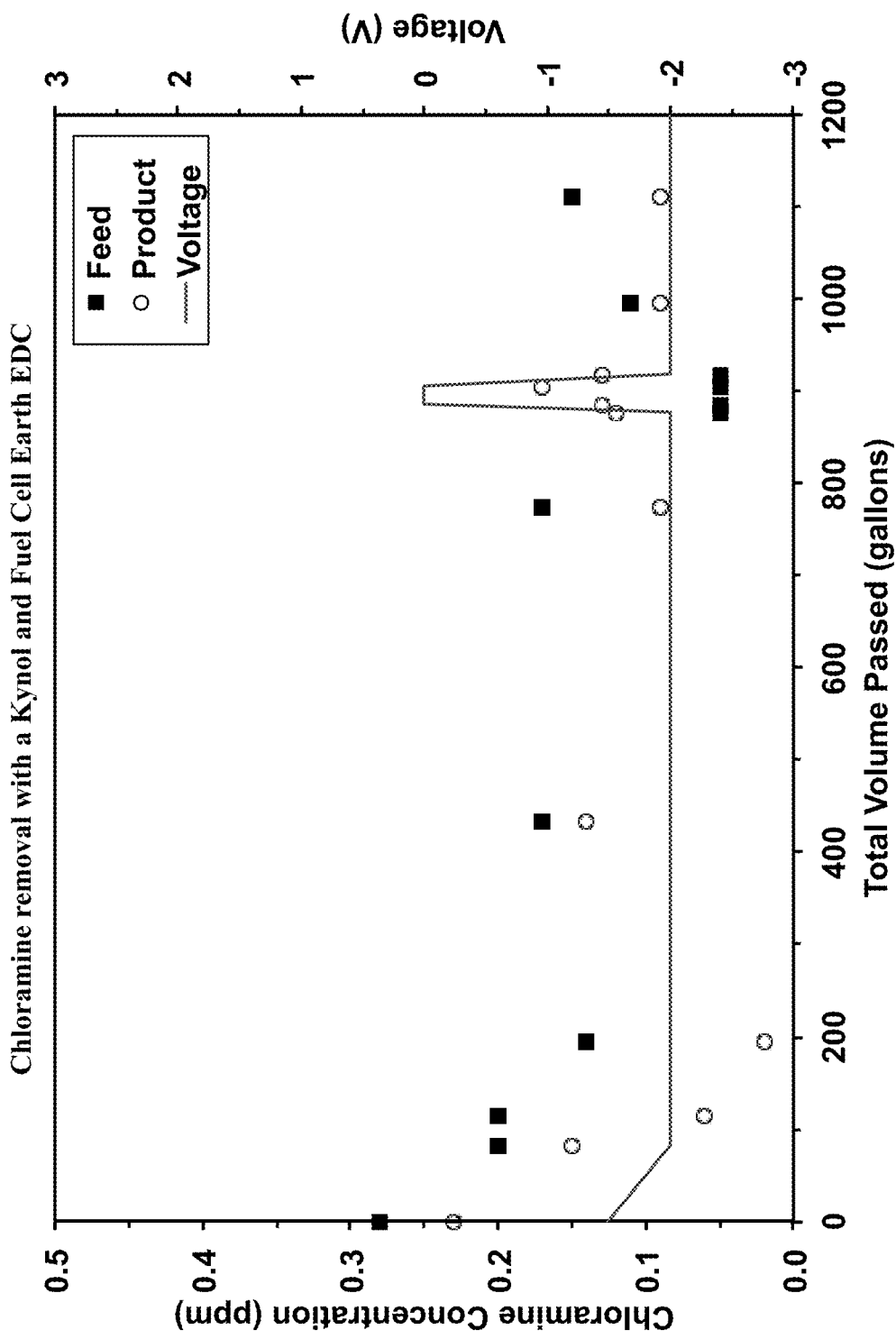
FIG. 36. EDC experiments conducted with oxidized Kynol as one electrode and Fuel Cell Earth as the other. Concentration of chloramine in the feed and product stream, and applied voltage, as a function of volume treated at a flow rate of 300-500 ml/min.
Figure 37:
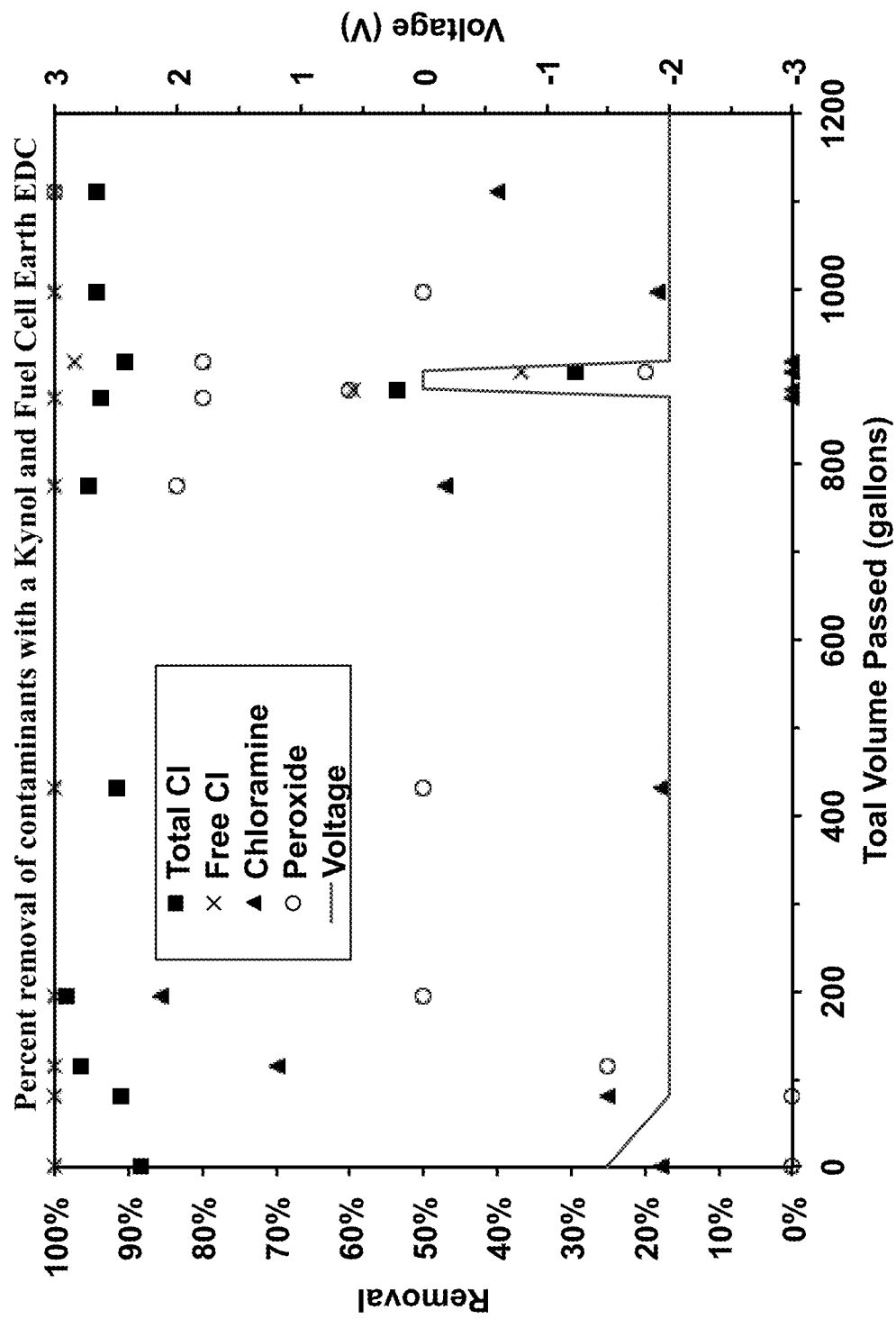
FIG. 37. EDC experiments conducted with oxidized Kynol as one electrode and Fuel Cell Earth as the other. Percent removal of total chlorine, free chlorine, chloramine, and peroxide after treatment of tap water with the EDC, and applied voltage, as a function of volume treated.

Oxidized Kynol (nitric acid treatment) was used as the cathode and Fuel Cell Earth as the anode. Total chlorine in the feed and product streams is shown in FIG. 34; a clear reduction of total chlorine in the effluent was observed at an applied voltage of 2.0 V. FIG. 35 and FIG. 36 show the concentration of free chlorine and chloramine in the feed and product streams, respectively. FIG. 37 the % removal of each disinfectant. Free chlorine removal of >99% and chloramine removal of ~40% was obtained. Peroxide removal of ~60% was also achieved after treatment with the EDC.

Figure 38:
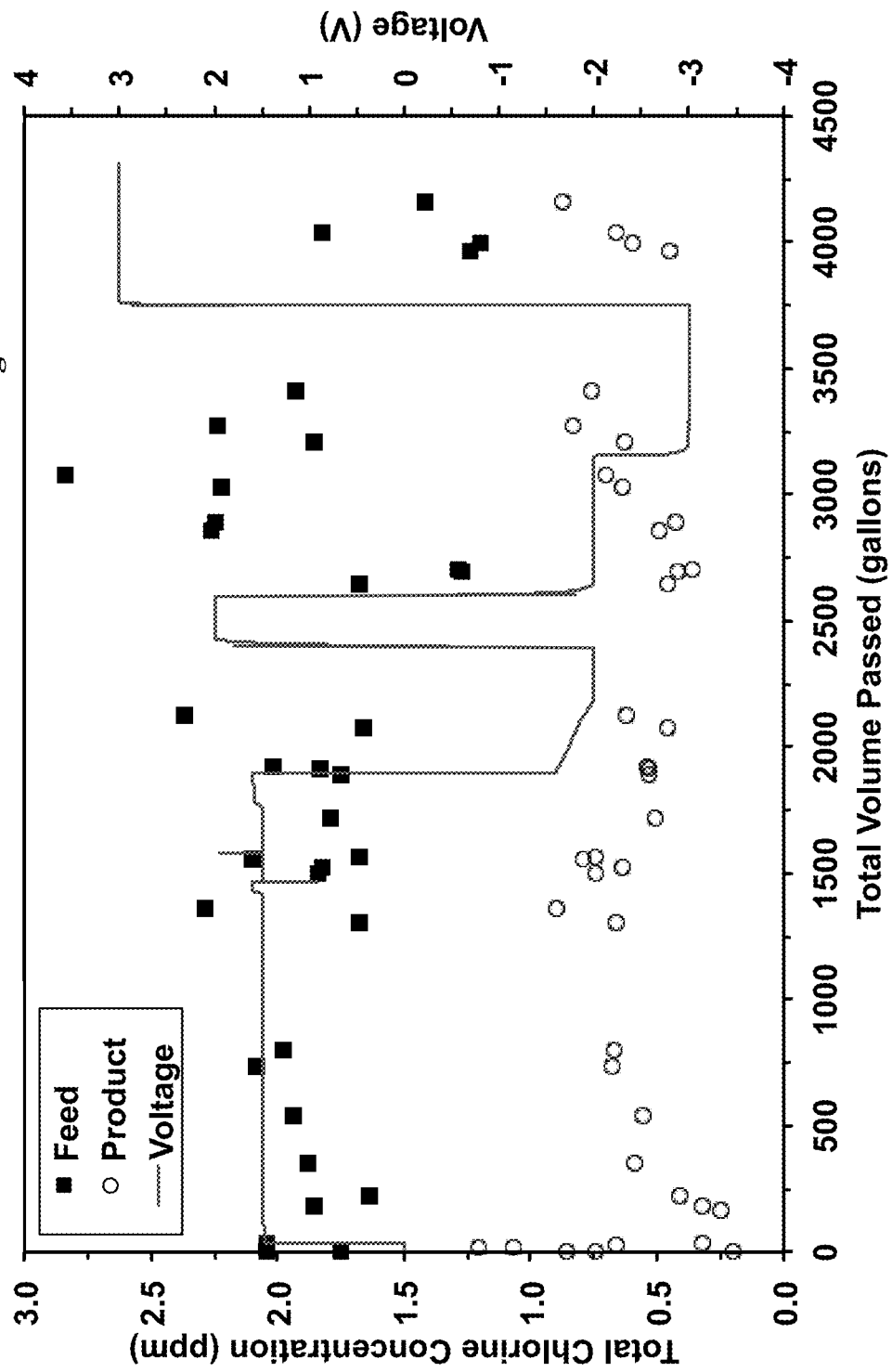
FIG. 38. EDC experiments conducted with Calgon as both electrodes. Concentration of total chlorine in the feed and product stream, and applied voltage, as a function of volume treated at a flow rate of 300-500 ml/min.
Figure 39:
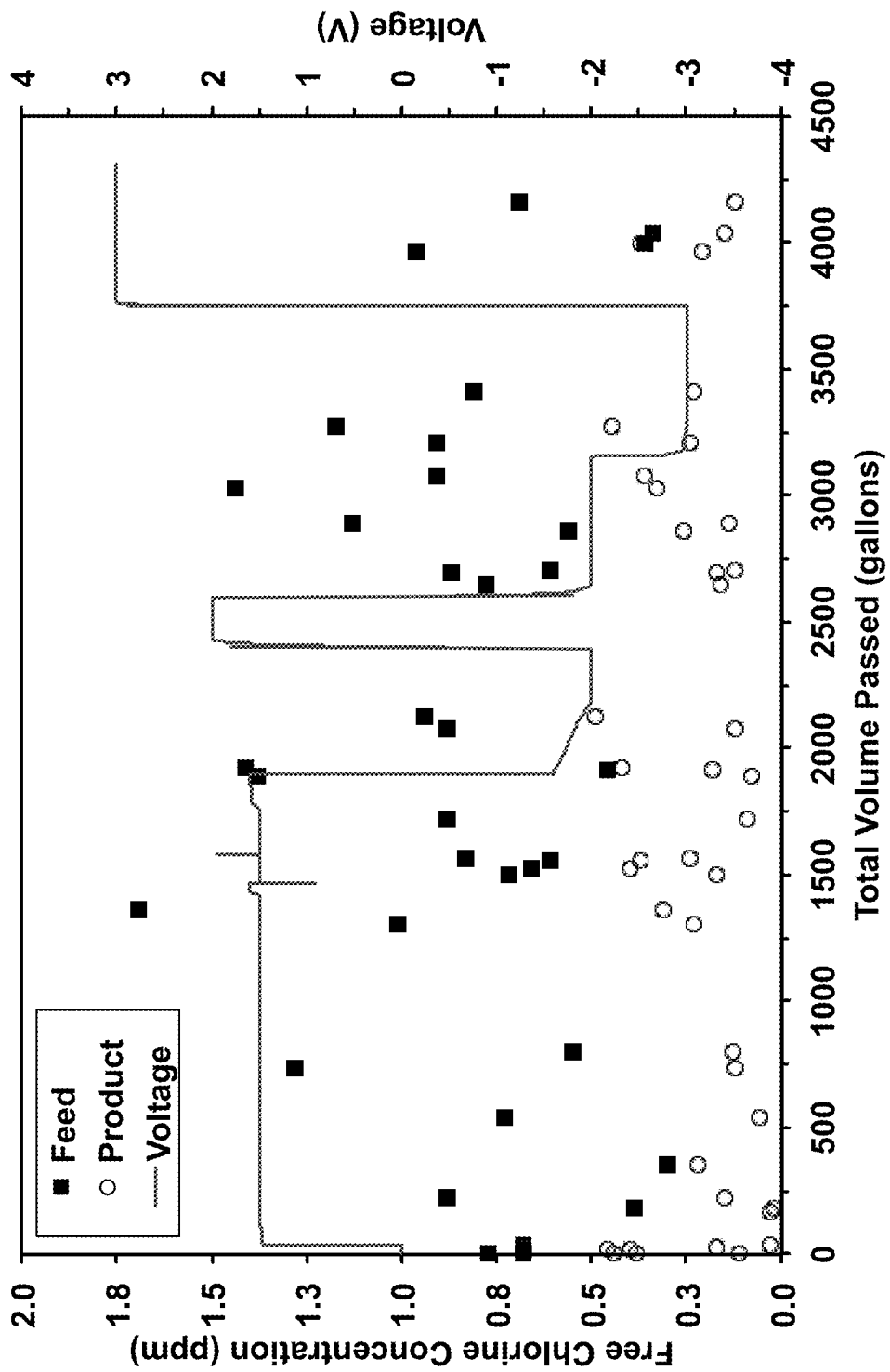
FIG. 39. EDC experiments conducted with Calgon as both electrodes. Concentration of free chlorine in the feed and product stream, and applied voltage, as a function of volume treated at a flow rate of 300-500 ml/min.
Figure 40:
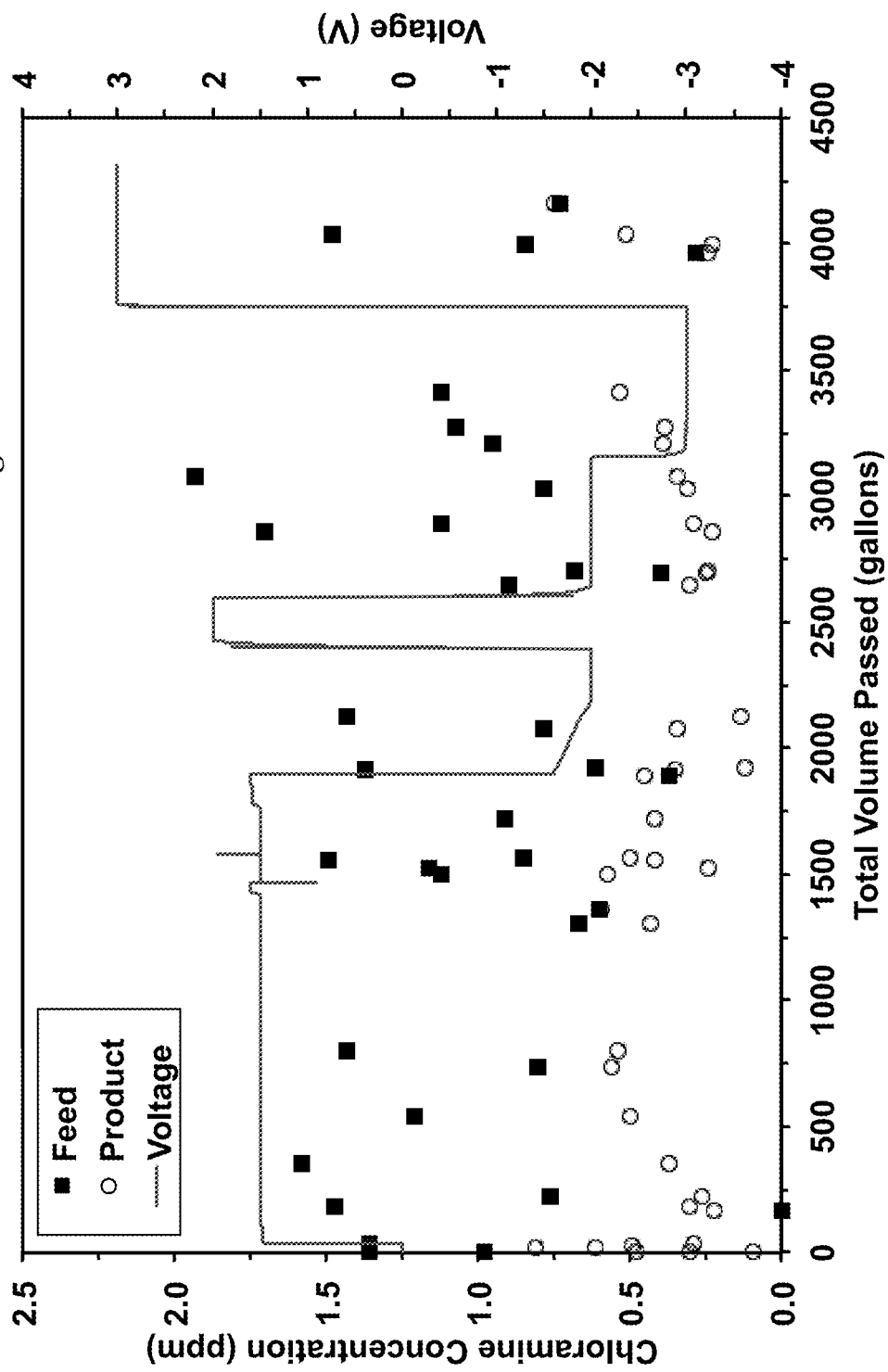
FIG. 40. EDC experiments conducted with Calgon as both electrodes. Concentration of chloramine in the feed and product stream, and applied voltage, as a function of volume treated at a flow rate of 300-500 ml/min.
Figure 41:
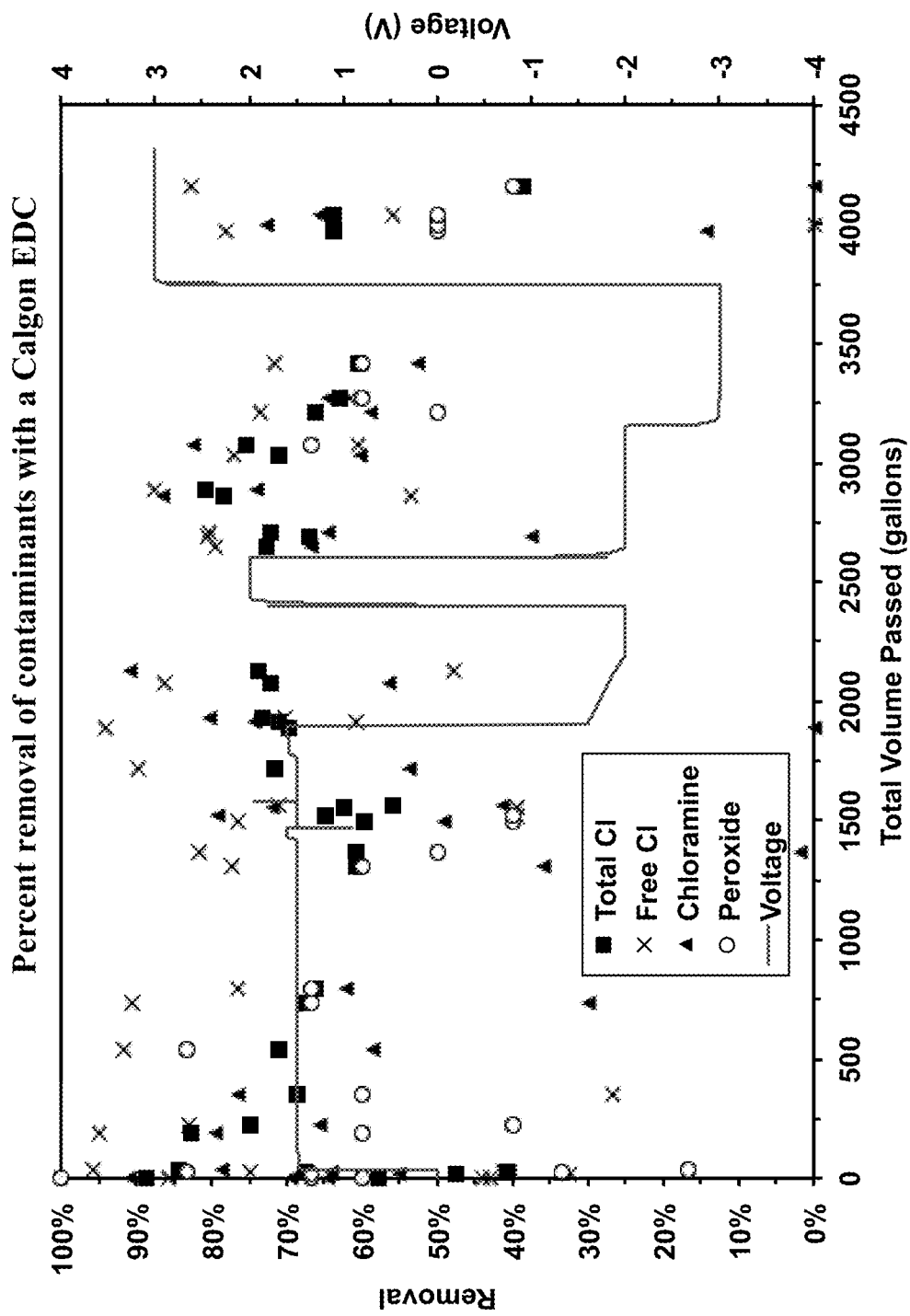
FIG. 41. EDC experiments conducted with Calgon as both electrodes. Percent removal of total chlorine, free chlorine, chloramine, and peroxide after treatment of tap water with the EDC, and applied voltage, as a function of volume treated.

Oxidized Calgon (nitric acid and electrochemical treatment) was used as the anode and pristine Calgon as the cathode when V >0; electrodes are switched when V<0. Total chlorine in the feed and product streams is shown in FIG. 38; a clear reduction of total chlorine in the effluent was observed. FIG. 39 and FIG. 40 show the concentration of free chlorine and chloramine in the feed and product streams, respectively. FIG. 41 shows the % removal of each disinfectant. Free chlorine removal of up to 96% and chloramine removal of ~57% was obtained. Peroxide removal of ~57% was also achieved after treatment with the EDC.

SUMMARY

In summary, the FPC invention comprises an electrochemical device for purifying an aqueous solution, wherein at least one carbon-based anode and at least one carbon-based cathode (each such anode and cathode being a pristine electrode without $E_{PZC}$ shift) alternate within a container configured with at least one inlet that supplies an aqueous solution to the container, at least one outlet that discharges purified output from the container, a separator is disposed between each electrode, and a power supply with associated wiring provides a DC constant voltage or constant current to the carbon-based electrodes, wherein an aqueous solution containing at least one target species to be removed from the aqueous solution is admitted through the inlet, passes by or through the electrodes to a discharge channel that leads to the at least one outlet, wherein the DC voltage applied to the at least one anode and the DC voltage applied to the at least one cathode are DC voltages shown in a Pourbaix diagram of the at least one target species at which the at least one target species is agglutinated on an electrode through a mechanism selected from the group consisting of capacitive adsorption, faradic immobilization, and both capacitive adsorption and faradic immobilization. The agglutination of the at least one target species is caused oxidation of the target species in a pH region of <4 near the at least one anode. Alternatively, the agglutination of the at least one target species is caused by oxidation of the target species in a pH region of <4 near the at least one anode, wherein the oxidation arises from production of oxidizers in a pH region of >10 near the at least one cathode. The power supply is controlled by a process controller or manually. The material with which the electrodes are fabricated has high aqueous permeability and is selected from the group consisting of activated carbon cloth, a mixture of microporous and mesoporous activated carbon, a mixture of mesoporous and macroporous activated carbon, and a mixture of microporous, mesoporous, and macroporous activated carbon. The separator thickness is selected from the group consisting of a range of 1 nm to 100 microns, 2 nm to 50 microns, 2 nm to 30 microns, 1 to 100 microns, 1 to 50 microns, and 1 to 30 microns. The DC voltage used to achieve faradic immobilization is selected from the group consisting of less than 0.6 V, less than 1.2 V, and less than 2.0 V. The electrodes can optionally be separated by an impermeable insulator and wherein the through stream flows only through the porous electrode before reaching a discharge channel, or by a permeable separator wherein the through stream flows by the electrodes through the separator to the discharge channel. An ion-exchange membrane can optionally cover the at least one anode, the at least one cathode, or both electrodes. The electrical potential of zero charge of at least one carbon-based electrode can be shifted by a mechanism selected from the group consisting of reduction of a cathode, oxidation of a cathode, reduction of an anode, and oxidation of an anode. The spacing between electrodes is selected from the group consisting of less than 1 mm, less than 200 microns, less than 50 microns, and less than 20 microns. The cell design of an FPC can be rolled or stacked.

An anode in an FPC can have an average pore mouth diameter selected from the group consisting of an average pore mouth diameter of 2.0 to 10 nm achieved with a pore mouth diameter profile from 0% to 30% microporous activated carbon and from 70% to 100% mesoporous activated carbon, wherein the microporous activated carbon comprises carbon with a conductivity value >10 S/cm, and an average pore mouth diameter 2.5 to 10 nm achieved with a pore mouth diameter profile of 0% to 20% macroporous activated carbon and 80% to 100% mesoporous activated carbon with a conductivity value >10 S/cm. A cathode in an FPC can have an average pore mouth diameter selected from the group consisting of an average pore mouth diameter of 2.0 to 10 nm achieved with a pore mouth diameter profile from 0% to 30% microporous activated carbon and from 70% to 100% mesoporous activated carbon, wherein the microporous activated carbon comprises carbon with a conductivity value >10 S/cm, and an average pore mouth diameter 2.5 to 10 nm achieved with a pore mouth diameter profile of 0% to 20% macroporous activated carbon and 80% to 100% mesoporous activated carbon with a conductivity value >10 S/cm.

BIBLIOGRAPHY

Smith, A. (2014, December 13). *Health Problems Associated with Impure Tap Water*. Retrieved from: http://www.macrohealth.net/health-problems-associated-with-impure-tap-water/

White, J. (2017, November 16) *Nearly 4,000 US communities have higher rates of lead poisoning than Flint*. Retrieved from: https://www.wsws.org/en/articles/2017/11/16/lead-n16.html Schneyer, J. (2017, November 17). *Reuters finds 3,810 U.S. areas with lead poisoning double Flint's*. Retrieved from: https://www.reuters.com/article/us-usa-lead-map/reuters-finds-3810-u-s-areas-with-lead-poisoning-double-flints-idUSKBN1DE1H2

(2017, March 12). *Test Your School's Drinking Water for Lead*. Retrieved from: https://tapwaterwatch.com/school-drinking-water/

Pure Water Technology SD. (2016, July 7). *5,300 U.S. water systems are in violation of lead rules*. Retrieved from: http://www.purewatertechsandiego.com/5300-u-s-water-systems-violation-lead-rules/

Siegel, J. (2018, February 5). *Pruitt asks Cabinet to help him with 'war on lead' in drinking water*. Washington Examiner. Retrieved from: http://www.washingtonexaminer.com/pruitt-asks-cabinet-to-help-him-with-war-on-lead-in-drinking-water/article/2648158

Akshay P. (2018, January 19). *Water Treatment Systems (PoE) Market by technology (Water Softeners, Filtration Methods, Reverse Osmosis, Distillation Systems, Disinfection Methods and Others), by Application (Residential and Non-Residential)—Global Forecast to 2020, MarketsandlvIarkets™ Report*. Retrieved from MarketandMarket™ database. https://www.linkedin.com/pulse/point-of-entry-water-treatment-systems-market-worth-569-akshay-p/

Nilesh R. (2016, June). *Point-of-Entry Water Treatment Systems Market by Technology (Water Softening, Filtration, Reverse Osmosis (RO), Disinfection, Sedimentation, Distillation) and Application (Residential, Commercial, Industrial)—Global Opportunity Analysis and Industry Forecast, 2015-2022. Allied Market Research Report*. Retrieved from Allied Market Research Database. https://www.alliedmarketresearch.com/water-treatment-systems-point-of-entry-market Point of Use Water Treatment Systems Market Analysis, By Technology (RO, Distillation, Disinfection, Filtration), By Device (Pitchers, Faucet Filters, Countertop), By Region, And Segment Forecasts, 2018-2025. (2017, October) Retrieved from: https://www.grandviewresearch.com/industry-analysis/point-of-use-water-treatment-systems-market Suh, R. (2016, June 28). *Our Drinking-Water Crisis Goes Far Beyond Flint*. Natural Resources Defense Council. Retrieved from: https://www.nrdc.org/experts/rhea-suh/our-drinking-water-crisis-goes-far-beyond-flint Environmental Protection Agency. *Lead and Copper Rule*. Retrieved from: https://www.epa.gov/dwreginfo/lead-and-copper-rule R. Levin et al. (2008). Lead Exposures in U.S. Children, 2008: Implications for Prevention, *Environ. Health Perspect.* 116(10), 1285-1293.

T. A. Jusko et al. (2008). Blood lead concentrations <10 microg/dL and child intelligence at 6 years of age. *Environ. Health Perspect.* 116(2): 243-248.

Olsen, E. D. and Fedinick, K. P. (2016, June 28). *What's in Your Water? Flint and Beyond*. Natural Resources Defense Council. Retrieved from: https://www.nrdc.org/resources/whats-your-water-flint-and-beyond U. S. Environmental Protection Agency Office of Water. (2016, October). *Lead and Copper Rule Revisions White Paper*, Washington, D.C. 20460.

Torrice, M. (2018, January 15). A *'war on lead' may be on the horizon*. Chemical & Engineering News. A Retrieved from: https://cen.acs.org/articles/96/i3/us-policy-outlook-for-2018.html Pattani, A. (2018, March 6). *NYC Lags in Reinstating Public School Water Fountains Ager Finding Lead*. WNYC News. Retrieved from: https://www.wnyc.org/story/nyc-lags-repairing-water-fountains-lead-public-schools/

Seewer, J. (2018, January 1). *Hundreds of water fixtures in Ohio schools founds with lead. The News*-Herald Available: http://www.news-herald.com/article/HR/20180108/NEWS/180109566

CBS SF Bay Area. (2018, January 25). *High lead Levels Found in Water Fountains at Berkeley Schools*. Retrieved from: http://sanfrancisco.cbslocal.com/2018/01/25/lead-found-in-drinking-water-at-berkeley-schools/

Girardi, L. (2017, March 28). *Elevated lead levels found at some Geneva school water fountains*. Chicago Tribune, Beacon News. Retrieved from: http://www.chicagotribune.com/suburbs/aurora-beacon-news/news/ct-abn-geneva-water-st-1214-20171213-story.html Brown, R., McTigue, N., and Cornwall, D. (2015). *Controlling Lead in Drinking Water*. American Waterworks Association and Water Research Foundation. Newport News, Va.

Schock, M. R., Hyland, R. N., and Welch, M. M. (2008). Occurrence of contaminant accumulation in lead pipe scales from domestic drinking-water distribution systems. *Environ. Sci. Technol.* 42(12), 4285-4291.

Xie, Y. (2010). *Dissolution, Formation, and Transformation of the Lead Corrosion Product $PbO_2$: Rates and Mechanisms of Reactions that Control Lead Release in Drinking Water Distribution Systems*, PhD Thesis, Washington University in St. Louis, St. Louis, Mo.

Edwards, M. and McNeill, L. S. (2002). Effect of phosphate inhibitors on lead release from pipes. *J. Am. Water Works Assoc.* 94(1), 79-90.

Siegel, J. (2018, February 5). *Pruitt asks Cabinet to help him with 'war on lead' in drinking water*. Washington Examiner. Retrieved from: http://www.washingtonexaminer.com/pruitt-asks-cabinet-to-help-him-with-war-on-lead-in-drinking-water/article/2648158

Shekinah, P., Kadirvelu, K., Kanmani, P., Senthilkumar, P., and Subburam, V. (2002). Adsorption of lead(II) from aqueous solution by activated carbon prepared from. *J. Chem. Technol. Biotechnol.* 77, 458-464.

Swiatkowski, A., Pakula, M., Biniak, S., and Walczyk, M. (2004). Influence of the surface chemistry of modified activated carbon on its electrochemical behaviour in the presence of lead(II) ions. Carbon. 42, 3057-3069.

El-Wakil, A. M., Abou El-Maaty, W. M., and Awad, F. S. (2014). Removal of Lead from Aqueous Solution on Activated Carbon and Modified Activated Carbon Prepared from Dried Water Hyacinth Plant. *J Anal. Bioanal. Tech.* 5(2), 1000187.

Holubowitch, N., Omosebi, A., Gao, X., Landon, J. and Liu, K. (2017). Quasi-Steady-State Polarization Reveals the Interplay of Capacitive and Faradaic Processes in Capacitive Deionization. ChemElectroChem. 4, 2404-2413.

Avraham, E., Noked, E. M., Soffer, A. and Aurbach, D. (2011). The feasibility of boron removal from water by capacitive deionization. *Electrochimica Acta.* 56, 6312-6317.

Tang, W., He, D., Zhang, C., Kovalsky, P., and Waite, T. D. (2017). Comparison of Faradaic reactions in capacitive deionization (CDI) and membrane capacitive deionization (MCDI) water treatment processes. *Water Research.* 120, 229 237.

Edwards, M. and Dudi, A. (2004). Role of chlorine and chloramine in corrosion of lead-bearing plumbing materials. *J Am Water Works Assoc.* 96, 10, 69-81.

We claim:

1. An electrochemical device for purifying an aqueous solution, the electrochemical device comprising:
    at least one carbon-based anode and at least one carbon-based cathode, the at least one carbon-based cathode consisting essentially of a microporous activated carbon cloth with a surface area of about 1800 or about 2000 m$^2$/g, and the at least one carbon-based anode consisting essentially of a macroporous graphite cloth having a surface area of less than 2 meters squared per gram (m$^2$/g);
    a container comprising at least one inlet that supplies an aqueous solution to the container and at least one outlet that discharges purified output from the container, the aqueous solution comprising at least one target species to be removed, the at least one carbon-based anode and the at least one carbon-based cathode arranged within the container, and a separator arranged between each carbon-based anode and adjacent carbon-based cathode; and
    a power supply with associated wiring that provides a DC constant voltage to the at least one carbon-based anode and the at least one carbon-based cathode, the DC constant voltage being a voltage associated with a Pourbaix diagram of the at least one target species at which the at least one target species is agglutinated on the at least one carbon-based anode through faradic immobilization and oxidation of the at least one target species in a pH region of less than 4 near the at least one carbon-based anode.

2. The device of claim 1, wherein the oxidation arises from production of oxidizers in a pH region of greater than 8 near the at least one cathode.

3. The device of claim 1, wherein the power supply is controlled by a process controller or manually.

4. The device of claim 1, wherein the separator thickness is selected from the group consisting of a range of 1 nanometers (nm) to 100 micrometers (microns), 2 nm to 50 microns, 2 nm to 30 microns, 1 to 100 microns, 1 to 50 microns, and 1 to 30 microns.

5. The device of claim 1, wherein the DC constant voltage used to achieve faradic immobilization is selected from the group consisting of less than 0.6 Volts (V), less than 1.2 V, and less than 2.5 V.

6. The device of claim 1, wherein the separator is a permeable separator.

7. The device of claim 1, wherein spacing between the at least one carbon-based anode and the at least one carbon-based cathode is selected from the group consisting of less than 1 millimeter (mm), less than 200 microns, less than 50 microns, and less than 20 microns.

8. The device of claim 1, wherein the electrochemical device is a rolled device, a stacked device, or a carbon block device.

9. The device of claim 1, wherein an average pore mouth diameter range of the at least one carbon-based anode is greater than 50 nm, and target species and faradic porosity cell (FPC) parameters are selected from the group consisting of:
    Manganese, with FPC parameters of anode voltage range of 0 to 1.2 V vs. NHE, cathode voltage of less than −1.1 vs. NHE, and operating voltage of 1.2 V;
    Iron, with FPC parameters of anode voltage range of 0 to 1.2 V vs. NHE, cathode voltage of less than −0.5 V vs. NHE, and operating voltage range of 0.4 to 1.2 V;
    Cobalt, with FPC parameters of anode voltage range of greater than 0 V vs. NHE, and cathode voltage of less than −0.5 V vs. NHE;
    Nickel, with FPC parameters of anode voltage range of 0 to 1.0 V vs. NHE, cathode voltage of less than −0.4 V vs. NHE, and operating voltage of 1.2 V;
    Copper with FPC parameters of anode voltage of greater than 0 V vs. NHE, cathode voltage of less than 0 V vs. NHE, and operating voltage range of 0.8 to 1.2 V;
    Zinc, with FPC parameters of anode voltage of greater than 0 V vs. NHE, cathode voltage of less than −0.8 V vs. NHE, and operating voltage range of 0.8 to 1.2 V;
    Aluminum, with FPC parameters of anode voltage of greater than 0 V vs. NHE, cathode voltage of less than −1.3 V vs. NHE, and operating voltage of 0.4 V;
    Lead, with FPC parameters of anode voltage of greater than 0.5 V vs. NHE, cathode voltage of less than −0.4 V vs. NHE, and operating voltage of 1.2 V;
    Palladium, with FPC parameters of anode voltage of greater than 0 V vs. NHE, and cathode voltage of less than 0 V vs. NHE;
    Silver, with FPC parameters of anode voltage of greater than 0 V vs. NHE, and cathode of less than 0 V vs. NHE;
    Iridium, with FPC parameters of anode voltage of greater than 0.4 V vs. NHE, and cathode voltage of less than 0 V vs. NHE;
    Platinum, with FPC parameters of anode voltage of greater than 0 V vs. NHE, and cathode voltage of less than 0 V vs. NHE;
    Gold, with FPC parameters of anode voltage of greater than 0.8 V vs. NHE, and cathode voltage of less than 0 V vs. NHE;
    Mercury, with FPC parameters of anode voltage of greater than 0.3 V vs. NHE, and cathode voltage of less than 0 V vs. NHE;
    Chlorine, with FPC parameters of an anode potential of less than 1.5 V vs. NHE and total cell potential of less than 2.5 V applied across anode and cathode;
    Bromine, with FPC parameters of an anode potential less than 1.2V vs. NHE, a cathode potential of greater than −1.0 V vs. NHE, and a total cell potential of <2.2 V applied across anode and cathode; and Chloramine, with FPC parameters of an anode potential less than 1.4 V vs. NHE, a cathode potential of greater than −1.0 V vs. NHE, and a total cell potential of greater than 2.4 V applied across anode and cathode.

* * * * *

UNITED STATES PATENT AND TRADEMARK OFFICE
CERTIFICATE OF CORRECTION

PATENT NO. : 11,117,818 B2
APPLICATION NO. : 16/520340
DATED : September 14, 2021
INVENTOR(S) : Lindsay Boehme, Cameron Lippert and James Landon Page 1 of 1

It is certified that error appears in the above-identified patent and that said Letters Patent is hereby corrected as shown below:

On the Title Page

Related U.S. Application Data (63) and (60), should read:
(63) Continuation-in-part of application No. 16/417,574, filed on May 20, 2019, continuation-in-part of application No. 15/984,290, filed on May 18, 2018.

(60) Provisional application No. 62/758,433, filed on Nov. 9, 2018, provisional application No. 62/702,286, filed on Jul. 23, 2018, provisional application No. 62/508,351, filed on May 18, 2017.

In the Specification

Column 1, Related Applications paragraph should read:
This application claims the benefit of (i) U.S application Ser. No. 62/702,286 by Boehme et al., entitled "Capacitive Coagulation Cell", filed on 23 Jul. 2018, (ii) U.S. application No. 62/758,433 by Boehme et al., entitled "Electro-Dechlorination Cell", filed on 9 Nov. 2018, (iii) U.S. application Ser. No. 16/417,574 by Lippert et al., entitled "Defined Carbon Porosity for Enhanced Capacitive Charging", filed on 20 May 2019, (iv) U.S. application Ser. No. 15/984,290 by Lippert et al., entitled "Defined Carbon Porosity for Sustainable Capacitive Charging", filed on 18 May 2018, and (v) U.S. application Ser. No. 62/508,351, entitled "Defined Carbon Porosity for Sustainable Capacitive Charging", filed on 18 May 2017.

Signed and Sealed this
Twenty-seventh Day of December, 2022

Katherine Kelly Vidal
*Director of the United States Patent and Trademark Office*